United States Patent [19]
Kennedy et al.

[11] Patent Number: 5,682,594
[45] Date of Patent: Oct. 28, 1997

[54] COMPOSITE MATERIALS AND METHODS FOR MAKING THE SAME

[75] Inventors: Christopher Robin Kennedy; Birol Sonuparlak, both of Newark; Ali Syed Fareed, Wilmington; John Edward Garnier, Newark; Gerhard Hans Schiroky, Hockessin; Dennis James Landini, Newark; Virgil Irick, Jr., New Castle, all of Del.

[73] Assignee: Lanxide Technology Company, LP, Newark, Del.

[21] Appl. No.: 472,613

[22] Filed: Jun. 7, 1995

Related U.S. Application Data

[63] Continuation-in-part of PCT/US93/03024, Apr. 1, 1993 which is a continuation-in-part of Ser. No. 3,202, Jan. 11, 1993, Pat. No. 5,389,450, which is a continuation-in-part of Ser. No. 862,397, Apr. 2, 1992, Pat. No. 5,330,849, which is a continuation-in-part of Ser. No. 61,854, Jun. 12, 1987, Pat. No. 5,202,059.

[51] Int. Cl.$^6$ .................... B22F 3/00; C03C 13/00
[52] U.S. Cl. .................... 428/549; 428/552; 428/610; 501/35
[58] Field of Search .................... 428/549, 552, 428/553, 554, 610; 501/35

[56] References Cited

U.S. PATENT DOCUMENTS

| 2,741,822 | 4/1956 | Udy | 25/157 |
| 3,255,027 | 6/1966 | Talsma | 106/65 |
| 3,296,002 | 1/1967 | Hare | 106/40 |

(List continued on next page.)

FOREIGN PATENT DOCUMENTS

| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"—M. Drouzy and M. Richard—Mar., 1974 Fonderie, France No. 332 pp. 121–128.

(List continued on next page.)

Primary Examiner—Peter A. Nelson
Attorney, Agent, or Firm—Jeffrey R. Ramberg

[57] ABSTRACT

Coated ceramic filler materials comprised of ceramic particles, fibers, whiskers, etc. having at least two substantially continuous coatings thereon are provided. The coatings are selected so that the interfacial shear strength between the ceramic filler material and the first coating, between coatings, or between the outer coating and the surrounding matrix material, are not equal so as to permit debonding and pull-out when fracture occurs. The resultant, multi-coated ceramic filler materials may be employed to provide composites, especially ceramic matrix composites, with increased fracture toughness. The ceramic filler materials are designed to be particularly compatible with ceramic matrices formed by directed oxidation of precursor metals, but such ceramic filler materials are also adaptable for use in many other composite material systems.

In a preferred embodiment, the coatings are applied to the ceramic fiber plies or preforms by CVD. Accordingly, coating depositions which are more uniform through the preform cross-section have been achieved by assembling the preform with exterior fabric plies having greater gas permeability than the fibrous preform or fabric plies located deeper in the preform interior.

In another preferred embodiment, at least one additional filler material different in some respect from a first fibrous filler material is provided to the permeable mass to be infiltrated with matrix material. Specifically, the additional filler material is provided for the purpose of tailoring at least one additional property of the self-supporting composite body to be formed not already tailored by the first fibrous filler material.

21 Claims, 16 Drawing Sheets

U.S. PATENT DOCUMENTS

| | | | |
|---|---|---|---|
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,895,084 | 7/1975 | Bauer | 264/29 |
| 3,973,977 | 8/1976 | Wilson | 106/62 |
| 3,991,248 | 11/1976 | Bauer | 428/245 |
| 4,131,697 | 12/1978 | Randon et al. | 427/249 |
| 4,238,433 | 12/1980 | Hillig et al. | 264/60 |
| 4,275,095 | 6/1981 | Warren | 427/228 |
| 4,397,901 | 8/1983 | Warren | 428/101 |
| 4,405,685 | 9/1983 | Honjo et al. | 428/368 |
| 4,426,209 | 1/1984 | Sarin et al. | 428/404 X |
| 4,472,476 | 9/1984 | Veltri et al. | 428/215 |
| 4,485,150 | 11/1984 | Tsuno | 428/633 |
| 4,491,482 | 1/1985 | Hori | 428/404 X |
| 4,515,860 | 5/1985 | Holzl | 428/408 |
| 4,567,103 | 1/1986 | Sara | 428/698 X |
| 4,582,751 | 4/1986 | Vasilos et al. | 428/307 |
| 4,593,007 | 6/1986 | Novinski | 428/404 X |
| 4,605,588 | 8/1986 | Simpson et al. | 428/288 |
| 4,618,525 | 10/1986 | Chamberlain et al. | 428/698 X |
| 4,642,271 | 2/1987 | Rice | 428/698 |
| 4,668,590 | 5/1987 | Yamamoto et al. | 428/699 X |
| 4,741,973 | 5/1988 | Condit | 428/553 |
| 4,752,503 | 6/1988 | Thebault | 427/248 |
| 4,766,013 | 8/1988 | Warren | 427/228 |
| 4,851,375 | 7/1989 | Newkirk et al. | 501/88 |
| 4,863,773 | 9/1989 | Rousseau et al. | 428/68 |
| 4,863,798 | 9/1989 | Arenz et al. | 428/368 |
| 4,885,199 | 12/1989 | Corbin et al. | 428/113 |
| 4,892,790 | 1/1990 | Gray | 428/548 |
| 4,915,760 | 4/1990 | Singh et al. | 156/89 |
| 4,944,904 | 7/1990 | Singh et al. | 269/60 |
| 4,981,822 | 1/1991 | Singh et al. | 501/95 |
| 5,017,526 | 5/1991 | Newkirk et al. | 501/89 |
| 5,026,604 | 6/1991 | Thebault | 428/367 |
| 5,094,901 | 3/1992 | Gray | 428/141 |
| 5,128,213 | 7/1992 | Tanaka et al. | 428/552 |
| 5,202,059 | 4/1993 | Kennedy et al. | 252/389.31 |
| 5,306,554 | 4/1994 | Harrison et al. | 428/283 |
| 5,424,109 | 6/1995 | Baetz | 428/113 |

OTHER PUBLICATIONS

"Refractories for Aluminum Alloy Melting Furnaces"—B. Clavaud and V. Jost—Sep., 1980—Lillian Brassinga (from French) Jan., 1985.

"Advanced Ceramic Matrix, Metal Matrix and Carbon—Carbon Composites"—Dr. John Briggs—Materials Technology Publications.

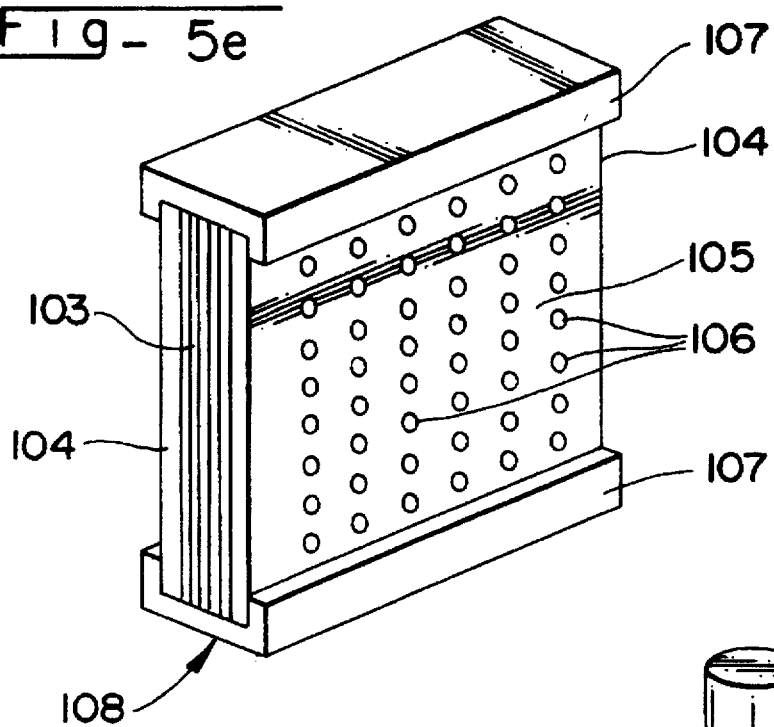
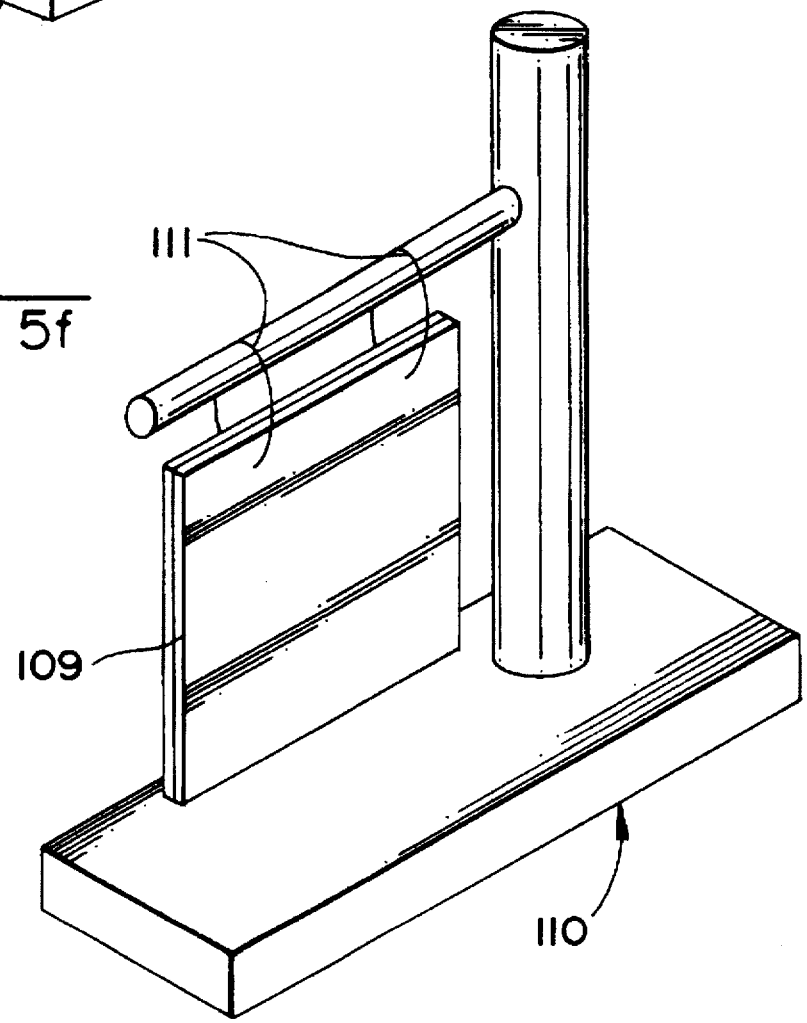

COMPOSITE MATERIALS AND METHODS FOR MAKING THE SAME

CROSS REFERENCE TO RELATED APPLICATIONS

The present patent disclosure is a continuation-in-part of International Application Serial No. PCT/US93/03024, filed on Apr. 1, 1993, which designated the U.S., and which is a continuation-in-part of U.S. patent application Ser. No. 08/003,202, filed on Jan. 11, 1993, now U.S. Pat. No. 5,389,450, which issued on Feb. 14, 1995, which in turn is a continuation-in-part of U.S. patent application Ser. No. 07/862,397, filed on Apr. 2, 1992, now U.S. Pat. No. 5,330,849, which issued on Jul. 19, 1994, each in the names of Christopher R. Kennedy et at., and each entitled "Composite Materials and Methods For Making The Same", which is a continuation-in-part of U.S. patent application Ser. No. 07/061,854, filed on Jun. 12, 1987, now U.S. Pat. No. 5,202,059, which issued on Apr. 13, 1993, in the name of Christopher R. Kennedy, and entitled "Coated Ceramic Filler Materials".

The United States Government has some rights to certain aspects of this invention pursuant to Contract No. N00014-90-C-0160 between the Defense Advanced Research Projects Agency and Lanxide Corporation.

TECHNICAL FIELD

The present invention generally relates to filler materials which are adapted for use as the reinforcement phase(s) in composite bodies. Coated ceramic filler materials comprised of ceramic particles, fibers, whiskers, etc. having at least two substantially continuous coatings thereon are provided. The coatings are selected so that the interfacial shear strength between the ceramic filler material and the first coating, between coatings, or between the outer coating and the surrounding matrix material, are not equal so as to permit debonding and pull-our when fracture occurs. The resultant, multi-coated ceramic filler materials may be employed to provide composites, especially ceramic matrix composites with increased fracture toughness. The ceramic filler materials are designed to be particularly compatible with ceramic matrices formed by directed oxidation of precursor metals, but such ceramic filler materials are also adaptable for use in many other composite material systems.

In a preferred embodiment, the coatings are applied to the ceramic fiber plies or preforms by CVD. Accordingly, coating depositions which are more uniform through the preform cross-section have been achieved by assembling the preform with exterior fabric plies having greater gas permeability than the fibrous preform or fabric plies located deeper in the preform interior.

In another preferred embodiment, at least one additional filler material different in some respect from a first fibrous filler material is provided to the permeable mass to be infiltrated with matrix material for the purpose of tailoring at least one additional property of the self-supporting composite body to be formed not already tailored by the first filler material.

BACKGROUND ART

A ceramic composite is a heterogeneous material or article comprising a ceramic matrix and filler such as ceramic particles, fibers or whiskers, which are intimately combined to achieve desired properties. These composites are produced by such conventional methods as hot pressing, cold pressing and firing, hot isostatic pressing, and the like. However, these composites typically do not exhibit a sufficiently high fracture toughness to allow for use in very high stress environments such as those encountered by gas turbine engine blades.

A novel and useful method for producing self-supporting ceramic composites by the directed oxidation of a molten precursor metal is disclosed in Commonly Owned U.S. Pat. No. 4,851,375, which issued on Jul. 25, 1989, described below in greater detail. However, the processing environment is relatively severe, and there is a need, therefore, to protect certain fillers from the strong oxidation environment. Also, certain fillers may be reduced at least partially by molten metal, and therefore, it may be desirable to protect the filler from this local reducing environment. Further, the protective means should be conducive to the metal oxidation process, yet not degrade the properties of the resulting composite, and even more desirably provide enhancement to the properties. Still further, in some instances it may be desirable for the means or mechanisms for protecting the filler during matrix or composite formation to also protect the fillers against undesirable attack of oxidants diffusing through the matrix during actual service of the composite.

It is known in the art that certain types of ceramic fillers serve as reinforcing materials for ceramic composites, and the selection or choice of fillers can influence the mechanical properties of the composite. For example, the fracture toughness of the composite can be increased by incorporating certain high strength filler materials, such as fibers or whiskers, into the ceramic matrix. When a fracture initiates in the matrix, the filler at least partially debonds from the matrix and spans the fracture, thereby resisting or impeding the progress of the fracture through the matrix. Upon the application of additional stress, the fracture propagates through the matrix, and the filler begins to fracture in a plane different from that of the matrix, pulling out of the matrix and absorbing energy in the process. Pull-out is believed to increase certain mechanical properties such as work-of-fracture by releasing the stored elastic strain energy in a controlled manner through friction generated between the material and the surrounding matrix.

Debonding and pull-out have been achieved in the prior art by applying a suitable coating to the ceramic filler material. The coating is selected so as to have a lower bonding strength with the surrounding matrix than the filler, per se, would have with the matrix. For example, a boron nitride coating on silicon carbide fibers has been found to be useful to enhance pull-out of the fibers. Representative boron nitride coatings on fibers are disclosed in U.S. Pat. No. 4,642,271, which issued on Feb. 10, 1987, in the name of Roy W. Rice, and are further disclosed in U.S. Pat. No. 5,026,604, which issued on Jun. 25, 1991, in the name of Jacques Thebault. However, the use of boron nitride coated fibers in composites may present significant processing disadvantages. For example, the production of ceramic matrix composites containing boron nitride coated materials requires the use of reducing atmospheres since a thin layer of boron nitride readily oxidizes (e.g., converts to boron oxide in an oxygen-containing atmosphere) at temperatures above 800°–900° C. A reducing atmosphere, however, may often times not be compatible with the directed oxidation of molten precursor metal for fabricating ceramic composites. Further, in the directed oxidation process the coating desirably is compatible with the molten metal in that the molten metal wets the coated filler under the process conditions, for otherwise the oxidation process and matrix growth may be impeded by the filler.

Also, in order to prevent or minimize filler degradation, certain limits may be imposed on the conventional fabrication processes, such as using low processing temperatures or short times at processing temperature. For example, certain fillers may react with the matrix of the composite above a certain temperature. Coatings have been utilized to overcome degradation, but as explained above, the coating can limit the choice of processing conditions. In addition, the coating should be compatible with the filler and with the ceramic matrix.

A need therefore exists to provide coated ceramic filler materials which are capable of debonding and pull-out from a surrounding ceramic matrix. A further need exists to provide coated ceramic filler materials which may be incorporated into the ceramic matrix at elevated temperatures under oxidizing conditions to provide composites exhibiting improved mechanical properties such as increased fracture toughness.

In order to meet one or more of these needs, the prior art shows filler materials bearing one or more coatings. Carbon is a useful reinforcing filler but typically is reactive with the matrix material. It therefore is well known in the art to provide the carbon fibers with a protective coating. U.S. Pat. No. 4,397,901, which issued on Aug. 9, 1983, in the name of James W. Warren, teaches first coating carbon fibers with carbon as by chemical vapor deposition, and then with a reaction formed coating of a metallic carbide, oxide, or nitride. Due to a mismatch in thermal expansion between the fiber and the coating, the fiber is capable of moving relative to the coating to relieve stress. A duplex coating on carbon fibers is taught by U.S. Pat. No. 4,405,685, which issued on Sep. 20, 1983, in the names of Honjo et al. The coating comprises a first or inner coating of a mixture of carbon and a metal carbide and then an outer coating of a metal carbide. The outer coatings prevent degradation of the fiber due to reaction of unprotected fiber with the matrix material, and the inner coating inhibits the propagation of cracks initiated in the outer layer. U.S. Pat. No. 3,811,920, which issued on May 21, 1974, in the names of Galasso et al. relating to metal matrix composites, discloses coated fibers as a reinforcing filler, such as boron filaments having a silicon carbide surface layer and an additional outer coating of titanium carbide. This reference teaches that the additional coating of titanium carbide improves oxidation resistance as well as provides a diffusion barrier between the filament and metal matrix.

However, the prior art fails to teach or suggest filler materials with a duplex coating for protection from and compatibility with a molten metal in an oxidizing environment during manufacture of the ceramic matrix composite by directed oxidation, and yet in the composite exhibit debonding and pull-out from the surrounding matrix. Moreover, the prior art does not recognize certain important aspects of utilizing getterer materials which function to scavenge undesirable oxidants, and after such scavenging has occurred, forming desirable compounds or materials (e.g., one or more glassy compounds) which assist in protecting the reinforcement materials from undesirable oxidation.

DESCRIPTION OF COMMONLY OWNED U.S. PATENTS AND PATENT APPLICATIONS

The filler materials utilized in this invention may be protected by a number of different mechanisms in a number of different composite bodies. Filler materials containing a coating or plurality of coatings, in accordance with the teachings of this invention, are particularly applicable or useful in the production of ceramic composites disclosed and claimed in Commonly Owned U.S. Pat. No. 4,851,375, entitled "Methods of Making Composite Ceramic Articles Having Embedded Filler," which issued on Jul. 25, 1989, from U.S. patent application Ser. No. 819,397, filed Jan. 17, 1986, which is a continuation-in-part of Ser. No. 697,876, filed Feb. 4, 1985 (now abandoned), both in the names of Marc S. Newkirk et al. and entitled "Composite Ceramic Articles and Methods of Making Same". This Commonly Owned Patent discloses a novel method for producing a self-supporting ceramic composite by growing an oxidation reaction product from a precursor metal or parent metal into a permeable mass of filler.

The method of growing a ceramic product by an oxidation reaction of a parent metal is disclosed generically in Commonly Owned U.S. Pat. No. 4,713,360, which issued on Dec. 15, 1987, from U.S. patent application Ser. No. 818,943, filed Jan. 15, 1986 as a continuation-in-part of Ser. No. 776,964, filed Sep. 17, 1985 (now abandoned), which is a continuation-in-part of Ser. No. 705,787, filed Feb. 26, 1985 (now abandoned), which is a continuation-in-part of Ser. No. 591,392, filed Mar. 16, 1984 (now abandoned), all in the name of Marc S. Newkirk et al. and entitled "Novel Ceramic Materials and Methods of Making Same"; and in U.S. Pat. No. 4,853,352, which issued on Aug. 1, 1989, from U.S. Ser. No. 07/220,935, filed Jun. 23, 1988, which is a continuation application of U.S. Ser. No. 822,999, filed Jan. 27, 1986, which is a continuation-in-part of Ser. No. 776,965, filed Sep. 17, 1985 (now abandoned), which is a continuation-in-part of Ser. No. 747,788, filed Jun. 25, 1985 (now abandoned), which is a continuation-in-part of Ser. No. 632,636, filed Jul. 20, 1984 (now abandoned), all in the names of Marc S. Newkirk et al. and entitled "Methods of Making Self-Supporting Ceramic Materials".

Commonly Owned U.S. Pat. No. 4,713,360 discloses a novel method for producing a self-supporting ceramic body by oxidation of a parent metal (as defined below) to form an oxidation reaction product which then comprises the ceramic body. More specifically, the parent metal is heated to an elevated temperature above its melting point but below the melting point of the oxidation reaction product in order to form a body of molten parent metal which reacts upon contact with a vapor-phase oxidant to form an oxidation reaction product. The oxidation reaction product, or at least a portion thereof which is in contact with and extends between the body of molten parent metal and the oxidant, is maintained at the elevated temperature, and molten metal is drawn through the polycrystalline oxidation reaction product and towards the oxidant, and the transported molten metal forms oxidation reaction product upon contact with the oxidant. As the process continues, additional metal is transported through the polycrystalline oxidation reaction product formation thereby continually "growing" a ceramic structure of interconnected crystallites. Usually, the resulting ceramic body will contain therein inclusions of nonoxidized constituents of the parent metal drawn through the polycrystalline material and solidified therein as the ceramic body cooled after termination of the growth process. As explained in these Commonly Owned Patents and Patent Applications, resultant novel ceramic materials are produced by the oxidation reaction between a parent metal and a vapor phase oxidant, i.e., a vaporized or normally gaseous material, which provides an oxidizing atmosphere. In the case of an oxide as the oxidation reaction product, oxygen or gas mixtures containing oxygen (including air) are suitable oxidants, with air usually being preferred for obvious reasons of economy. However, oxidation is used in its broad sense in the Commonly Owned Patents and in this application, and refers to the loss or sharing of electrons by a metal to an oxidant which may be one or more elements and/or compounds. Accordingly, elements other than oxygen may serve as the oxidant. In certain cases, the parent metal may require the presence of one or more dopants in order to influence favorably or to facilitate growth of the ceramic body, and the dopants are provided as alloying constituents of the parent metal. For example, in the case of aluminum as the parent metal and air as the oxidant, dopants such as magnesium and silicon, to name but two of a larger class of dopant materials, are alloyed with the aluminum alloy utilized as the parent metal.

The aforementioned Commonly Owned U.S. Pat. No. 4,853,352 discloses a further development based on the discovery that appropriate growth conditions as described above, for parent metals requiring dopants, can be induced by externally applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. External application of a layer of dopant material permits locally inducing metal transport through the oxidation reaction product and resulting ceramic growth from the parent metal surface or portions thereof which are selectively doped. This discovery offers a number of advantages, including the advantage that ceramic growth can be achieved in one or more selected areas of the parent metal's surface rather than indiscriminately, thereby making the process more efficiently applied, for example, to the growth of the ceramic plates by doping only one surface or only portions of a surface of a parent metal plate. This improvement invention also offers the advantage of being able to cause or promote oxidation reaction product growth in parent metals without the necessity of alloying the dopant material into the parent metal, thereby rendering the process feasible, for example, for application to commercially available metals and alloys which otherwise would not contain or have appropriately doped compositions.

Thus, the aforesaid Commonly Owned Patents and Patent Applications describe the production of oxidation reaction products readily "grown" to desired thicknesses heretofore believed to be difficult, if not impossible, to achieve with conventional ceramic processing techniques. The underlying metal, when raised to a certain temperature region above its melting point, and in the presence of dopants (if required) is transported through its own otherwise impervious oxidation reaction product, thus exposing fresh metal to the oxidizing environment to thereby yield further oxidation reaction product. In forming a ceramic composite body, as described in the aforesaid Commonly Owned U.S. Pat. No. 4,851,375, the parent metal is placed adjacent a permeable mass of filler material, and the developing oxidation reaction product infiltrates the mass of filler material in the direction and towards the oxidant and boundary of the mass. The result of this phenomenon is the progressive development of an interconnected ceramic matrix, optionally containing some nonoxidized parent metal constituents distributed throughout the growth structure, and an embedded filler.

In producing the ceramic composite, any suitable oxidant may be employed, whether solid, liquid, or gaseous, or a combination thereof. If a gas or vapor oxidant, i.e. a vapor-phase oxidant, is used the filler is permeable to the vapor-phase oxidant so that upon exposure of the bed of filler to the oxidant, the gas permeates the bed of filler to contact the molten parent metal therein. When a solid or liquid oxidant is used, it is usually dispersed through a portion of the bed of filler adjacent the parent metal or through the entire bed, typically in the form of particulates admixed with the filler or as coatings on the filler particles.

Polycrystalline bodies comprising a metal boride are produced in accordance with Commonly Owned U.S. Pat. No. 4,777,014, which issued on Oct. 11, 1988, from U.S. patent application Ser. No. 837,448, filed Mar. 7, 1986, in the name of Marc S. Newkirk, et al., and entitled "Process for Preparing Self-Supporting Bodies and Products Made Thereby". In accordance with this invention, boron or a reducible metal boride is admixed with a suitable inert filler material, and the molten parent metal infiltrates and reacts with the boron source. This reactive infiltration process produces a boride-containing composite, and the relative amounts of reactants and process conditions may be altered or controlled to yield a polycrystalline body containing varying volume percents of ceramic, metal, reinforcing filler, and/or porosity.

The entire disclosures of each of the Commonly Owned Patents and Patent Applications are incorporated herein by reference.

SUMMARY OF THE INVENTION

In accordance with a first aspect of this invention, there is disclosed a plurality of distinct, but combinable, mechanisms for preventing undesirable oxidation (i.e., oxidation protection mechanisms) of reinforcement materials (e.g., fibers) in composite bodies. These oxidation protection mechanisms include the use of getterer materials which are present in at least a portion of the composite body (e.g., in at least a portion of the matrix; or in, on or adjacent to at least a portion of the reinforcing materials, etc.). These getterer materials tend to scavenge (e.g., react with) undesirable oxidants which enter the composite body such as, for example, by diffusion mechanisms, through microcracks, etc. These oxidation protection mechanisms may, in certain embodiments, also include techniques for reducing the number and/or size of such microcracks in a portion of or throughout the composite body. The reduction in the amount and/or size of microcracks may limit the ability of undesirable oxidants to negatively impact the reinforcement material in the composite body.

In a preferred embodiment of the invention, the getterer material or materials may form a desirable compound (e.g., a glass or an oxide material) which further enhances the oxidation protection of a composite body. For example, when a composite body is put into service in an oxidizing environment, and assuming that the oxidizing environment would have an adverse effect upon the reinforcing material, some type of oxidation protection mechanism should be utilized to prevent the reinforcement from oxidizing undesirably. If a getterer material was placed on, or at least in close proximity to, the reinforcing material, then an oxidant which came into contact with the getterer material, such as by diffusion mechanisms, through microcracks, etc., could be gettered (e.g., reacted) by the getterer materials, thereby ameliorating undesirable reaction(s) with the reinforcing material. Further, if the getterer material forms a desirable compound, for example, a glass, the compound could provide even further oxidation protection to the reinforcing material. In this regard, if a formed glass had an appropriate viscosity, then the formed glass could flow into any microcracks which may be present near the formed glass, thereby permitting the formed glass to function as a crack sealant. In this regard, the formed glass should have an oxidant permeability which is low enough (i.e., lower than the oxidant permeability of the crack) to provide for suitable oxidation protection at the intended operation temperatures of the composite body for a desirable amount of time.

The composite body can be engineered so that one or more getterer materials are included in the composite body such that one or more deskable compounds (e.g., glasses) are formed. Each of the getterer materials could react with one or more oxidants at different temperatures and form one or more desirable compounds (e.g., one or more desirable glasses) which may provide for differing amounts of oxidation protection at different temperatures. In addition, the formed compounds could further react with other species contained in the composite body to produce additional desirable compounds. Accordingly, a composite body could be produced which contained a plurality of different oxidation protection mechanisms, wherein each oxidation protection mechanism was included to provide for desirable oxidation protection at different service temperatures of the composite body.

One exemplary manner of placing an oxidant getterer material onto a reinforcing material would be to dip, paint or spray an appropriate material onto at least a portion of the reinforcing material prior to matrix formation. Alternatively, chemical vapor deposition (CVD) or chemical vapor infiltration (CVI) techniques could be utilized to obtain one or more coatings on at least a portion of, or in a preferred embodiment, substantially all of, a reinforcing material. It would be desirable for such coatings to be capable of surviving any matrix formation steps in addition to providing in-service oxidation protection. Moreover, such coating could contain, or be modified to contain as, for example, one or more additional species such as one or more oxygen getterer materials.

In a preferred embodiment of the invention, a coated ceramic filler material, adaptable for use as a reinforcing component in a ceramic matrix composite, is provided with a plurality of superimposed coatings. The filler or reinforcing material useful for this embodiment includes materials where the length exceeds the diameter, typically in a ratio of at least about 2:1 and more preferably at least about 3:1, and includes such filler materials as whiskers, fibers, and staple. The coating system includes a first coating in substantially continuous contact with the ceramic filler material, and one or more additional or outer coatings superimposed over the underlying coating, and in substantially continuous contact therewith. Zonal junctions are formed between the filler and first coating, between superimposed coatings, and between the outer coating and the ceramic matrix. The coatings are selected so that the interfacial shear strength of at least one of these several zones is weak relative to the other zones. As used herein and in the appended claims, a zonal junction is not limited to an interface, per se, between the surfaces but also includes regions of the coatings in proximity to the interfaces, and shear, therefore, is zonal in that it may occur at an interface or within a coating. Further, it is understood that the zonal junction between adjacent surfaces may be minimal or negligible and exhibit essentially no bonding or adhesion, or the adjacent surfaces may exhibit appreciable bonding or a strong bond. Upon the application of fracture stress to the composite, the weak zone allows for debonding of the filler before the filler fractures, and pull-out or shear of the filler upon fracture of the filler. This debonding and friction pullout enhances certain mechanical properties of the composite, and in particular debonding improves the fracture toughness. Thus, in a duplex coating system, for example, having a first coating and a second, outer coating superimposed on the first coating, the coatings are chosen to facilitate debonding and pull-out such that junction between one of the three interfaces (i.e. the interface between the filler and the inner coating, the interface between the inner coating and the outer coating, the interface between the outer coating and the surrounding matrix, or the strength of a coating) is weak relative to the other zonal junctions and allows for debonding and pull-out.

By reason of this embodiment of the invention, the coated ceramic filler materials not only provide improved mechanical properties, but also the filler is protected from severe oxidizing environments and yet amenable to the processing conditions for making a composite in accordance with the Commonly Owned Patents and Patent Applications discussed herein. Certain fillers are at least partially reduced by the molten parent metal upon contact with the filler, and the coating protects the filler against this local reducing environment. Thus, the coated fillers are adaptable for use as a reinforcing component in a ceramic matrix composite formed by the directed oxidation reaction of a molten precursor metal or parent metal with an oxidant. Accordingly, a lay-up comprising a parent metal and an adjacent mass of filler can be heated in an oxidizing environment to a temperature above the melting point of the metal but below the melting point of its oxidation reaction product which reacts with the oxidant (e.g. air) to form a polycrystalline oxidation reaction product. The oxidation reaction is continued thereby growing an oxidation reaction product of increasing thickness which progressively infiltrates or grows into the permeable mass of filler material to form the composite product. As explained above, it is deskable to provide the filler material with two or more superimposed coatings so as to prolong the useful life or performance of the components and the composite. The filler material is first provided with an inner coating in substantially continuous contact with the filler material which may serve to protect the filler. An outer coating, in substantially continuous contact with the underlying coating, is preferably selected so as to be wettable by molten parent metal under the conditions of the matrix formation process and substantially nonreactive therewith, and inhibits degradation of the filler material and the first or inner coating by molten metal and/or the oxidant. Further, the interfacial shear strength of one of the zonal junctions is weak relative to the others thereby permitting debonding and pull-out of the filler material on application of stress.

In another preferred embodiment of the invention, the coatings may protect the fibers by a means different from, but possibly in addition to, the above-described mechanisms. Specifically, under in-service conditions (e.g., at elevated temperatures), the coatings may help to preserve the "original" or "as-fabricated" strength of the fibers by preserving the original character of the fibers, in particular, the fiber chemistry and/or crystal structural (or lack thereof). Without wishing to be bound by any particular theory or explanation, it is possible that the fiber coating serves to prevent or at least retard thermal decomposition, specifically by preventing, or at least retarding, outgassing from the fiber, which outgassing may, in some circumstances, be accompanied by a change in the character of the crystals making up the fiber such as, for example, through growth of certain of the crystals or, in the case of an originally amorphous fiber, by crystallization or devitrification of this amorphous structure.

The choice of parent metal and oxidant will determine the composition of the polycrystalline matrix, as explained in the Commonly Owned Patents and Patent Applications. Thus a filler bearing the coating system may have admixed therewith a solid or liquid oxidant, such as boron, silica, or glasses (e.g., low melting glasses), or the oxidant may be gaseous, such as an oxygen-containing gas (e.g. air) or a nitrogen-containing gas (e.g. forming gas typically comprising, by volume, 96% nitrogen and 4% hydrogen).

In general, coated filler materials of this invention may be utilized in the manufacture of composite materials (e.g., ceramic matrix composites) that provide improved mechanical properties, especially increased fracture toughness. When so employed, the thickness of the coatings is sufficient to protect the ceramic filler material against corrosive environments such as those of molten metals. However, the coatings should not be so thick as to serve as a source of structural defects or to interfere with the function of the filler. In this regard, it has been discovered that there exists an optimum coating thickness for each of the plurality of superimposed coatings on the filler material. Specifically, it has been discovered that for composites having (1) matrices comprising an oxidation reaction product of a parent metal and (2) a silicon carbide fiber reinforcement present in an amount equal to about 35 volume percent, that a coating of boron nitride followed by a coating of silicon carbide provides desirable performance results. For example, it has been discovered that an optimum flexural strength can be achieved when the inner boron nitride coating ranges in thickness from about 0.2 to 0.5 microns, and preferably is about 0.3 microns thick, and further when the overlying silicon carbide coating thickness is in the range of about 2.0 to 2.3 microns.

In another aspect of the invention, the uniformity of the thickness of materials deposited on the fibers of the fabric preform may be increased. Specifically, by assembling a fabric preform such that those fiber plies having a looser, more "open" weave are placed at the outside of the preform, the CVD reactant gases are provided greater access to the interior of the preform. The more deposition occurring in the interior of the preform, the more that the propensity for "canning" (i.e., whereby most of the deposition takes place on the outer but not the inner regions of the preform) is reduced.

It is noted that particular emphasis is herein placed upon matrices formed by the directed oxidation of a molten metal, however, certain aspects of the coating composition and/or coating thickness may be transferable to other matrices (e.g., glass matrices, etc.) and/or other matrix formation conditions (e.g., chemical vapor infiltration, etc.).

Moreover, the coatings can be selected so that one or more of the coatings serves as an oxidant getterer when the composite is put into service. In a further preferred embodiment, once the oxidant getterer has formed a compound (e.g., at least one glassy compound) due to a reaction between the getterer and the oxidant, the formed compound provides further protection due to, for example, flowing into a crack to function as a crack sealant.

In yet another achievement of the invention, an approach for reducing the number and/or size of microcracks formed during composite formation and/or formed during composite service or use, is discussed. Microcracks, in certain instances, may be undesirable because such microcracks may permit ready access of undesirable oxidants to the reinforcement materials which can result in degradation of some properties of the composite body. Specifically, microcracking of a matrix material located between adjacent plies of fiber tows/bundles (e.g., silicon carbide fibers) can be reduced or possibly even eliminated by introducing into the matrix one or more materials having a relatively low coefficient of thermal expansion such as, for example, silicon carbide particulate. Thus, to practice this embodiment of the invention, an appropriate material or combination of materials could be inserted between one or more fiber tows or between fiber layers to form a preform from a combination of fibers and particulate. After formation of the preform, a ceramic matrix comprising, for example, an oxidation reaction product, could be formed.

To further expand on this fiber reinforcement embodiment, one or more substantially non-reactive filler materials different from the fibrous filler material may be added among the fibers making up a preform (e.g., a 3-D woven fiber preform) or between the layers of fabric making up a preform. Provided that sufficient fiber loading remains to accomplish its purpose (e.g., composite toughening), a wide variety of other filler materials may be added to tailor a host of desired properties, for example, bulk density, thermal conductivity, wear resistance, ballistic performance, etc.

Certain of the ceramic matrix composites of the present invention are adaptable to finishing operations such as machining, polishing, grinding, etc. The resultant composites are intended to include, without limitation, industrial, structural, and technical ceramic bodies for applications where improved strength, toughness and wear resistance are important or beneficial.

While this disclosure focuses primarily on ceramic matrix composite bodies having a matrix formed by the directed oxidation of a molten metal, it should be understood that the coating techniques of the invention are by themselves novel and useful and have industrial applicability in many other composite body formation processes (e.g., other ceramic matrix composite formation techniques, glass matrix formation techniques, polymer matrix formation techniques, metal matrix formation techniques, etc.). Accordingly, this invention also relates to the specific techniques for forming coatings on the filler material. While this disclosure relates to the CVD or CVI technique for forming such coatings, it is by no means limited to such processes. Another deposition technique, for example, involves the thermal decomposition of a liquid alkylchlorosilane which may be accomplished by immersing a heated filler material into a bath of methyltrichlorosilane.

The following terms, as used herein and in the claims, have the stated meanings as defined below:

The term "oxidation reaction product" in conjunction with both oxidation reaction product growth and gettering means one or more metals in any oxidized state wherein the metal(s) have given up electrons to or shared electrons with another element, compound, or combination thereof. Accordingly, an "oxidation reaction product" under this definition includes the product of the reaction of one or more metals (e.g. aluminum parent metal) with an oxidant such as oxygen or air, nitrogen, a halogen, sulfur, phosphorous, arsenic, carbon, boron, selenium, tellurium; compounds such as silica (as a source of oxygen), and methane, ethane, propane, acetylene, ethylene, and propylene (as a source of carbon); and mixtures such as $H_2/H_2O$ and $CO/CO_2$ which are useful in reducing the oxygen activity of the environment.

The term "oxidant" means one or more suitable electron acceptors or electron sharers and may be a solid, liquid, or gas (vapor) or some combination of these. Thus, oxygen (including air) is a suitable vapor-phase gaseous oxidant for the formation of oxidation reaction product, with air being preferred for reasons of economy. Boron, boron carbide and carbon are examples of solid oxidants for the formation of oxidation reaction product under this definition.

The term "parent metal" as used in the specification and appended claims refers to that metal, e.g. aluminum, which is the precursor of a polycrystalline oxidation reaction product such as alumina, and includes that metal or a relatively pure metal, a commercially available metal having impurities and/or alloying constituents therein, and an alloy in which that metal precursor is the major constituent; and when a specified metal is mentioned as the parent metal, e.g. aluminum, the metal identified should be read with this definition in mind unless indicated otherwise by the context.

The term "ceramic", as used in this specification and the appended claims, is not limited to a ceramic body in the classical sense, that is, in the sense that it consists entirely of non-metallic, inorganic materials, but rather, it refers to a body which is predominantly ceramic with respect to either composition or dominant properties, although the body may contain substantial amounts of one or more metallic constituents such as derived from the parent metal, most typically within a range of from about 1–40% by volume, but may include still more metal.

The term "glass" or "glassy compound" as used in this disclosure is used in the classical sense, e.g., as an inorganic product of fusion cooled to a rigid condition. As a liquid state material, the glasses referred to herein display the property of viscosity; that is, a permanent shear deformation in response to the application of a shear stress.

BRIEF DESCRIPTION OF THE DRAWINGS

FIG. 5e is an isometric schematic representation of a graphite containment fixture for effecting the coating of a fabric preform as discussed in Example 2.

FIG. 5f is a isometric schematic representation of a cantilever graphite fixture for holding a boron nitride coated fabric preform to enable coating of the preform with a second coating as discussed in Example 2.

DETAILED DESCRIPTION OF THE INVENTION AND PREFERRED EMBODIMENTS

Figure 1:
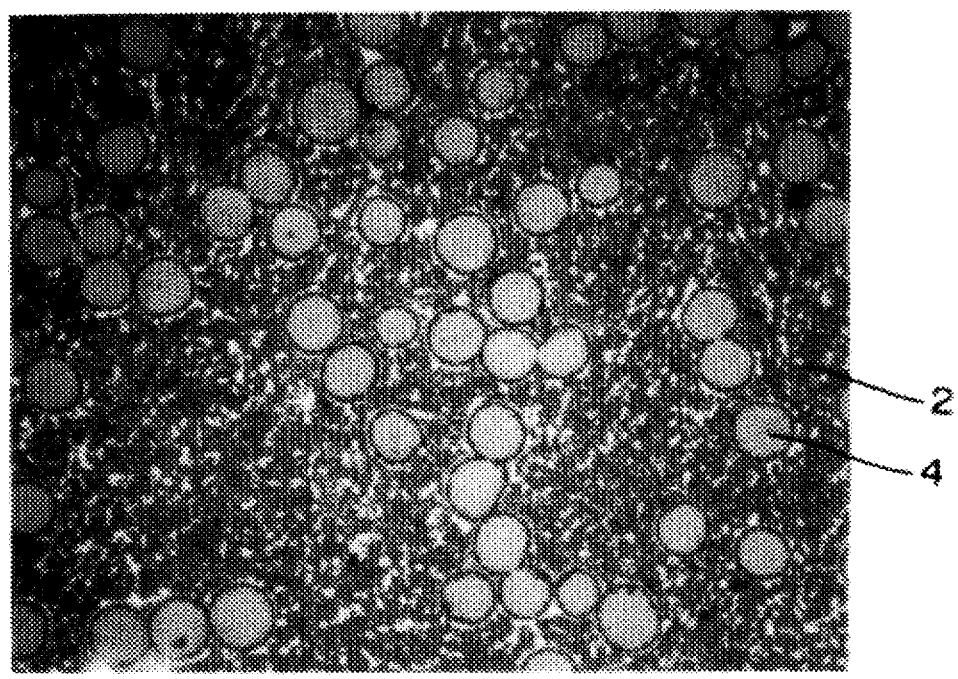
FIG. 1 is a scanning electron micrograph taken at about 350×magnification of a coated ceramic filler material in a ceramic matrix and made according to the invention.

In accordance with a first aspect of this invention, there is disclosed a plurality of distinct, but combinable, mechanisms for preventing undesirable oxidation (i.e., oxidation protection mechanisms) of one or more reinforcement materials in composite bodies formed by various techniques.

Suitable ceramic filler materials which may be used in the invention include metal oxides, borides, carbides, nitrides, silicides, and mixtures or combinations thereof, and may be relatively pure or contain one or more impurities or additional phases, including composites of these materials. The metal oxides include, for example, alumina, magnesia, ceria, hafnia, lanthanum oxide, neodymium oxide, samaria, praseodymium oxide, thoria, urania, yttria, beryllium oxide, tungsten oxide and zirconia. In addition, a large number of binary, ternary, and higher order metallic compounds such as magnesium-aluminate spinel, silicon aluminum oxynitride, borosilicate glasses, and barium timate are useful as refractory fillers. Additional ceramic filler materials may include, for example, silicon carbide, silica, boron carbide, titanium carbide, zirconium carbide, boron nitride, silicon nitfide, aluminum nitride, titanium nitride, zirconium nitride, zirconium boride, titanium diboride, aluminum dodecaboride, and such materials as Si—C—O—N compounds, including composites of these materials. The ceramic filler may be in any of a number of forms, shapes or sizes depending largely on the matrix material, the geometry of the composite product, and the desired properties sought for the end product, and most typically are in the form of whiskers and fibers. The fibers can be discontinuous (in chopped form as staple) or in the form of a single continuous filament or as continuous multifilament tows. They also can be in the form of two- or three-dimensional woven continuous fiber mats or structures. Further, the ceramic mass may be homogeneous or heterogeneous.

The oxidation protection mechanisms of the invention include the use of getterer materials which are present in at least a portion of the composite body (e.g., in at least a portion of the matrix; or in, on or adjacent to at least a portion of the reinforcing materials, etc.). These getterer materials tend to scavenge (e.g., react with) undesirable oxidants which enter the composite body such as, for example, by diffusion mechanisms, through microcracks, etc. These oxidation protection mechanisms may, in certain embodiments, also include techniques for reducing the number and/or size of such microcracks in a portion of or throughout the composite body. The reduction in the amount and/or size of microcracks may limit the ability of undesirable oxidants to negatively impact the reinforcement material(s) in the composite body.

In a preferred embodiment of the invention, the getterer material or materials may form a desirable compound (e.g., a glass or an oxide material) which further enhances the oxidation protection of a composite body. For example, when a composite body is put into service in an oxidizing environment, and assuming that the oxidizing environment would have an adverse effect upon the reinforcing material, some type of oxidation protection mechanism should be utilized to prevent the reinforcement from oxidizing undesirably. If a getterer material was placed on, or at least in close proximity to, the reinforcing material, then an oxidant which came into contact with the getterer material such as, for example, by diffusion mechanisms through microcracks, etc., could be gettered (e.g., reacted) by the getterer materials, thereby ameliorating undesirable reaction(s) with the reinforcing material. Further, if the getterer material forms a desirable compound, for example, a glass, the compound could provide even further oxidation protection to the reinforcing material. In this regard, if a formed glass had an appropriate viscosity, then the formed glass could flow into any microcracks which may be present near the formed glass, thereby permitting the formed glass to function as a crack sealant. In this regard, the formed glass should have an oxidant permeability which is low enough (i.e., lower than the oxidant permeability of the crack) to provide for suitable oxidation protection at the intended operation temperatures of the composite body for a desirable amount of time.

A number of candidate getterer materials useful in combination with various matrices and reinforcements will become apparent to an artisan of ordinary skill upon review of this disclosure. Specifically, in a preferred embodiment of the invention, many reinforcement materials (e.g., fibers) are susceptible to oxidation by oxidants such as oxygen. Accordingly, it often is vitally important to prevent oxygen from contacting the reinforcing fibers so as to prevent any negative effects upon the fibers. In this regard, oxygen typically is transported to a fiber surface by a combination of different mechanisms. In general, oxygen usually enters the surface of a composite body due to some flaw present on the surface (e.g., machining marks, a broken or cracked outer protective skin, etc.). Once the oxygen has permeated the surface of a composite body, oxygen may then ingress further into the composite body by various channels present in the composite body due to microcracking from processing, thermal shock, physical shock, etc. In addition, molecular or atomic oxygen diffusion may also occur in combination with the physical egress of oxygen into the composite body. If an appropriate oxygen getterer material was positioned such that the oxygen which ingressed into the composite could be gettered (e.g., reacted with) by the oxygen getterer, then further ingress of that particular oxygen molecule would be inhibited. However, if additional oxygen ingressed into approximately the same area in the composite, at some point substantially all of the oxygen gettering material will eventually react with the ingressing oxygen. At that point, it would be desirable for another oxidation protection mechanism to occur. In this regard, if the oxygen gettering material was chosen so that one or more desirable compounds (e.g., oxides or glasses) were formed upon a reaction with the oxygen, then such glasses or other oxides could block (e.g., flow into) any cracks, channels, microcracks, etc., to inhibit the physical transport of oxygen further into the composite body.

Examples of two materials which function as suitable oxygen getterers and glass formers are boron nitride, which when reacted with oxygen may form a boron oxide glass and silicon carbide, which when reacted with oxygen may form a silicon oxide glass. Moreover, it is possible that when both boron oxide glass and silicon dioxide glass are present, the glasses may exist independently and/or may form a borosilicate glass. Still further, if additional materials are present in the vicinity of the forming glasses, such as aluminum (e.g., as a metal or an oxidized compound such as $Al_2O_3$) and/or zirconium, in various forms both oxidized and non-oxidized, etc., it is possible to form in addition to those glasses mentioned above, glasses such s as zirconium borosilicates, aluminum borosilicates, etc.

Thus, it should be apparent that one or more oxygen getterer materials can be included in a composite body to form a number of desirable compounds, such as those glasses discussed immediately above. In this regard, it is possible to design a composite body so that when a composite body is subjected to use in an oxidizing environment, a first glass, such as a low melting borosilicate glass, will form and protect the reinforcing material of the composite at low temperatures. As the temperature of the composite body is increased, it is possible to form more refractory or higher melting glasses which may result in oxidation protection at even higher service temperatures. For example, a high melting glass such as a zirconium borosilicate may extend the service life of a composite body to heretofore believed to be impossible times at elevated temperatures. It also may be necessary to provide oxidation protection at intermediate temperatures. In this regard, it may be desirable to form a glass such as an aluminum borosilicate which would bridge the gap in service temperature between, for example, the lower melting boron oxide glasses and the higher melting glasses such as zirconium borosilicate. As is apparent from the above discussion, the number of combinations of oxygen gettering materials which can form desirable glasses, which may or may not react with other materials in the composite body, is quite large.

Further, an important criteria in selecting materials which function to getter oxygen is the viscosity and oxygen permeability of the glassy material which is formed due to reaction of the oxygen gettering material with oxygen. For example, in a silicon carbide fiber reinforced aluminum oxide material, an oxygen gettering material which could be coated onto the fibers and form a glass may need to have an oxygen permeability of about $1 \times 10^{-9}$ g-$O_2$/cm$^2$ sec in order for the composite body to survive a few hours. However, if it is important for the composite body to survive thousands of hours, the oxygen permeability may need to be even lower, for example, about $1 \times 10^{-12}$ g-$O_2$/cm$^2$ sec may be necessary. It is of course apparent that oxygen permeability is a function of temperature and an artisan of ordinary skill would need to determine the precise service temperature or temperatures that a composite body would be exposed to during service to determine the best combination of oxygen gettering and glass forming materials to be used to extend the useful life of the composite body.

In general, oxygen gettering materials which form borosilicate glasses provide for relatively low temperature oxidation protection (e.g., less than about 600° C.); oxygen gettering materials which form a calcium aluminosilicate glass may provide intermediate temperature oxidation protection (e . g., about 600° C.–1200° C.); oxygen getterers that form silicate glasses may provide intermediate to high temperature oxidation protection (e.g., about 600° C.–1800° C.); oxygen gettering materials which form a zirconium silicate glass or zircon structure may provide high temperature oxidation protection (e.g., about 1200° C.–1800° C.); and oxygen gettering materials which form zirconia and silica glasses may provide for very high temperature oxidation protection (e.g., about 1800° C.–2200° C.).

Accordingly, it is apparent that a composite body can be engineered so that one or more getterer materials are included in the composite body such that one or more desirable compounds (e.g., glasses) are formed. Each of the getterer materials could react with one or more oxidants at different temperatures and form one or more desirable compounds (e.g., one or more desirable glasses) which may provide for differing amounts of oxidation protection at different temperatures. Accordingly, a composite body could be produced which contained a plurality of different oxidation protection mechanisms, wherein each oxidation protection mechanism was included to provide for desirable oxidation protection at different service temperatures of the composite body.

One exemplary manner of placing an oxidant getterer onto a reinforcing material or at least in close proximity thereto would be to dip, paint or spray an appropriate material onto at least a portion of the reinforcing material prior to matrix formation or onto at least a portion of another material which is in contact with the reinforcing material. Alternatively, or in conjunction with such coating by dipping, painting or spraying, chemical vapor deposition (CVD) or chemical vapor infiltration (CVI) techniques could be utilized to obtain one or more coatings on at least a portion of, or in a preferred embodiment, substantially all of, a reinforcing material. For example, a first coating comprising boron nitride could be deposited onto a reinforcing material by CVI. One or more oxidant getterer materials might then be applied to the boron nitride coating by dip coating, for example, the coated reinforcing material into a solution comprising, for example, the nitrates of aluminum, zirconium and/or yttrium, which dip coated reinforcing material could then be heated in a nitrogen atmosphere, for example, to convert the nitrates to nitrides. It would be desirable for such coatings to be capable of surviving any matrix formation steps as well as providing in-service oxidation protection. If necessary, one or more additional coatings comprising, for example, silicon carbide could then be applied, for example, by CVI to protect the underlying coatings and reinforcing material from chemical degradation during subsequent processing.

CVD or CVI is a particularly desirable means of placing one or more oxidant getterers in proximity to a reinforcing material. Specifically, the precise location of the oxidant getterer in relation to the reinforcing material may be highly controlled. For example, if a first coating comprising boron nitride is to be applied, an oxidant getterer comprising aluminum could be applied as aluminum nitride using CVI. Further, the aluminum nitride oxidant getterer could be applied before, during and/or after the deposition of one or more coatings to the reinforcing material to produce a coated reinforcing material having an oxidant getterer underneath, mixed within and/or on top of (e.g., exterior to) the coatings. Moreover, it may be possible to apply different oxidant getterer materials at different locations relative to the reinforcing material. For example, an artisan may choose to deposit, for example, an aluminum nitride oxidant getterer beneath a first coating comprising boron nitride and a zirconium nitride oxidant getterer on top of this first coating and/or on top of a second coating comprising silicon carbide. Still further, it may be possible to simultaneously co-deposit two or more oxidant getterer materials using CVD or CVI, such as, for example, simultaneous depositions of oxidant getterers comprising aluminum and zirconium as their respective nitrides. Depending upon conditions and choice of coating materials to be deposited, it may even be possible to simultaneously deposit the one or more of the plurality of reinforcing material coatings with the multiple oxidant getterer materials. For example, it may be possible to co-deposit aluminum nitride and zirconium nitride oxidant getterers during deposition of the boron nitride debond coating onto the reinforcing material. Finally, through careful control of the reactant gas concentrations, a graded or tailored concentration of one or more oxidant getterer materials can be achieved within either or both of the debond coating(s) and the oxidation protection coating(s).

Another means for depositing at least a silicon carbide coating onto a fiber (previously coated or uncoated) involves the thermal decomposition of an alkylchlorosilane. Specifically, a heated fiber, fiber tow, fiber weave or preform comprising an assemblage of fibers is contacted with cooled liquid alkylchlorosilane. The alkylchlorosilane thermally decomposes depositing silicon carbide or a precursor thereof onto the fiber(s). Preferably, this thermal decomposition process is conducted in an inert atmosphere. If the fiber or preform is electrically conductive, the means for heating the fiber or preform may be by electrical resistance heating. Resistance heating provides the possibility of continuing to heat the fiber or preform during its contact (typically immersion) in the alkylchlorosilane, which may comprise, for example, methyltrichlorosilane. Thus, the fiber or preform may remain immersed in the methyltrichlorosilane (MTS) until sufficient silicon carbide has been deposited. Alternatively, the deposition may be conducted as a periodic process, whereby after a heated fiber or preform is quenched into liquid MTS and an amount of silicon carbide has been deposited, the coated fiber or preform is withdrawn from the MTS bath and reheated and reimmersed into the bath for an additional deposition via thermal decomposition. Utilizing MTS as the alkylchlorosilane, heating the fiber or preform to a temperature of about 1150° C. is sufficient to effect deposition of silicon carbide.

In yet another means for depositing at least the silicon carbide coating onto a coated or uncoated fiber is by a chemical conversion of a precursor carbon coating. Specifically, exposing a carbon coating to silicon monoxide vapor may result in the chemical conversion of the carbon to silicon carbide. The rate of chemical reaction may be controlled by temperature and $CO/CO_2$ concentration ratio. In general, this chemical conversion occurs much more quickly in comparison to the time required to deposit the same thickness of silicon carbide by chemical vapor deposition. The precursor carbon layer may be deposited, for example, as pyrocarbon in a CVD process or as a polymer which is subsequently pyrolyzed.

It should be understood that the thickness of any coating which may be applied to a reinforcing material influences a number of different properties, including the mechanical properties of a composite body, at both room temperature and elevated temperatures, as well as the amount of oxidation protection afforded the reinforcing material. In general, the thickness of coatings on fibers in ceramic matrix composite bodies, where the ceramic matrix composite bodies are to be subjected to elevated temperature environments, should be from a few tenths of a micron thick to a few tens of microns in thickness and even more preferably about 0.2 to about 20 microns in thickness. Specifically, if a fibrous reinforcing material was chosen, the thickness of the coating on the fiber should be sufficient to permit fiber pull-out to occur. Thicknesses greater than a few tens of microns may result in adverse degradation of mechanical properties (e.g., a coating which is too thick may cause a failure mode to change from one which is predominantly fiber pull-out to a different failure mode which could have an overall weakening effect on the composite body), whereas thicknesses less than a few tenths of a micron may not provide for adequate oxidation protection of the underlying fibers and/or not permit fiber/matrix debonding to occur (e.g., if a thickness of coating was too thin, fibers may be bonded too strongly to the matrix thus inhibiting fiber pull-out mechanisms from occurring). Accordingly, numerous considerations need to be taken into account when selecting the thickness of one or more coatings to be placed upon a fiber reinforcement in a composite body.

In regard to forming a ceramic matrix composite body by a directed metal oxidation of a parent metal, it has been discovered that a useful filler material or strengthening component for the ceramic matrix composite body should be provided with two or more coatings. The first or inner coating is applied to the filler as a continuous film or layer, and preferably forms a bond with the filler. The second and any subsequent coatings are superimposed over an underlying coating and become attached or bonded therewith as additional layers or stratum. Each coating is applied as a substantially continuous layer, and each is in substantially continuous contact with the underlying coating or filler in the case of the first coating. The bond formed between adjacent surfaces may be weak or negligible in that there may be little or no adhesion or connection, but in the preferred embodiment there is a measurable or appreciable bonding or union between surfaces.

In a preferred embodiment of the invention, two coatings only are applied to the filler material. In such a system utilizing a duplex coating, the coatings are selected to provide adequate mismatch in bonding strengths so as to allow for debonding and pull-out upon application of stress. Also, the duplex coating is selected to provide protection against degradation of the filler, and the outer coating is selected to exhibit wettability of molten parent metal and to protect the inner coating from degradation or corrosion in high temperature, oxidizing environments under the conditions of the matrix formation process. Also, a system using two coatings rather than three or more, may be somewhat more advantageous from an economic standpoint.

Thus, the coatings are selected so as to be compatible with the filler material, and to the process conditions for the manufacture of the composites. Also, the coatings should complement each other in achieving the desired characteristics or properties. In a ceramic composite system having incorporated therein a filler with a duplex coating, for example, the first and outer coatings are selected to provide an adequate mismatch in interfacial shear strength so that one of the three zonal junctions is weak relative to the remaining zonal junctions to provide relative movement between the inner coating and the filler, or between coatings, or between the outer coating and the adjacent ceramic matrix. In this manner, debonding and pull-out will occur, thereby improving or enhancing the fracture toughness of the ceramic composite body.

Debonding and pull-out is especially beneficial for filler materials having a relatively high length to diameter ratio, such as fibers, typically at least about 2:1 and more particularly at least 3:1. Filler material with a low length to diameter ratio such as particles or spheres, characteristically exhibits crack deflection toughening.

In applying the coatings to the filler material, the thickness of each coating and the cumulative thickness of all coatings can vary over a wide range. This thickness can depend on such factors as the composition of each coating and their interaction, the type and geometry of the filler, and the process conditions and, for example, the parent metal used in the manufacture of the composite. Generally, the cumulative thickness for the coatings should be sufficient to completely cover the ceramic filler material and protect it from, for example, oxidation degradation, attack from molten metal, and other corrosive environments which may be encountered in employment of the finished composite. In the preferred embodiment, the inner coating is compatible with the filler material so as not to degrade its integrity, and further the inner coating can be selected to allow for debonding and pull-out or shear. The coating system is selected to be compatible with the matrix material, especially the precursor for the matrix, and further the coating system is selected so as to be capable of withstanding the process conditions used in the manufacture of the composites. While the inner coating may afford adequate protection against degradation of the filler or allow for shear between this first coating and the filler, a second or outer coating is selected to be compatible with the process conditions employed in the manufacture of the ceramic composite body, in that it should be substantially inert and not degrade, and further should exhibit wettability to molten parent metal when serving as a precursor to the ceramic matrix. Also, if the first coating or fiber is susceptible to attack and degradation by the process environment during composite manufacture or by attack of oxidants diffusing through the matrix during actual service, the second or outer coating is chosen to protect the inner coating or fiber from exposure to processing conditions and/or end use conditions (e.g., the inner coating may function as an oxygen getterer material alone or in combination with other components of the composite body such as other coatings or other materials in the composite body). Thus, the coating system protects the fibers from degradation, as does one coating superimposed on another, and concomitantly provides for compatibility for matrix formation and use, and for relative movement to allow for shear. By reason of this coating system, structural degradation of the composite components is mitigated thereby prolonging the useful life and performance of the composite, and the fracture toughness of the composite is improved.

If the surface of the filler is very irregular and exhibits nodules, barbs, fibrils, projections, or protuberances, the filler material can mechanically interlock or bond with the adjacent surface including the adjacent coating or adjacent filler material thereby impeding or preventing debonding and pull-out, which can be deleterious to the properties of the composite. It therefore is desirable to provide a coating system which is sufficiently thick to completely cover the irregularities in the filler.

The thickness and properties of the coatings may vary depending on the deposition process and the filler material. In a duplex coating system, the thickness for each coating, in terms of the radius, typically may range from about 0.05 to about 25 microns, preferably to about 10 microns, but the innermost coating can be monoatomic in order to separate the second coating from the filler particle. The cumulative thickness for a coating system may be to about 25 microns, and more preferably 2–10 microns. Usually a coating system having a thickness within this range can be applied to the filler by conventional or known means and will provide the desired properties described above.

It has been found that a number of coating compositions can be employed in the coating system of this invention. These compositions include the metal oxides, nitrides, borides and carbides, alkaline metal salts, alkaline earth metal salts, carbon, silicon, and the like. The choice of coating compositions will depend on the filler material, the compatibility of coatings to each other, and the process conditions for the manufacture of the ceramic composite. For example, silicon carbide fibers can be used as filler in composites made according to the processes described in the Commonly Owned Patents and Patent Applications. In order to provide for debonding and pull-out, the silicon carbide fibers may be coated with boron nitride which prevents a relatively strong bond between the coated fiber and the surrounding matrix. However, boron nitride may be degraded by the oxidation reaction conditions of the process for making the composite. Further, boron nitride may not be wet by certain metals, such as aluminum, under the conditions of the matrix formation process, and therefore as an outer coating would tend to interfere with the matrix formation. However, an inner coating exhibiting little or no wettability by parent metal under process conditions can be advantageous. For example, the coating system may have pores or flaws, but the contact angle of the molten parent metal with the inner coating may preclude transport of the parent metal through any pores or flaws in the inner coating and there by protect the filler from attack by molten metal. The presence of an additional wettable outer coating on the filler would then avoid impedance to the matrix formation process. Therefore, a suitable outer coating such as silicon carbide is applied to the boron nitride coating to achieve compatibility with the forming process and to protect the boron nitride from degradation, such as by oxidation. Silicon carbide is, for example, wet by doped aluminum and relatively oxidation-resistant in an air environment at 1000° C., where boron nitride is typically not wet by aluminum, and is oxidation-prone, at these temperatures. Further, the bond between the two coatings is weak relative to the other bonds thereby facilitating debonding and pull-out of the fibers during fracture. Other useful coating compositions include, for example, titanium carbide, silicon, calcium silicate, calcium sulfate, and carbon as the inner coating, and silicon, silica, alumina, zirconia, zirconium nitride, titanium nitride, aluminum nitride, and silicon nitride as an outer coating. Other suitable compositions for the first and outer coatings may be selected for use with the ceramic filler material provided these coatings complement each other as in the manner described above.

A typical cross-sectional representation of the coated ceramic filler material is shown in FIG. 1 (discussed below in greater detail). In this typical example, the ceramic filler material comprising silicon carbide bears a first inner coating of boron nitride and an additional outer coating of silicon carbide. One or more additional outer coatings may be provided depending on the need. For example, an additional outer coating of titanium carbide may be applied to the outer coating of silicon carbide.

Moreover, it may be desirable to provide dual or multiple duplex coatings such as boron nitride/silicon carbide/boron nitride/silicon carbide. This multiple coating scheme may result in desirable internal oxidation protection mechanisms. Specifically, as discussed above, the interface between boron nitride and silicon carbide may function as a zonal debond junction, thus increasing the fracture toughness of a material, as well as providing for oxidation protection. As discussed above, the precise composition and combination of coatings depends on a number of factors including the processing or manufacturing environment for the composite body as well as the environment into which the composite body will be placed.

Non-oxide ceramic materials tend to decompose in the presence of oxygen at elevated temperatures. This problem can be particularly acute for high surface-to-volume geometries such as that of a fiber. Whether by choice of design or by circumstances, many commercially available non-oxide ceramic fibers contain at least minor amounts of impurity materials. For example, in the case of a stabilized silicon carbide fiber such as NICALON™ fiber, the impurity materials comprise oxygen and nitrogen. These impurities can stabilize or have the effect of potentially stabilizing the NICALON™ fiber as manifested by preserving a substantial fraction of such a fiber's ambient temperature strength up to elevated temperatures. Specifically, the oxygen and/or nitrogen atoms occupy positions between microcrystalline silicon carbide grains. The effect of these impurities is to increase high temperature tensile strength and reduce high temperature creep. Nevertheless, left unprotected at elevated temperatures, NICALON™ silicon carbide fiber eventually loses a substantial portion of its original or as-fabricated tensile strength, even when the exposure is conducted in a non-oxidizing environment such as, for example, in an argon atmosphere. Concurrent with this strength loss, a mass loss from the fiber and, in particular, the oxygen and/or nitrogen impurities, has also been observed, such mass being lost through, for example, volatilization. Without wishing to be bound by any particular theory or explanation, it seems that in at least one instance this loss of the "stabilizing" impurities permits the further crystallization and growth of crystals within the fiber. The fiber then consists of an assemblage of crystallites or grains of, for example, silicon carbide, having distinct grain boundaries. If such grains continue to grow upon continued high temperature exposure of the fiber, the tensile strength of such a treated fiber may decrease with respect to the same fiber in its original form. This strength loss can be attributed, at least in part, to the development and growth of grain boundaries which may have or exhibit a strength limiting defect.

In certain circumstances, the presence of impurity atoms has the effect of stabilizing a crystal structure or stabilizing an amorphous structure under conditions in which such a structure would not normally be stable. In other circumstances, this stabilizing effect manifests itself by ameliorating the growth of the grains making up the reinforcing material which can occur when a crystalline material is maintained at elevated temperatures, specifically, temperatures which are at a substantial fraction of the material's melting point. Such grain growth typically has a deleterious effect on the strength of the fiber reinforcement and thus the component material itself because the size of strength-limiting flaws is often proportional to the grain size of a material. Thus, by stabilizing the as-fabricated small grain size of a reinforcing material at elevated temperature, strength losses may be reduced or eliminated. Impurity materials (which are typically located at grain boundaries) may serve to "pin" the grain boundaries of the grains making up the reinforcing material, thus stabilizing the reinforcing material against grain growth, and thus strength loss, at elevated temperatures. In such circumstances, it is therefore desirable to maintain the presence of such impurity materials within a reinforcing fiber. Furthermore, because some of these impurities may tend to volatilize out of certain reinforcing fibers at elevated temperatures, it may be desirable to have in place around each reinforcing fiber a coating which may serve to prevent the stabilizing impurity materials from such volatilizing.

In the case of a stabilized silicon carbide fiber such as NICALON™ fiber, a boron nitride coating has been observed to help maintain the oxygen and/or nitrogen stabilizing impurity atoms within the fiber during elevated temperature exposure of the fiber. Without wishing to be bound by any particular theory or explanation, it has been hypothesized that the nitrogen component in the boron nitride coating effectively establishes, at elevated temperature, a localized, fiber-external nitrogen atmosphere or nitrogen partial pressure. This nitrogen atmosphere or nitrogen partial pressure represents a steep concentration gradient of nitrogen across the fiber/coating interface. This concentration gradient is biased against diffusion of the nitrogen impurity out of the fiber and thereby tends to maintain the nitrogen stabilizing impurity within the fiber. Moreover, oxygen in the NICALON™ fiber, if such a fiber is left unprotected, would likewise diffuse out of the fiber, similarly resulting in a degration of the fiber's strength. With an adjacent boron nitride coating, however, the diffusing oxygen contacts the boron nitride and reacts to form a very thin (e.g., nanometers thick) coating of boron oxide at the fiber/boron nitride interface. This thin coating of boria thereby appears to inhibit further diffusion of oxygen from the fiber to the external environment for the same reason that the boron nitride coating suppresses nitrogen diffusion from the fiber. However, it would seem that application of such a diffusion barrier layer from an external source, such as CVD, would at least limit the amount of the in-situ produced boron layer needed to inhibit further oxygen diffusion from the NICALON™ fiber.

Accordingly, it may be possible to protect similarly other non-oxide ceramic reinforcing fibers from the effects of prolonged exposure at elevated temperatures by coating the fibers with coating materials having at least one element in common with either a constituent of the basic fiber material or a necessary impurity material located within the basic fiber material. Again, by creating a localized "atmosphere" of the common element around the fiber, a "back pressure" may be created which would tend to retard diffusion of that element out of the fiber. Further, it may be possible through application of the above-described concepts to improve the high temperature stability of fibers based upon oxide systems. For example, a fiber reinforcing material may comprise grains of aluminum oxide and small amounts of one or more impurity substances located at aluminum oxide grain boundaries to stabilize the aluminum oxide grains against elevated temperature grain growth. If the stabilizing impurity material tends to volatilize at these temperatures, a coating comprising at least one elemental component of the impurity material which is in sufficient proximity to such a reinforcing material may help to maintain the stabilizing impurity material within the aluminum oxide fiber.

For the embodiment of the invention directed to a single coating each of boron nitride and silicon carbide on a ceramic filler material, there exists an optimal thickness for each coating. Specifically, it has been discovered for the case of coating reinforcement materials such as fibers and, in particular, fibers comprising silicon carbide and occupying about 35 percent of the bulk volume of a preform, the thickness of the boron nitride coating which optimizes both the ambient and elevated temperature flexural strength of the resulting composite body is between about 0.2 micron and about 0.5 micron and even more preferably is about 0.3 micron. The flexural strength of the composite has been observed to decrease for boron nitride coating thicknesses below about 0.2 micron due to stressing of the composite body beyond its yield point (i.e., proportional limit). In other words, as the composite body is stressed, an insufficient number of fibers pull out of the matrix to relieve the increasing elastic strain energy. Likewise, the flexural strength has been observed to decrease in some composite bodies where the boron nitride coating thickness exceeds about 0.5 micron due to the onset of a new failure mode, specifically, for example, that of interlaminar shear. Thus, with regard to mechanical strength, there does not appear to be any benefit to applying boron nitride coatings thicker than about 0.5 micron.

There also exists an optimal range for the silicon carbide overcoat thickness. Specifically, for the above-described system comprising boron nitride and silicon carbide coated onto continuous fibers comprising silicon carbide and occupying about 35 percent of the bulk volume of a preform, the optimal thickness of the silicon carbide coating for optimizing the flexural strength of the composite has been found to be in the range from about 2.0 to 2.3 microns. More particularly, nominal silicon carbide coating thicknesses thinner than about 1.75 microns yielded composites with fracture strengths which were significantly below the fracture strength of composites having coatings of the thicknesses discussed above. Without wishing to be bound by any particular theory or explanation, this loss of strength may result from the relatively thin silicon carbide coatings inadequately protecting the underlying boron nitride and/or silicon carbide fiber reinforcement materials from chemical attack. Such chemical attack of the reinforcement materials may occur during the directed metal oxidation process which forms the matrix phase of the composite and/or during subsequent exposure of the formed composite to undesirable oxidant(s) at elevated temperatures. Likewise, nominal silicon carbide coating thicknesses greater than about 2.3 microns have also yielded flexural strength losses, perhaps due to a "canning" effect. Again, without wishing to be bound by any particular theory or explanation, silicon carbide coatings having nominal thicknesses which are greater than about 2.3 microns appear to "can" or seal-off the space within and/or between the fiber plies. This "canning" could then result in the creation of closed porosity which may prevent subsequent infiltration of oxidation reaction product into such closed porosity during the directed metal oxidation process, thereby yielding weakly bonded fiber plies, and thus mechanically weakened, composite body.

It should be understood that the so-called "nominal" fiber coating thicknesses discussed herein have been calculated from the total weight gains which the fiber preforms experience during the fiber coating process which in most cases herein refers to a chemical vapor infiltration (CVI) coating process. For boron nitride, the "actual" coating thickness as measured from photomicrographs of fiber cross-sections agrees well with the calculated values, as each fiber is coated with a relatively thin layer of boron nitride. The subsequent coating of silicon carbide, however, is relatively much thicker, and as the silicon carbide coatings build up in thickness, they come into contact with one another, as is shown in FIG. 14a, for example. This merging of individual silicon carbide coatings has the effect of decreasing the surface area available for further deposition. Hence, the actual thickness of a silicon carbide coating on those portions of a fiber where such a coating actually exists is somewhat larger than the "nominal" or "average" silicon carbide thickness calculated from weight gain values. Further, as a result of the nature of the CVI coating process, the silicon carbide coating thickness is somewhat larger for fibers in the outer preform plies than in the inner plies. Thus, for the above-described preform system comprising about 35 volume percent of approximately 15 to 20 micron diameter fibers, a nominal or calculated silicon carbide thickness of about 2.3 microns corresponds to an actual average coating thickness of about 4–6 microns. Similarly, a nominal thickness of about 1.5 microns corresponds to an actual average coating thickness of about 2 microns.

As mentioned immediately above, the nature of the CVD or CVI coating process is to deposit a thicker-than-average layer on the exterior regions of the fiber preform and a thinner-than-average layer in those zones more towards the center of the preform.

For example, depending on the permeability or "openness" of the weave and the thickness of the preform, and actual "average" SiC coating thickness of 2 microns may correspond to actual depositions ranging from about 4 microns at the preform exterior to only about 0.5 micron at the very center of the preform.

A technique has been found, however, to at least partially ameliorate this effect. Specifically, and as discussed elsewhere, when the preform is assembled as a stack of fabric plies, utilizing plies having a more "open" weave as the plies at or closest to the exterior of the preform provides the CVI or CVD reactant gases greater access to the interior regions of the preform. For example, a fiber preform may be assembled using "eight harness satin weave" (8 HSW) and 12 HSW fabric plies. Because the 12 HSW plies exhibit a "tighter" weave than do the 8 HSW plies, to make the coating thickness as uniform as possible through the preform thickness, the 8 HSW plies should be placed toward the exterior of the preform and the 12 HSW plies should be placed at the center. An artisan of ordinary skill will appreciate the many possible combinations among 12 HSW, 8 HSW and plain weave fabrics and even three-dimensionally woven fiber preforms. For example, a 3-D woven fiber preform may be sandwiched in between at least one pair of plain weave fabrics having a lower volumetric loading of reinforcement material. In general, and for all other factors being equal, the permeability or "openness" of woven fabric increases in the following order: 12 HSW, 8 HSW, 5 HSW, plain weave. The permeability of 3-D woven preforms depends upon too many other variables to allow a generalization to be made; however, for the same substance (e.g., NICALON™ fiber), the permeability of any given 3-D woven preform may be estimated visa vis that of a 2-D fabric weave by comparing the bulk densities of the respective fiber forms, in other words, by comparing the respective total porosities.

In yet another achievement of the invention, an approach for reducing the number and/or size of microcracks formed during composite formation and/or formed during composite service or use, is discussed. Microcracks, in certain instances, may be undesirable because such microcracks may permit ready access of undesirable oxidants to the reinforcement material(s) which can result in degradation of some properties of the composite body. Specifically, microcracking of a matrix material located between adjacent plies of fiber tows/bundles (e.g., silicon carbide fiber) can be reduced or possibly even eliminated by introducing into the matrix one or more materials having a relatively low coefficient of thermal expansion such as, for example, silicon carbide particulate. Thus, to practice this embodiment of the invention, an appropriate material or combination of materials could be inserted between one or more fiber tows or between fiber layers to form a preform from a combination of fibers and particulate. After formation of the preform, a ceramic matrix comprising, for example, an oxidation reaction product could be formed.

Figure 17A:
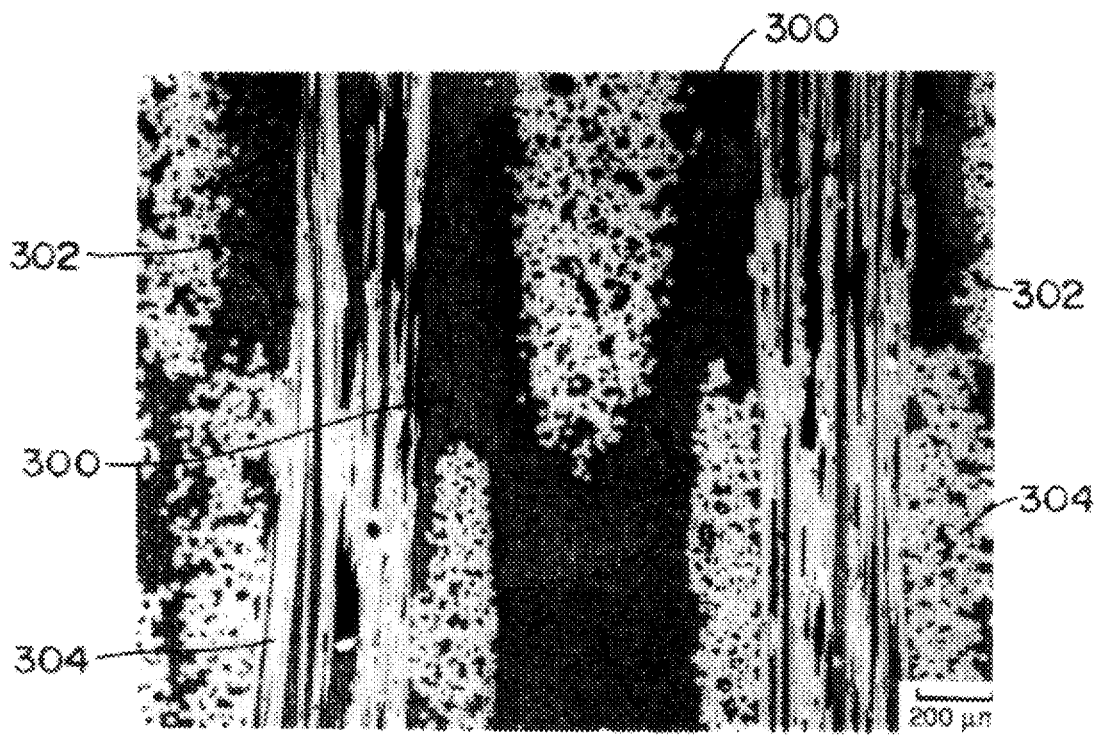
FIG. 17a is an approximately 50×magnification optical photomicrograph of a polished cross-section of a fiber reinforced ceramic matrix composite revealing the presence of several microcracks in the matrix material between adjacent NICALON™ fiber tows.

When plies or sheets of woven silicon carbide fiber tows are utilized in conjunction with an aluminum oxide matrix and more particularly where the warp yarns of adjacent plies are oriented at ninety degrees to one another, microcracks in the matrix may result. In this right angle orientation especially, there are (inevitable) regions between adjacent fiber plies substantially unoccupied by reinforcement fibers. During the directed metal oxidation process, these regions as well as any void spaces between individual fibers within a fiber tow and between individual fiber tows within a fiber ply, fill in with ceramic oxidation reaction product. It has been observed that the ceramic matrix material between adjacent fiber plies may be particularly susceptible to microcracking. FIG. 17A, for example, is an approximately 50×magnification optical photomicrograph of a polished cross-section of such a fiber reinforced ceramic matrix composite which shows several such cracks 300 within the ceramic matrix material 302 located between adjacent plies of woven tows of the reinforcement fibers 304.

Without wishing to be bound by any particular theory or explanation, microcracking of the matrix material, particularly, those portions of the matrix occupying the space between adjacent fiber plies, results from a difference or mismatch in the local thermal expansion coefficient of the composite material, specifically between the region of the composite within and between fiber plies, respectively. Accordingly, the observed matrix microcracking may occur at some point during the cooling of the infiltrated preform from the process temperatures to ambient temperature. For example, the NICALON™ silicon carbide fibers employed in fabricating the fiber plies making up the preform have a thermal expansion coefficient of about 4 ppm/°C., whereas the aluminum oxide and aluminum alloy making up the matrix material of the composite body have thermal expansion coefficients of about 8 and 23, respectively.

Several concepts have been advanced in an effort to ameliorate the adverse consequences of these matrix microcracks. In particular, it has been hypothesized that thermal expansion mismatch stresses might be reduced if the composite body were made more isotropic by, for example, reducing the difference in fiber orientation between adjacent plies from ninety degrees to thirty or forty-five degrees. Another idea has been to reduce the (largely unoccupied) space between adjacent fiber plies in the preform by using thinner plies or by clamping the assemblage of plies more tightly together during chemical vapor infiltration. In contrast to these concepts directed to reducing the amount of space between adjacent plies is the concept of filling this space with another material (e.g., a filler material) whose thermal expansion coefficient is selected such that, the local thermal expansion coefficient of the composite material between adjacent fiber plies is closer (in value) to that of the composite material within the fiber plies after such plies have been embedded with the ceramic matrix. According to this reasoning and in view of the thermal expansion coefficient of the fiber reinforcement being lower than that of the matrix, an appropriate filler material for the space between the plies could include a filler which has a thermal expansion coefficient lower than that of the matrix. One such low thermal expansion coefficient filler material which has been shown to be effective in this regard is silicon carbide. Although the morphology of the added silicon carbide which has been successfully employed (as discussed later herein) was in the form of particulates, other forms such as platelets, whiskers or chopped fibers could also be expected to work effectively.

Further, for many of the applications contemplated for the fiber reinforced composite materials of the present invention, high thermal conductivity of the composite is a desirable attribute. The presence of flaws in a material such as cracks tends to reduce the thermal conductivity of the material. Thus, a reduction in the number and/or size of microcracks in a composite body also has the desirable affect of increasing thermal conductivity. Moreover, it is possible to further increase the thermal conductivity of the body through selection of materials themselves having relatively high thermal conductivity. In this regard, the selection of silicon carbide particulate for placement as a filler material between plies of silicon carbide fiber tows is also an excellent choice because of the relatively high thermal conductivity of silicon carbide.

The filler material may be introduced between the fiber plies either before or after the CVI coating of the fiber plies. In a preferred embodiment, however, the filler materials which are introduced to the fiber plies are, at some point, CVI coated. In a particularly preferred embodiment, the filler materials are introduced between the fiber plies prior to CVI coating by means of, for example, vibration or slurry infiltration. Thus, the plies are assembled into a preform in the presence of such filler materials and the resulting preform assembly is then subsequently CVI coated such that both the fibers comprising the tows, as well as the filler material between adjacent plies of fiber tows are simultaneously coated.

Because increasing the thermal conductivity of a ceramic body reduces its susceptibility to cracking due to thermal shock, one may choose to approach the matrix microcracking problem by selecting filler materials for placement between the fiber plies, not necessarily based upon low thermal expansion coefficient, but based upon high thermal conductivity. Accordingly, even filler materials having relatively high thermal expansion coefficients such as, for example, $TiB_2$, may be gainfully employed in this way to reduce that matrix microcracking which is due to thermal shock, provided that such filler materials possess high thermal conductivity.

To further expand on this fiber reinforcement embodiment, one or more substantially non-reactive filler materials different from the fibrous filler material may be added among the fibers making up a preform (e.g., a 3-D woven fiber preform) or between the layers of fabric making up a preform. Provided that sufficient fiber loading remains to accomplish their purpose (e.g., composite toughening), a wide variety of other filler materials may be added to tailor a host of desired properties, for example, bulk density, thermal conductivity, wear resistance, ballistic performance, etc.

For example, once the required toughness has been met by providing a certain volumetric loading of de-bondable fibers, one or more other properties may be tailored through the addition of a different filler material. For example, it may be desirable to improve the hardness of the composite material through addition of hard filler materials such as silicon carbide, boron carbide, the transition metal carbides, titanium diboride and/or boron carbide.

One convenient method for adding such additional filler materials is by means of slurry infiltration or impregnation. Specifically, the different filler material may be provided in whisker or particulate form and dispersed in water, an organic solvent or a preceramic polymer such as CERASET™ SN ceramer (Lanxide Performance Materials, Newark, Del.) to make a slurry. The slurry could then be painted, sprayed or poured onto fabric plies of the fibrous reinforcement. Alternatively, the fabric plies or 3-D fibrous preforms could be dipped into the slurry. Optionally, pressure or vacuum could be administered to assist the infiltration of the slurry into the void space between the fibers. The slurry infiltrated fibrous preform or fabric plies (once assembled into the desired shape of the final self-supporting body) would then be heated to a modest temperature sufficient to remove volatiles or cure any polymeric components.

It should be understood that while this disclosure relates primarily to matrices which are formed by directed metal oxidation, the concepts disclosed should be applicable to other matrix processing systems such as sintering, hot pressing or other infiltration techniques employed to produce glass (e.g., "Black Glass" or "Comp Glass"), metal, polymer or other ceramic matrices.

The first and outer coatings, typically, are deposited onto the ceramic filler material by conventional or known means such as chemical vapor deposition, plasma spraying, physical vapor deposition, plating techniques, sputtering or sol-gel processing. Achievement of a substantially uniform coating system according to these prior art techniques is within the level of skill in this art. For example, chemical vapor deposition of a uniform coating of boron nitride on ceramic filler materials can be achieved by using boron trifluoride and ammonia at a temperature of about 1000°–1500° C. and a reduced pressure of 1–100 torr; boron trichloride and ammonia at a temperature of 600°–1200° C. and reduced pressure of 0.1–100 torr; borazine at a temperature of 300°–650° C. and a reduced pressure of 0.1–1 torr; or diborane and ammonia at a temperature of 600°–1250° C. and a reduced pressure of 0.1–1 torr. A coating of silicon carbide by chemical vapor deposition can be accomplished, for example, by using methyltrichlorosilane at a temperature of 800°–1500° C. and a pressure of 1–760 torr; dimethyldichlorosilane at a temperature of 600°–1300° C. and a reduced pressure of 1–100 torr; and silicon tetrachloride and methane at a temperature of 900°–1400° C. and a reduced pressure of 1–100 torr.

It should be understood that various combinations of ceramic materials with first and outer coatings may be produced depending on the specific properties desired in the coated ceramic material and its ultimate application. A possible combination includes silicon carbide fiber with a first layer of titanium carbide and an additional outer layer of silicon nitride. Another coating system includes silicon carbide fiber with a first coating of boron nitride and additional outer coatings of silicon carbide and alumina.

The coated ceramic materials employed in the ceramic matrix composites of the invention are chosen so that debonding and pull-out may be achieved. Thus, the coated fibers are chosen so that the interfacial shear strength between the ceramic filler material and the first coating is sufficiently different from the interfacial shear strength between the first coating and the additional outer coating or between the outermost coating and the ceramic matrix to permit relative movement between the surfaces and allow for debonding and pull-out.

In the manufacture of ceramic matrix composites according to this embodiment of the invention, the coated materials may be provided in the form of a loose mass or may be laid up into a porous preform of any desired configuration. The parent metal is placed adjacent the preform. The parent metal is then heated in the presence of an oxidant to above its melting point whereby the molten metal oxidizes to form and develop an oxidation reaction product embedding the coated ceramic material. During growth of the oxidation reaction product, the molten parent metal is transported through its own otherwise impervious oxidation reaction product, thus exposing free metal to the oxidizing atmosphere to yield additional reaction product. The result of this process is the progressive growth of an interconnected ceramic oxidation reaction product which optionally may contain nonoxidized parent metal.

A variety of ceramic matrices may be produced by the oxidation reaction of parent metals depending upon the choice of parent metal and oxidant. For example, ceramic matrices may include oxides, nitrides, borides, or carbides of such parent metals as aluminum, titanium, tin, zirconium or hafnium. The ceramic matrix composites of the invention may comprise, by volume, 5 to 85% of the coated ceramic filler materials and 95 to 15% of ceramic matrix. A useful composite comprises an alumina matrix formed by the oxidation reaction of aluminum parent metal in air, or an aluminum nitride matrix by oxidation reaction (i.e., nitridation) of aluminum in nitrogen, and incorporating as a reinforcing filler such materials as alumina, silicon carbide, silicon nitride, etc., bearing the coating system. Another useful composite comprises an aluminum boride matrix formed by the reactive infiltration of a bed comprising a boron source (e.g. boron or a reducible metal boride) and a reinforcing filler bearing the coating system.

The following examples illustrate certain aspects and advantages of various embodiments of the invention.

EXAMPLE 1

Two fiber-reinforced alumina-matrix ceramic composite bodies were fabricated in accordance with the present invention. The fibers employed were NICALON™ ceramic grade silicon carbide as Si—C—O—N (from Nippon Carbon Co., Ltd., Japan) measuring approximately 2 inches long and approximately 10–20 μm in diameter. Each fiber was coated via chemical vapor deposition with a duplex coating. The duplex coating comprised a 0.2–0.5 μm thick first coating of boron nitride applied directly to the fiber, and a 1.5–2.0 μm thick second (outer) coating of silicon carbide applied to the boron nitride coating.

The duplex coated fibers were gathered into bundles, each containing 500 fibers tied with a single fiber tow. Two, 2 inch square by ½ inch thick bars of aluminum alloy designated 380.1 (from Belmont Metals, having a nominally identified composition by weight of 8–8.5% Si, 2–3% Zn, and 0.1% Mg as active dopants, and 3.5% Cu, as well as Fe, Mn, and Ni, but the actual Mg content was sometimes higher as in the range of 0.17–0.18%) were placed into a bed of Wollastonite (a mineral calcium silicate, FP grade, from Nyco, Inc.) contained in a refractory crucible such that a 2 inch square face of each bar was exposed to the atmosphere and substantially flush with the bed, while the remainder of each bar was submerged beneath the surface of the bed. A thin layer of silica sand was dispersed over the exposed surface of each bar to serve as an additional dopant. Three of the above-described bundles of duplex-coated fibers were placed on top of each of the two sand-layered metal surfaces, and these set-ups were covered with Wollastonite.

The crucible with its contents was placed in a furnace which was supplied with oxygen at a flow rate of 500 cc/min. The furnace temperature was raised to 1000° C. at a rate of 200° C./hour, and held at 1000° C. for 54 hours.

The crucible was then removed while the furnace temperature was at 1000° C., and allowed to cool to room temperature. The ceramic composite products were recovered. Examination of the two ceramic composite products showed that an alumina ceramic matrix, resulting from oxidation of aluminum, had infiltrated and embedded the fiber bundles.

Figure 2:
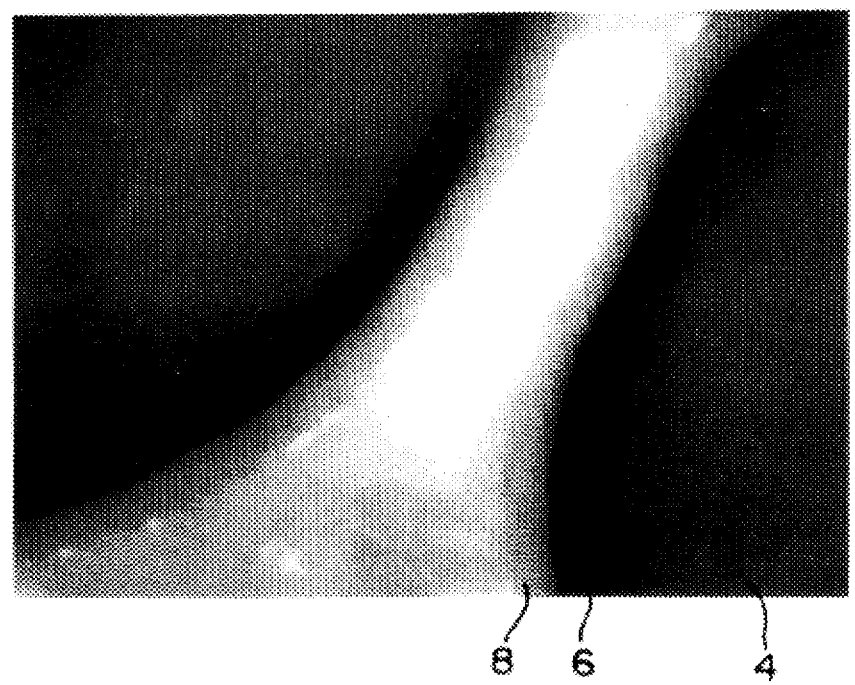
FIG. 2 is a scanning electron micrograph taken at about 850×magnification of ceramic matrix composite having a coated NICALON™ ceramic fiber as filler material and made according to the Example below.
Figure 3:
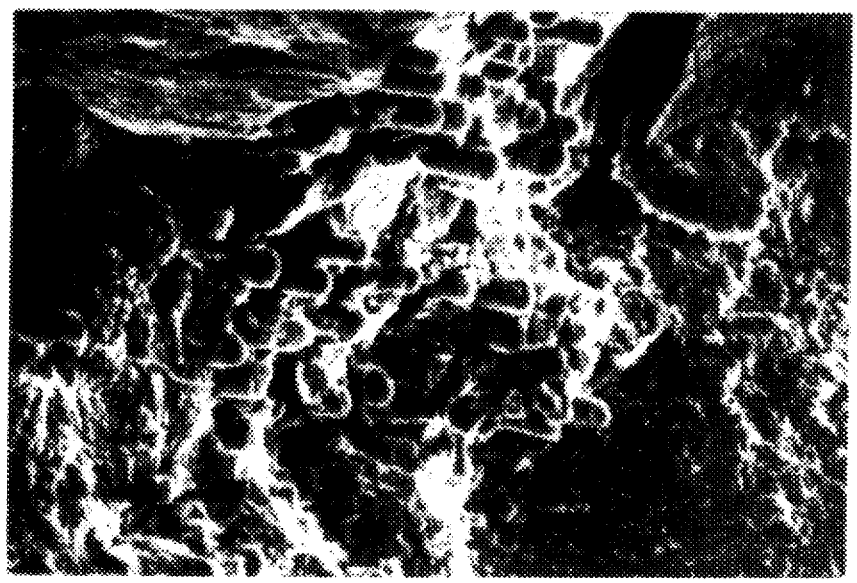
FIG. 3 is a scanning electron micrograph taken at 250× magnification of a fractured surface of the composite made with the coated fibers according to the Example below showing extensive pull-out of the fibers.

Two specimens were machined from each of the two ceramic composite products. FIGS. 1 and 2 are scanning electron micrographs at about 350×magnification and about 850×magnification, respectively, showing this ceramic matrix composite. Referring to the micrographs, there is shown the alumina matrix 2 incorporating silicon carbide fibers 4 bearing a first inner coating 6 of boron nitride and an outer coating 8 of silicon carbide. One machined specimen from each composite product was tested for flexural strength (Sintec strength testing machine, Model CITS 2000/6, from Systems Integrated Technology Inc., Stoughton, Mass.) in 4 point bend with a 12.67 mm upper span and a 28.55 mm lower span. The values obtained were 448 and 279 MPa. The remaining specimen from each product was tested for Chevron notch fracture toughness, and the values obtained were 19 and 17 MPa-m$^{1/2}$, respectively. FIG. 3 is a scanning electron micrograph at 250× magnification of the fractured surface of the ceramic composite showing extensive pull-out of the fibers.

Figure 4:
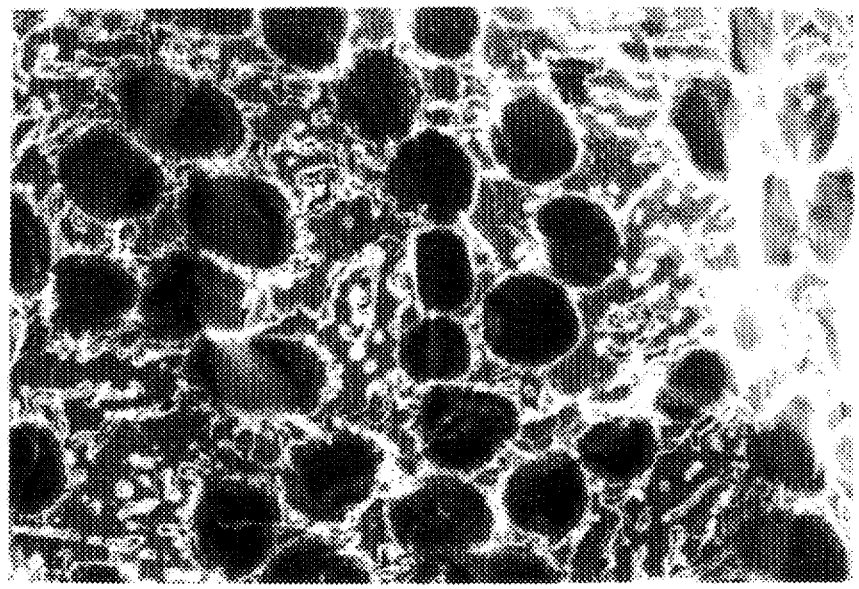
FIG. 4 is a scanning electron micrograph taken at 800× magnification of a fractured surface of the composite made with uncoated fibers according to the Example below showing no pull-out of the fibers.

This run was repeated with the exception that the NICALON™ fibers were not coated. FIG. 4 is a scanning electron micrograph at 800×magnification of the fractured surface showing essentially no pull-out of the fibers. Typical values for strength ranged from 100–230 MPa, and for toughness ranged from 5–6 MPa-m$^{1/2}$.

The utility of coated filler material made according to the invention is clearly demonstrated by this Example and the comparative data.

EXAMPLE 2

The following Example demonstrates a method for forming a fiber reinforced ceramic composite body and the resultant mechanical properties of the body from about room temperature to about 1400° C. Specifically, this Example demonstrates a method for forming a silicon carbide fiber reinforced alumina composite body wherein the silicon carbide fibers are coated with a first layer of boron nitride and a second layer of silicon carbide to create a debond zone between the silicon carbide fiber and the alumina matrix.

Figure 5A:
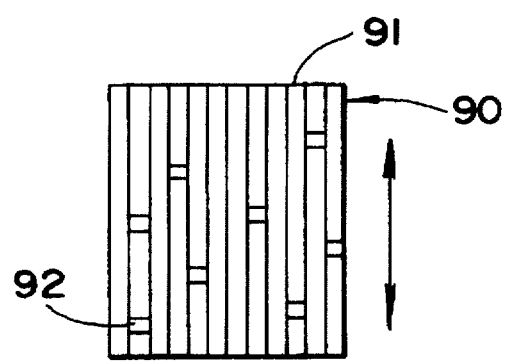
FIG. 5a is a schematic of the top view of harness satin weave fabric in the as-is position as discussed in Example 2.
Figure 5B:
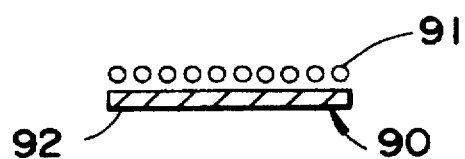
FIG. 5b is a schematic cross-sectional representation of a harness satin weave fabric in the as-is position as discussed in Example 2.
Figure 5C:
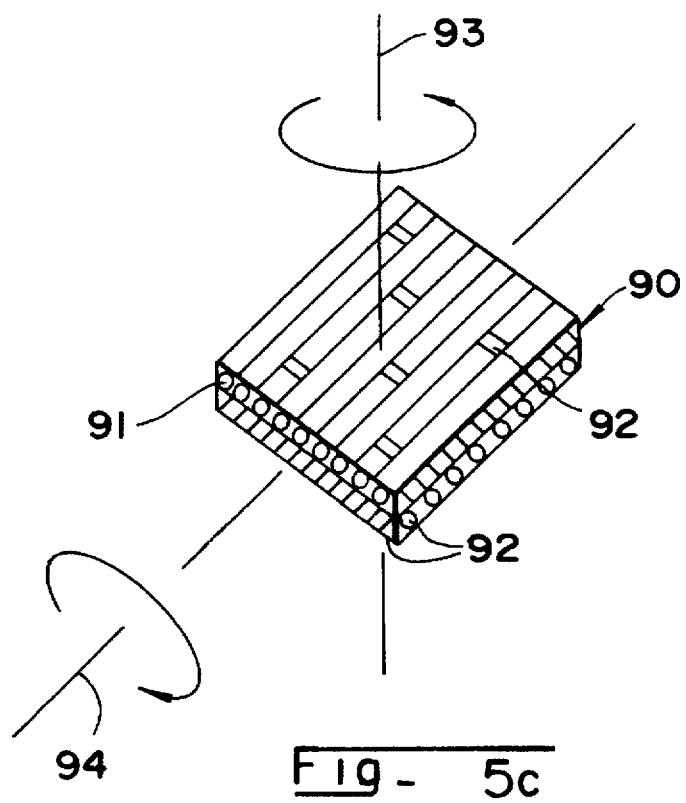
FIG. 5c is an isometric schematic view illustrating the axes of rotation for a harness satin weave fabric in the as-is position as discussed in Example 2.
Figure 5D:
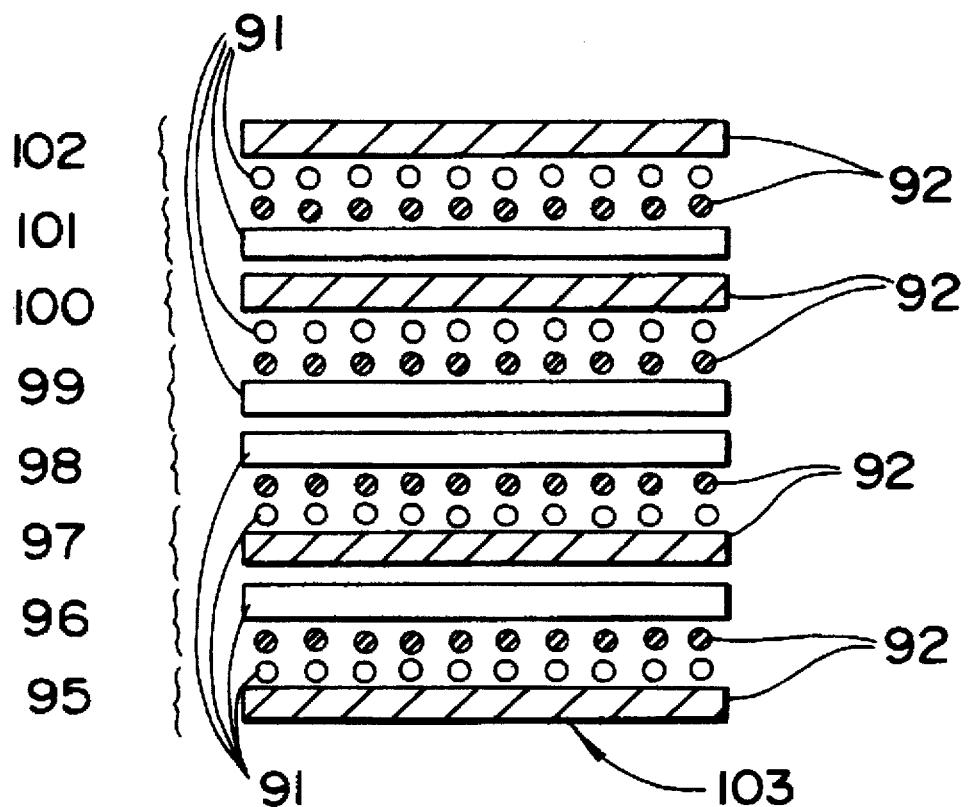
FIG. 5d is a schematic cross-sectional representation of a fabric preform comprised of harness satin fabric as discussed in Example 2.

A fabric preform 103 was made by stacking a plurality of layers of 8 harness satin weave (8 HSW) fabric and 12 harness satin weave (12 HSW) fabric made from NICA-LON™ silicon carbide fiber (obtained from Dow Corning Corporation, Midland, Mich.) on top of each other. FIGS. 5a and 5b are schematics depicting a top view and a cross-sectional view respectively of the as-is position for a HSW fabric. In reference to FIG. 5a and 5b, a HSW fabric is designated to be in the "as-is position" when, as viewed in cross-section, the axes of the warp yarns 92 of the fabric 90 are in the plane of the cross-sectional view and are located at the bottom (i.e., as shown in the cross-sectional view) of the fabric 90 and the axes of the fill yarns 91 are perpendicular to the plane of the cross-sectional view and are located at the top of the fabric 90. The orientation of additional fabric layers can be described in reference to the as-is position. For example, as depicted in FIG. 5c, additional fabric layers can be (1) rotated about an axis 93 perpendicular to the plane of the fabric 90 and/or (2) rotated about an axis 94 perpendicular to the plane of the cross-section of the fabric 90 and then subsequently contacted or layered upon a fiber layer positioned in the as-is configuration. Thus, for example, as schematically depicted in cross-section in FIG. 5d, a substantially square fabric preform 103 can be made from 8 pieces of HSW fabric, stacked in the following sequence:

A first fabric layer 95 comprising an 8 HSW fabric was placed on a supporting surface in the as-is position to start the fabric preform 103;

A second fabric layer 96 comprising a 12 HSW fabric, was rotated about 90° in the counterclockwise direction from the as-is position about an axis 93 perpendicular to the plane of the fabric and was placed on the first fabric layer 95 so that the edges of the second fabric layer 96 were substantially aligned with the edges of the first fabric layer 95;

A third fabric layer 97 comprising a 12 HSW fabric, in the as-is position, was placed on the second fabric layer 96 so the edges of the third fabric layer 97 were substantially aligned with the edges of the second fabric layer 96;

A fourth fabric layer 98 comprising a 12 HSW fabric, was rotated about 90° in the counterclockwise direction from the as-is position about an axis 93 perpendicular to the plane of the fabric and was placed on the third fabric layer 97 so that the edges of the fourth fabric layer 98 were substantially aligned with the edges of the third fabric layer 97;

A fifth fabric layer 99 comprising a 12 HSW fabric, was rotated about 90° in the counterclockwise direction from the as-is position about an axis 93 perpendicular to the plane of the fabric and then rotated about 180° in the clockwise direction about an axis 94 perpendicular to the plane of the cross-sectional view of the fabric and was placed on the fourth fabric layer 98 so that the edges of the fifth fabric layer 99 substantially aligned with the edges of the fourth fabric layer 98;

A sixth fabric layer 100 comprising a 12 HSW fabric, was rotated about 180° in the clockwise direction from the as-is position about an axis 94 perpendicular to the plane of the cross-sectional view of the fabric and was placed on the fifth fabric layer 99 so that the edges of the sixth fabric layer 100 were substantially aligned with the edges of the fifth fabric layer 99;

A seventh fabric layer 101 comprising a 12 HSW fabric, was rotated about 90° in the counterclockwise direction from the as-is position about an axis 93 perpendicular to the plane of the fabric and then rotated about 180° in the clockwise direction about an axis 94 perpendicular to the plane of the cross-sectional view of the fabric and was placed on the sixth fabric layer 100 so that the edges of the seventh fabric layer 101 were substantially aligned with the edges of the sixth fabric layer 100; and Finally, an eighth fabric layer 102 comprising an 8 HSW fabric, was rotated about 180° in the clockwise direction from the as-is position about an axis perpendicular 94 to the plane of the cross-sectional view of the fabric and was placed on the seventh fabric layer 101 so that the edges of the eighth fabric layer 102 were substantially aligned with the edges of the seventh fabric layer.

In reference to FIG. 5e, the fabric preform 103 comprised of the two 8 HSW outer fabric layers and the six 12 HSW inner fabric layers and measuring about 6.75 inch (171 mm) square and about 0.125 inch (3.2 mm) thick was placed on a perforated graphite plate 104 machined from Grade AXF-5Q graphite (Poco Graphite, Inc., Decatur, Tex.) which measured about 7.75 inches (197 mm) square and about 0.5 inch (13 mm) thick. The inner perforated region 105 of the perforated plate measured about 6.25 inches (159 mm) square. The holes 106 of the perforated region 105 had a diameter of about 0.25 inch (6.4 mm) and a center-to-center spacing of about 0.375 inch (9.5 mm) and comprised a 17 hole×17 hole array which was bordered by an about 1 inch (25 mm) unperforated region. After the fabric preform 103 had been placed on the first graphite plate 104, a second graphite plate 104, substantially the same as the first, was placed over the fabric preform 103 and the plates were clamped using C-clamps to compress the fabric preform 103. Two graphite channel members 107 machined from Grade AXF-5Q graphite (Poco Graphite, Inc., Decatur, Tex.) and measuring about 7.75 inches (197 mm) long were placed over common ends of both perforated graphite plates 104 so as to contact opposite ends of the first and second perforated graphite plates 104 thereby creating a preform containment fixture 108. FIG. 5e is an isometric schematic view of the preform containment fixture 108. After the graphite channels 107 were secured to the perforated plates 104, the C-clamps were removed from the perforated plates 104 and the elastic force exerted by the compressed fabric preform 103 biased the perforated graphite plates 104 against the graphite channel members 107 to form a relatively rigid preform containment fixture 108. The warp yarns 92 of the eighth layer 102 of the fabric preform 103 within the graphite containment fixture 108 were positioned so as to be parallel to the length of the graphite channel members 107 of the preform containment fixture 108.

The graphite containment fixture 108 containing the fabric preform 103 was placed into a reactor chamber of a chemical vapor infiltration apparatus having an outer diameter of about 12 inches (305 mm). The inner diameter of the reactor chamber measured about 9.45 inches (240 mm) after being lined with a quartz tube having a wall thickness of about 0.5 inch (13 mm) and lined with a graphite tube having a wall thickness of about 0.25 inch (6.4 mm). The warp yarns 92 of the eighth layer 102 of the fabric preform 103 were parallel to the gas flow direction within the chamber as well as being parallel to the longitudinal axis of the reactor chamber. The reactor chamber was closed and evacuated to about 0.004 inch (0.1 mm) of mercury (Hg). Then the reactor chamber was heated to about 800° C. at about 10° C. per minute so that the contents of the reactor chamber were at about 730° C., as indicated by a thermocouple contained therein. When the temperature within the reactor chamber reached about 730° C., a gas mixture comprised of ammonia ($NH_3$) flowing at about 1200 standard cubic centimeters (sccm) and boron chloride ($BCl_3$) flowing at about 800 sccm was introduced into the reactor chamber while maintaining a total operating pressure of from about 0.047 to about 0.051 inches of mercury (about 1.2 to about 1.3 mm Hg). After about 6.5 hours at about 730° C., the gas mixture flowing into the reactor chamber was interrupted, the power to the furnace heating the reactor chamber was interrupted, and the furnace and its contents were naturally cooled to about 200° C. At about 200° C., the reactor chamber door was opened and the graphite containment fixture 108 was removed, cooled and disassembled to reveal that the fibers of the fabric layers of the fabric preform 103 were coated and that the fabric layers comprising the fabric preform 103 were bonded together by a boron nitride coating formed during the process at about 730° C., thereby forming a coated and bonded fabric preform 109. The boron nitride coating had a thickness of about 0.4 microns.

The boron nitride coated and bonded fabric preform 109 was then suspended from a graphite cantilever support fixture 110 made from Grade AXF-5Q graphite (Poco Graphite, Inc., Decatur, Tex.) by wires 111 comprised of a Kanthal® iron-chromium-aluminum alloy all of which are depicted schematically in FIG. 5f. The graphite cantilever support fixture 110 and the boron nitride bonded fabric preform 109 were then replaced into the reactor chamber of the chemical vapor infiltration apparatus discussed above such that the warp yarns 92 of the eighth layer 102 comprised of the 8 harness satin weave fabric were parallel to the gas flow direction within the chamber as well as being parallel to the longitudinal axis of the reactor chamber. After the reactor chamber door was closed, the reactor chamber and its contents were evacuated to about 0.591 inches (15 mm Hg) and hydrogen gas flowing at about 2500 sccm was introduced into the reactor chamber. The reactor chamber was heated at about 10° C. per minute so that the contents of the reactor chamber were at about 925° C. as indicated by a thermocouple therein. When the reactor chamber contents were at about 925° C., additional hydrogen, flowing at about 2500 sccm, was introduced into the reactor chamber to give a total hydrogen gas flow rate of about 5000 sccm. Once the temperature of the contents of the reactor chamber had substantially completely stabilized at about 925° C., about 2500 sccm hydrogen were diverted away from direct entry into the reactor chamber, and were first bubbled through a bath of trichloromethylsilane ($CH_3SiCl_3$) also known as methyltrichlorolsilane (MTS) (Hulls/Petrarch System, Bristol, Pa.), maintained at about 25° C., before entering the reactor chamber. After about 26 hours at about 925° C., the power to the furnace heating the reactor chamber was interrupted and the about 2500 sccm hydrogen that was being directed through the MTS bath was again permitted to flow directly into the reactor chamber to re-establish a direct hydrogen gas flow rate of about 5000 sccm into the reactor chamber. It was noted that about 4.75 liters of MTS had been consumed during the 26 hour of the run at about 925° C. After about a half hour during which a hydrogen gas flow rate at about 5000 sccm was maintained, the hydrogen flow rate was interrupted and the furnace and its contents were evacuated to about 0.039 inches 0.1 mm of mercury (Hg). The pressure within the reactor chamber was then allowed to increase to about atmospheric pressure while argon was introduced at a flow rate of about 14 liters per minute. After the reaction chamber had cooled to a temperature of about 200° C., the argon flow rate was interrupted and the reaction chamber door was opened. The graphite cantilever support fixture 110 and the fabric preform were removed from the reactor chamber to reveal that the boron nitride bonded fabric preform 109 had been coated with a second layer of silicon carbide thereby forming a silicon carbide (SiC)/boron nitride (BN)-coated fabric preform 112. The silicon carbide had an overall average thickness of about 2.3 microns, as calculated from the weight gain of the preform during the silicon carbide coating procedure, as alluded to previously.

A wax box pattern having a closed end and outer dimensions of about 7 inches (178 mm) square by about 2 inches (51 mm) tall and a wall thickness of about 0.25 inches (6.5 mm) was assembled from high temperature wax sheet (Kit Collins Company, Cleveland, Ohio) which contained adhesive backing on one side thereof. The wax box pattern was assembled by using a hot wax knife. The closed end of the wax pattern was beveled at an angle of about 22°. A slurry mixture comprised by weight of about 5 parts BLUONIC® A colloidal alumina (Buntrock Industries, Lively, Va.) and about 2 parts –325 mesh (average particle diameter less than about 45 μm) wollastonite (a calcium silicate mineral) was made by hand mixing the materials together. The slurry mixture was then painted onto the outer surface of the wax box pattern with a one inch sponge brush and wollastonite powder (–10, +100 mesh) having substantially all particles between about 150 and 2000 microns in diameter was sprinkled liberally onto the slurry mixture coating to prevent runoff and to form a first precursor layer of a shell 120. This procedure was repeated to build additional layers of coating with an about 0.5 hour drying period between the formation of the precursor layers. When enough precursor layers of slurry mixture/coarse wollastonite were formed to produce a thickness of about 0.25 inch (6.4 mm), the coated wax box pattern was set aside to dry at about room temperature for about 24 hours. The about 0.25 inch (6.4 mm) thick coating nominally comprised about 12 slurry mixture/coarse wollastonite layers. After the coated wax box pattern had substantially completely dried at about room temperature, the wax box pattern was placed into an air atmosphere furnace maintained under an exhaust hood and the furnace and its contents were held at a temperature of about 120° C. for about 6 hours, during which time the wax melted leaving behind an unfired precursor to an alumina bonded wollastonite shell 120. The furnace and its contents were then heated to about 950° C. in about 2 hours and held at about 950° for about 4 hours to substantially completely remove any residual wax and ensure the sintering of the alumina bonded wollastonite shell. The furnace and its contents were then cooled to about room temperature.

Figure 5G:
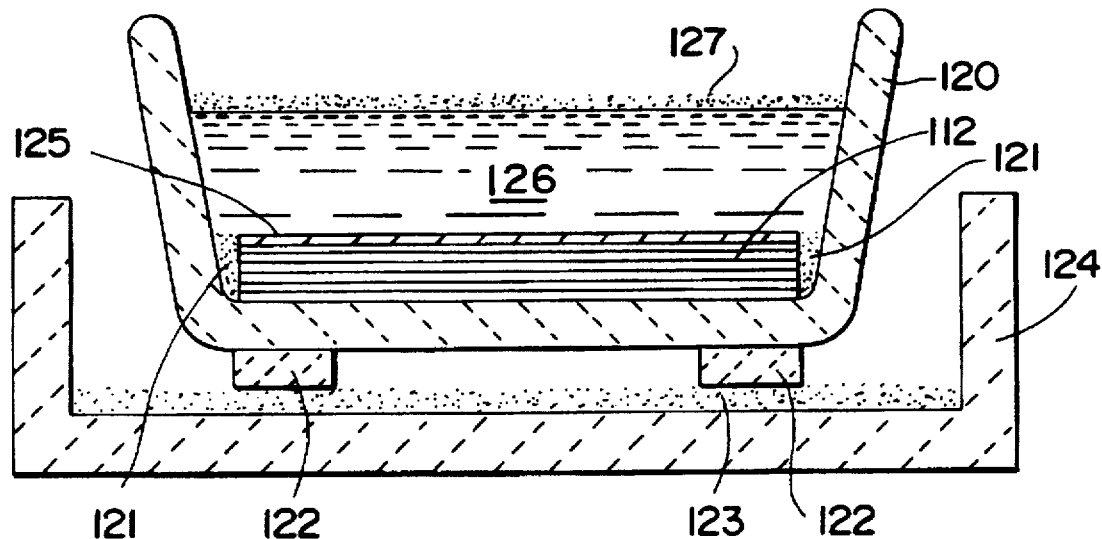
FIG. 5g is a schematic cross-sectional representation of a growth lay-up for forming a fiber reinforced ceramic composite body as discussed in Example 2.

About 40 grams of VASELINE® petroleum jelly vehicle (Cheeseborough Ponds, Inc., Greenwich, Conn.) were melted in a small aluminum weighing dish on a hot plate set at about medium heat until the jelly turned to a liquid. A clean sable brush was then used to substantially completely coat one of the 6.75 inch (171 mm) square surfaces of the SiC/BN-coated fabric preform 112 to provide an interface for the application of a nickel oxide powder. A mixture comprising about 8 grams of –325 mesh (particle diameter less than about 45 μm) nickel oxide powder and about 16 grams of ethanol was applied with a sponge brush to substantially completely cover the petroleum jelly coated surface of the SiC/BN-coated fabric preform. After the ethanol had substantially completely evaporated, the SiC/BN-coated fabric preform 112 was inserted into the alumina bonded wollastonite shell 120 such that the uncoated side of the SiC/BN-coated preform 112 not coated with the nickel oxide powder contacted the bottom of the shell 120, as shown in FIG. 5g. The spaces between the perimeter of the SiC/BN-coated fabric preform 112 and the walls of the alumina bonded wollastonite shell 120 were filled with coarse (−10, +100 mesh) wollastonite until the surface of the wollastonite powder was substantially flush with the nickel oxide powder-coated surface of the SiC/BN-coated fabric preform 112. The alumina bonded wollastonite shell 120 containing the SiC/BN-coated fabric preform 112 was then placed onto stilts 122, which were made from fire brick, and was thereafter surrounded by wollastonite powder 123 which was contained in a refractory boat 124. The SiC/BN-coated fabric preform 112 was then leveled. About 1600 grams of a parent metal was distributed into four 30 gram clay crucibles (obtained from J. H. Berge, Inc., South Plainfield, N.J.) in amounts of about 400 grams per crucible. The parent metal comprised by weight of about 8.5 to 11.0 percent silicon, 3.0 to 4.0 percent copper, 2.7 to 3.5 percent zinc, 0.2 to 0.3 percent magnesium, ≤0.01 percent calcium, ≤0.10 percent titanium, 0.7 to 1.0 percent iron, ≤0.5 percent nickel, ≤0.5 percent manganese, ≤0.35 percent tin, ≤0.001 percent beryllium, ≤0.15 percent lead and the balance aluminum. The refractory boat 124 and its contents, as well as the four 30 gram clay crucibles containing the parent metal, were placed into an air atmosphere furnace and the furnace door was closed. The furnace and its contents were then heated from about room temperature to about 700° C. at about 400° C. per hour, during which time the VASELINE® petroleum jelly volatilized and the nickel oxide powder 125 fell onto the surface of the SiC/BN-coated fabric preform 112. After about an hour at about 700° C., during which time the parent metal 126 had substantially completely melted, the parent metal 126 was then poured into the alumina bonded wollastonite shell 120 and onto the nickel oxide powder-coated side of the SiC/BN-coated fabric preform 112, thereby covering the surface of the preform 112. Wollastonite powder 127 was then poured onto the surface of the molten parent metal 126 within the alumina bonded wollastonite shell 120 to substantially completely cover the surface of the molten parent metal. This assembly formed the lay-up for growth of a ceramic matrix composite body. The furnace and its contents comprising the lay-up were then heated to about 950° C. in about an hour. After about 90 hours at about 950° C., the furnace and its contents were cooled to about 700° C. in about 2 hours. At about 700° C., the lay-up was removed from the furnace and residual molten parent metal was decanted from the alumina bonded wollastonite shell 120, the shell 120 was quickly broken away from the SiC/BN-coated fabric preform 112 and the preform 112 was buried in a silica sand bed to cool the preform 112 to about room temperature. At about room temperature, it was observed that an oxidation reaction product had grown into and substantially completely embedded the SiC/BN-coated fabric preform 112, thereby forming a fiber reinforced ceramic composite body 130 having a plurality of fabric layers comprised of harness satin weaves. Specifically, the fiber reinforced ceramic composite body 130 comprised two outer layers of 8 harness satin weave silicon carbide fabric and six inner layers of 12 harness satin weave silicon carbide fabric embedded by an aluminum oxide oxidation product. The composite body also comprised a metallic constituent comprising residual unreacted parent metal.

Once the ceramic composite body had been manufactured, the metal removal process of the present invention was begun. The first step of the metal removal process was to form a filler material mixture for infiltration by metal contained in the formed ceramic matrix composite body.

Specifically, filler material mixture comprising by weight of about 90 percent E67 1000 grit (average particle diameter of about 5 μm) alumina (Norton Co., Worcester, Mass.) and about 10 percent −325 mesh (particle diameter less than about 45 μm) magnesium powder (Reade Manufacturing Company, Lakehurst, N.J.) was prepared in a one gallon NALGENE™ wide mouth plastic container (Nalge Co., Rochester, N.Y.). Alumina milling balls were added to the filler material mixture in the plastic container and the container lid was closed. The plastic container and its contents were placed on a jar mill for about 4 hours to mix the alumina and magnesium powders together. After the alumina mixing balls had been separated from the alumina-magnesium filler material mixture 131, the filler material mixture 131 was complete.

Figure 5H:
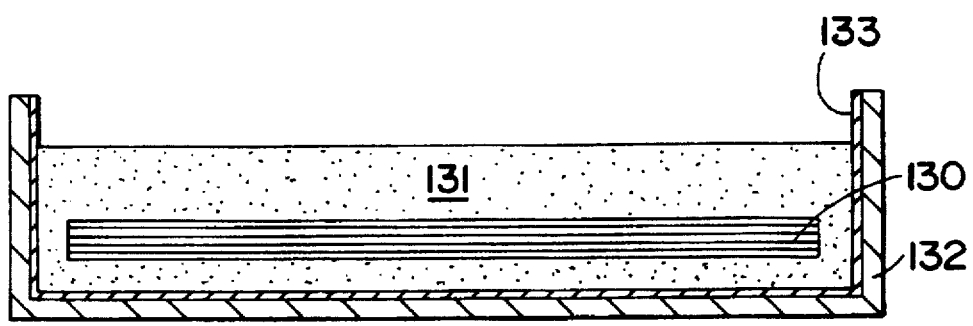
FIG. 5h is a schematic cross-sectional representation of a lay-up for removing the metallic component of the formed fiber reinforced ceramic composite body discussed in Example 2.

A stainless steel boat 132 measuring about 7 inches (179 mm) square by about 2 inches (50.8 mm) deep and having a wall thickness of about 0.063 inches (1.6 mm) was lined with a graphite foil box 133 made from a piece of GRAFOIL® graphite foil (Union Carbide Corp., Carbon Products Division, Cleveland, Ohio). About 1 inch (25 mm) of the filler material mixture 131 was hand packed into the bottom of the graphite foil lined stainless steel boat 132. The fiber reinforced ceramic composite body 130 was then placed onto and forced into the filler material mixture 131. Additional filler material mixture 131 was then poured over the fiber reinforced ceramic composite body 130 to substantially completely cover it. The filler material mixture 13 1 was then hand packed to ensure good contact between the filler material mixture 131 and the fiber reinforced ceramic composite body 130, thereby forming a metal removal lay-up as depicted schematically in cross-section in FIG. 5h.

The metal removal lay-up comprising the stainless steel boat 132 and its contents was then placed into a resistance heated controlled atmosphere furnace and the furnace chamber door was closed. The furnace chamber and its contents were first evacuated to at least 30 inches (762 mm) of mercury (Hg) vacuum, then the vacuum pump was disconnected from the furnace chamber and nitrogen was introduced into the chamber to establish about atmospheric pressure of nitrogen in the chamber. This operation was repeated. After the pressure in the furnace chamber reached about atmospheric pressure, the furnace chamber and its contents were heated from about room temperature to about 750° C. at a rate of about 250° C. per hour and held at about 750° C. for about 5 hours and cooled from about 750° C. to about 300° C. at about 200° C. per hour with a nitrogen gas flow rate of about 4000 sccm being maintained throughout the heating and cooling. At about 300° C., the nitrogen flow was interrupted, the furnace door was opened, and the stainless steel boat and its contents were removed and cooled by forced convection. At about room temperature, the filler material 131 was separated from the fiber reinforced ceramic composite body 130 and it was noted that the metallic constituent of the fiber reinforced ceramic composite body 130 had been substantially completely removed. The fiber reinforced ceramic composite body 130 was then subjected to grit blasting by a sand blaster which operated with a working pressure of about 75 pounds per square inch to remove any excess filler material that had adhered to the surface of the composite body 130. The fiber reinforced ceramic composite body was then cut with a diamond saw and machined into mechanical test specimens measuring about 2.4 inches (60 mm) long by about 0.2 inch (6 mm) wide by about 0.11 inch (3 mm) thick for mechanical properties measurements.

Several of the machined mechanical test specimens were then subjected to additional heat treatments. Except as otherwise noted, these heat treatments were limited to the fiber reinforced ceramic composite material of the present Example. Specifically, a first group of samples was heat treated at about 1200° C. for about 24 hours and a second group of samples was heated treated at about 1200° C. for about 100 hours. The heat treatments were effected by placing the mechanical test specimens onto alumina trays with the tensile side of the test specimen facing away from the alumina trays. The alumina trays and their contents were then placed into air atmosphere furnaces and heated to about 1200° C. at a rate of about 200° C. per hour. After about 24 hours at about 1200° C., the furnace containing the first group of samples was cooled to about room temperature at a rate of about 200° C. per hour, whereas after about 100 hours at about 1200° C., the furnace containing a second group of samples, was cooled to about room temperature at a rate of about 200° C. per hour.

The flexural strengths of the fiber reinforced ceramic composite test specimens were measured using the procedure defined by the Department of the Army's proposed MIL-STD-1942A (Nov. 21, 1983). This test was specifically designed for strength measurements of high-performance ceramic materials. The flexural strength is defined in this standard as the maximum outer fiber stress at the time of failure. A four-point-¼-point flexural test was used. The height and width of the test bars were measured with a precision of about 390 microinch (0.01 mm). The test bars were subjected to a stress which was applied at four points by two lower span bearing points and two upper span bearing points. The lower span bearing points were about 1.6 inches (40 mm) apart, and the upper span bearing points were about 0.79 inch (20 mm) apart. The upper span was centered over the lower span, so that the load was applied substantially symmetrically on the test bar. The flexural strength measurements were made with a Sintec Model CITS-2000/6 universal testing machine (Systems Integrated Technology, Inc., Stoughton, Mass.). The crosshead speed during testing was about 0.02 inch per minute (0.55 mm/minute). Flexural strengths determined at about 1200° C., about 1300° C. and about 1400° C. were performed with another universal testing machine equipped with an air atmosphere resistance heated furnace (Advanced Test Systems, Butler, Pa.).

Table I contains a summary of the four point flexural strengths for NICALON™ silicon carbide reinforced alumina oxidation reaction product composite bodies. Specifically, Table I summarizes the sample condition, the test temperature, the number of samples tested, the average flexural strength and standard deviation, the maximum flexural strength and the minimum flexural strength. These data suggest that the flexural strength of fiber reinforced ceramic composite bodies subjected to the methods of the instant invention are substantially unaffected by test temperature between about room temperature and about 1200° C. Moreover, these data suggest that the flexural strengths of fiber reinforced ceramic composite bodies subjected to the methods of the instant invention are only slightly degraded at test temperatures greater than 1200° C. and by extended exposure times at 1200° C.

EXAMPLE 3

This Example illustrates that fiber reinforced ceramic composite bodies having varying ceramic matrix composition can be formed. Specifically, Sample A of this Example comprised a silicon carbide fiber reinforced alumina composite body; and Sample B of this Example comprised a silicon carbide fiber reinforced aluminum nitride composite body.

Sample A

A SiC/BN-coated fabric preform measuring about 3.0 inches (76 mm) long by about 3.0 inches (76 mm) wide by about 0.125 inch (3.2 mm) thick was prepared by stacking eight layers of 12-harness satin weave (12 HSW) fabric comprising silicon carbide fibers (NICALON™ fibers obtained from Dow Corning Corporation, Midland, Mich.) the fibers having a diameter ranging from about 394 microinch (10 μm) to about 787 microinch (20 μm). The 12 HSW silicon carbide fabrics were stacked such that each succeeding fabric layer was placed with its fill yarns being rotated about 90° with respect to the fill yarns of the previous fabric layer. The fabric preform comprising the stacked layers were then placed into a chemical-vapor-infiltration (CVI) reactor and the fibers were coated with a first layer of boron nitride (BN) substantially in accordance with the methods of Example 2. Thereafter, the reaction conditions in the CVI reactor were modified such that a CVI coating of silicon carbide (SIC) was placed on top of the BN coating substantially in accordance with the method of Example 2. The CVI coatings held the stacked fabric layers together, thereby forming the SiC/BN-coated fabric preform.

The SiC/BN-coated fabric preform comprising the eight stacked layers of 12 HSW fabric coated with a first layer of BN and a second layer of SiC was placed into the bottom of a porous castable refractory boat having holes at the bottom to facilitate air flow to the composite during composite growth, thereby forming a lay-up. Specifically, the porous castable refractory boat having an inner cavity measuring about 3.25 inches (83 mm) square by about 3.0 inches (76 mm) deep and having a wall thickness of about 0.125 inch (3.2 mm) was cast from a mixture comprised by weight of about 56.3% plaster of Paris (BONDEX™, Bondex International), about 28.1% water and about 15.6% 90 grit alumina (E1 ALUNDUM®, Norton Company, Worcester, Mass.). After the SiC/BN-coated fabric preform was placed into the porous castable refractory boat, -325 mesh (particle diameter less than about 45 μm) wollastonite particulate (a calcium silicate obtained from Peltz-Rowley Chemical Co., Philadelphia, Pa.) was placed into the void space between the SiC/BN-coated fabric preform and the porous castable refractory boat until the level of the wollastonite was substantially flush with the top surface of the preform. A thin layer of molten petroleum jelly.

TABLE I

| Sample Condition | Test Temp. | Number of Samples Tested | Average Strength (MPa) | Max. Strength (MPa) | Min. Strength (MPa) |
|---|---|---|---|---|---|
| Metallic constituent removed | Room temp. | 8 | 461 ± 28 | 511 | 438 |
| Metallic constituent removed | 1200° C. | 10 | 488 ± 22 | 517 | 440 |
| Metallic constituent removed | 1300° C. | 4 | 400 ± 12 | 412 | 386 |
| Metallic constituent removed | 1400° C. | 4 | 340 ± 11 | 348 | 325 |
| Metallic constituent removed and heat treated at 1200° C. in air for 24 h. | Room temp. | 3 | 288 ± 21 | 302 | 264 |
| Metallic constituent removed and heat treated at 1200° C. in air for 24 h. | 1200° C. | 3 | 397 ± 9 | 404 | 387 |
| Metallic constituent removed and heat treated at 1200° C. in air for 100 h. | Room temp. | 3 | 265 ± 12 | 275 | 253 |
| Metallic constituent removed and heat treated at 1200° C. in air for 100 h. | 1200° C. | 3 | 401 ± 28 | 433 | 379 |

(VASELINE®, Cheesebrough-Ponds, Inc., Greenwich, Conn.) was first applied to the top surface of the SiC/BN-coated fabric preform and then covered with nickel oxide (NiO) powder substantially in accordance of the methods of Example 2.

The porous castable refractory boat, having stilts at its corners, was placed into a resistance heated air atmosphere furnace and heated to about 700° C. at a rate of about 400° C. per hour. A parent metal, comprising by weight about 7.5–9.5% Si, 3.0–4.0% Cu, ≦2.9% Zn, 0.2–0.3% Mg, ≦1.5% Fe, ≦0.5% Mn, ≦0.35% Sn, and the balance aluminum and weighing about 420 grams, was also placed in a refractory container in the resistance heated air atmosphere furnace and heated to about 700° C. When parent metal was molten, the furnace door was opened and the parent metal was poured into the heated porous castable refractory boat and onto the NiO powder coated preform, thereby covering the surface of the SiC/BN-coated fabric preform. Wollastonite powder was then placed onto the surface of the molten parent metal within the porous boat to substantially completely cover the surface of the molten parent metal, thereby forming a lay-up. Then the furnace and its contents comprising the lay-up were heated to about 1000° C. in about an hour. After about 60 hours at about 1000° C., the furnace and its contents were cooled to about 700° C. in about 2 hours. At about 700° C., the lay-up was removed from the furnace and residual molten parent metal was decanted from the porous castable refractory boat. The refractory boat was rapidly broken away from the formed composite, and the formed composite was buried in silica sand to permit the composite to cool to about room temperature. At about room temperature, the composite was removed from the silica sand and it was observed that an oxidation reaction product comprising alumina had grown into and substantially completely embedded the SiC/BN-coated fabric preform, thereby forming the ceramic matrix composite body having a plurality of fabric layers of 12 HSW NICALON™ fibers silicon carbide as a reinforcement. The ceramic matrix also comprised some residual unreacted parent metal. The silicon carbide fiber reinforced alumina composite body was then cut into bars measuring about 2.4 inches (60 mm) long by about 0.2 inch (6 mm) wide by about 0.11 inch (3 mm) thick in preparation for the removal of at least a portion of the metallic constituent of the formed fiber reinforced ceramic composite body.

Sample B

A graphite foil box having an inner cavity measuring about 4.0 inches (102 mm) long by about 4.0 inches (102 mm) wide by about 3.0 inches (96 mm) deep was made from a piece of graphite foil (GRAFOIL®, Union Carbide, Carbon Products Division, Cleveland, Ohio) measuring about 10.0 inches (254 mm) long by about 10.0 inches (254 mm) wide by about 0.015 inch (0.38 mm) thick. Four parallel cuts, 3.0 inches (76 mm) from the side and about 3.0 inches (76 mm) long were made into the graphite foil. The cut graphite foil was then folded and stapled to form the graphite foil box.

A parent metal, comprising by weight about 3 percent strontium and the balance aluminum and measuring about 4.0 inches (102 mm) long by about 4.0 inches (102 mm) wide by about 1.0 inch (25 mm) thick was coated on one side thereof measuring about 4.0 inches (102 mm) long by about 4.0 inches (102 mm) wide with a slurry comprising by weight about 90% –325 mesh particle size less than about 45 μm) aluminum alloy powder and the balance ethanol. The –325 mesh aluminum alloy powder was nominally comprised by weight of about 7.5–9.5% Si, 3.0–4.0% Cu, ≦2.9% Zn, 0.2–0.3% Mg, ≦1.5% Fe, ≦0.5% Mn, ≦0.35% Sn, and the balance aluminum. The aluminum alloy powder-coated parent metal was then placed into the graphite foil box such that the uncoated surfaces of the parent metal contacted the inner surfaces of the graphite foil box.

A fabric preform measuring about 4.0 inches (102 mm) long by about 4.0 inches (102 mm) wide by about 0.06 inch (1.6 mm) thick was made within the graphite foil box and on the aluminum alloy powder coated surface of the parent metal by stacking four layers of 12 harness satin weave (HSW) silicon carbide fabric (NICALON™ obtained from Dow Corning Corporation, Midland, Mich.) onto the parent metal. About 0.5 inch (13 mm) of a 500 grit (average particle diameter of about 17 μm) alumina powder (E1 ALUNDUM®, Norton Company, Worcester, Mass.) was poured over the 12 HSW fabric preform and leveled. The sides of the graphite foil box that extended beyond the level of the alumina powder covering the 12 HSW fabrics were folded over onto the alumina powder to form a lid for the graphite foil box.

A lay-up was formed in a graphite refractory container by placing and leveling about 0.5 inch (13 mm) of a 500 grit (average particle diameter of about 17 µm) alumina powder into the bottom of the graphite refractory container. The graphite foil box and its contents comprising the aluminum alloy powder-coated parent metal and the 12 HSW silicon carbide fabric preform were placed into the graphite refractory container and onto a 500 grit (average particle diameter of about 17 µm) alumina. Additional 500 grit alumina was placed into the graphite refractory container into the void defined by the inner surface of the graphite refractory container and the outer surface of the graphite foil box. The 500 grit (average particle diameter of about 17 µm) alumina powder also covered the top lid of the graphite foil box and its contents.

The lay-up comprising the graphite refractory container and its contents was placed into a retort lined resistance heat furnace and the retort door was closed. The furnace and its contents were heated to about 100° C. at a rate of about 300° C. per hour. At about 100° C., the retort was evacuated to about 30.0 inches (762 mm) mercury (Hg) vacuum and maintained at about 30.0 inches (762 mm) Hg vacuum to about 150° C. At about 150° C., nitrogen was introduced into the retort at a flow rate of about 4 liters per minute. The furnace and its contents were then heated to about 900° C. at about 300° C. per hour. After about 200 hours at about 900° C., the furnace and its contents were cooled to about room temperature at a rate of about 300° C. per hour. At about room temperature, the retort door was opened and the lay-up was removed. The lay-up was disassembled, the preform was removed from within the graphite foil box, and it was observed that an oxidation reaction product comprising aluminum nitride had grown into and substantially completely embedded the silicon carbide fabric preform thereby forming a ceramic matrix composite body reinforced with a plurality of fabric layers of 12 HSW NICALON™ silicon carbide as reinforcement. The ceramic matrix also comprised a metallic constituent comprising residual unreacted parent metal.

Table II contains a summary of the parameters used to practice the metal removal step of the instant invention on Samples A and B. Specifically, Table II contains the dimensions of the sample, the filler material used for metal removal, the infiltration enhancer precursor, the processing temperature, the processing time at the processing temperature, and the processing atmosphere.

Figure 6:
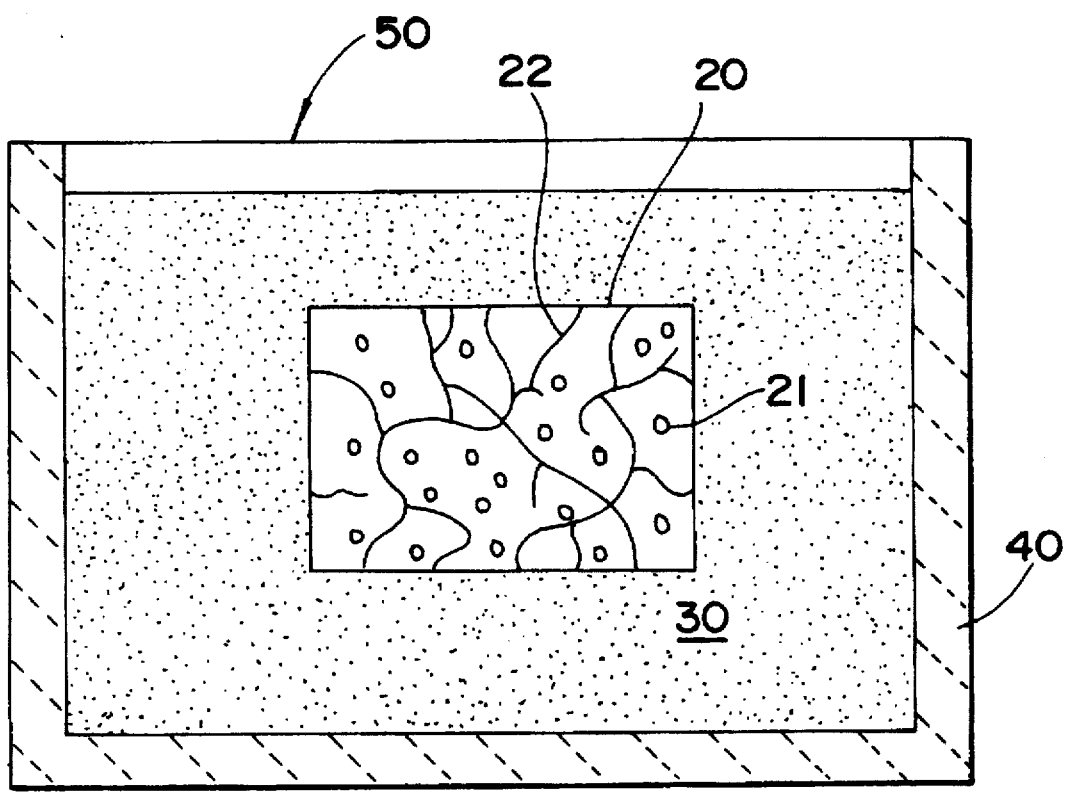
FIG. 6 is a schematic cross-sectional representation of a typical lay-up for removing at least one metallic constituent of a metallic component from substantially all surfaces of a composite body.

FIG. 6 shows a cross-sectional schematic of the setup used in this series of tests to remove the metallic constituent from Samples A and B.

After the formation of the silicon carbide fiber reinforced alumina composite body of Sample A had been achieved, the metal removal process was effected. Specifically, a filler material mixture was formed, comprising by weight about 90 percent filler, which comprised 1000 grit (average particle diameter of about 5 $Al_2O_3$ (E67 tabular alumina, Norton Co., Worcester, Mass.) and about 10 percent by weight −325 mesh (particle diameter less than about 45 µm) magnesium powder (AESAR®, Johnson Matthey, Seabrook, N.H.). The filler material mixture was mixed in a plastic jar on a rotating jar mill for about an hour.

A graphite foil box having an inner cavity measuring about 3 inches (76 mm) long by about 3 inches (76 mm) wide and about 2.5 inches (64 mm) deep was made from graphite foil (PERIVIA FOIL, TT America, Portland, Oreg.). The graphite foil box was made from a piece of graphite foil, measuring about 8 inches (203 mm) long by about 8 inches (203 mm) wide by about 0.15 inches (4 mm) thick. Four parallel cuts about 2.5 inches (64 mm) from the side and about 2.5 inches (64 mm) long, were made into the graphite foil. The graphite foil was then folded into a graphite foil box and stapled together. Metal was removed from Sample A by first pouring about 0.5 inch (13 mm) of the mixture of filler material and magnesium powder into one of the graphite foil boxes. The filler material mixture was levelled and hand tapped until smooth. A bar of the silicon carbide fiber reinforced alumina composite of Sample A, and measuring about 1.7 inches (43.8 mm) long by about 0.25 inch (6.3 mm) wide by about 0.2 inch (4.5 mm) thick was placed onto the filler material mixture within the graphite foil box and covered with another about 0.5 inch (13 mm) of the filler material mixture which was again levelled and hand tapped until smooth.

The graphite foil box containing Sample A was then placed into a graphite refractory container having inner dimensions of about 9 inches (229 mm) long by about 9 inches (229 mm) wide by about 5 inches (127 mm) deep and having a wall thickness of about 0.5 inch (13 mm). The graphite refractory container and its contents were then placed into a controlled atmosphere resistance heated furnace, the furnace door was closed and the furnace was evacuated to about 30 inches (762 mm) Hg. After about 15 hours at about 30 inches (762 mm) of mercury vacuum, the vacuum was shut off and nitrogen gas was introduced into the furnace chamber at a flow rate of about 1 liter/minute. The operating pressure of the chamber was about 16.7 pounds per square inch (1.2 kg/cm$^2$) with a nitrogen flow rate of about 1 liter/minute. The furnace was heated to about 850° C. at about 200° C. per hour. After about 10 hours at about 850° C., the power to the furnace was interrupted and the graphite refractory container and its contents were allowed to cool within the furnace to about room temperature. Once at room temperature, the graphite refractory container and its contents were removed and the lay-up for Sample A was disassembled to reveal that the metallic constituent comprising an aluminum alloy in the silicon carbide fiber reinforced alumina composite had been drawn out from the composite body during the metal removal process.

The setup for the removal of the metallic constituent from Sample B was substantially the same as that described for Sample A of this Example and is schematically illustrated in FIG. 6. The nitrogen flow rate to effect removal of the metallic constituent from Sample B was about two liters per minute. The controlled atmosphere furnace was heated to about the processing temperature of about 750° C. at a rate of about 200° C. per hour, held at about the processing temperature for about 10 hours. After about 10 hours at the processing temperature, at least a portion of the metallic constituent was removed from within the ceramic matrix composite body. Specifically, the metallic constituent spontaneously infiltrated the filler material mixture comprising substantially a 1000 grit (average particle diameter of about 5 µm) alumina and a −325 mesh magnesium infiltration enhancer precursor. The furnace and its contents were cooled to about room temperature. At about room temperature, the setup was removed from the furnace, disassembled, and weight loss due to the removal of the metallic constituent from Sample B was noted.

EXAMPLE 4

The following Example demonstrates that fiber reinforced ceramic composite bodies formed by the method of the present invention maintain substantially their room temperature fracture toughness at elevated temperatures. A series of fiber preforms were made substantially in accordance with the methods described in Example 2, except that the first layer and eighth layer of the fabric preform comprised 12 harness satin weave (12 HSW) fabric instead of 8 harness satin weave (8 HSW) fabric and the temperature of the methyltrichlorosilane (MTS) bath used during the formation of silicon carbide coatings was maintained at about 18° C. instead of about 25° C. The lay-up for the growth of the fiber reinforced ceramic composite body included an alumina-bonded wollastonite shell fabricated substantially in accordance with the methods described in Example 2, and the composite growth process was substantially the same as that described in Example 2. The resultant ceramic matrix composite bodies were subjected to a metal removal treatment substantially the same as that described in Example 2. The samples were subsequently machined to form mechanical test samples which were used to determine both the flexural strength and the fracture toughness of the fiber reinforced ceramic composite bodies both as a function of test temperature.

group of parameters (e.g., temperature, fiber reinforced ceramic composite body, etc.)

Table III summarizes the results of the measurements of the average flexural strength, the maximum flexural strength and the average fracture toughness all as a function of temperature, for Samples D, E and F, which were subjected to the metal removal process. Moreover, the fracture toughness of an "as-grown" Sample C (e.g., without any residual metallic constituent removed) is compared to a treated Sample D (i.e., metallic constituent removed). The data in Table III shows that the fracture toughness of a fiber reinforced ceramic composite body with its metallic constituent substantially completely removed is not significantly diminished at elevated temperatures. In addition, the fracture toughness of a sample which is subjected to the metal removal process does not appear to vary significantly from the fracture toughness of an untreated composite body.

EXAMPLE 5

The following Example demonstrates that fiber reinforced ceramic composite bodies exhibiting excellent fracture toughness can be produced by (1) coating a fabric preform

TABLE II

| Sample ID | Composite[1] | Geometry | Filler Material For Metal Removal | Infiltration Enhancer Precursor | Processing Temperature | Processing Time At Processing Temperature | Atm. |
|---|---|---|---|---|---|---|---|
| A | $SiC_f/Al_2O_3$[7] | bar | 1000 grit $Al_2O_3$[2] | 10% −325 mesh Mg[3] | 850° C. | 10 h | $N_2$ |
| B | $SiC_f/AlN$[7] | irregular | 1000 grit $Al_2O_3$ | 10% −325 mesh Mg[3] | 750° C. | 10 h | $N_2$ |

[1]SiC fiber reinforced composite
[2]E-67 alumina, Norton Co., Worcester, MA.
[3]AESAR ®, Johnson Matthey Corporation, Seabrook, New Hampshire Table III summarizes the results of these tests. The methods for measurement of the flexural strength was substantially in accordance with the methods described in Example 2. The method of Munz, Shannon and Bubsey (International Journal of Fracture, Vol. 16 (1980) R137–R141) was used to determine the fracture toughness of the silicon carbide fiber reinforced ceramic composite bodies. The fracture toughness was calculated from the maximum load of Chevron notch specimens in four point loading. Specifically, the geometry of each Chevron notch specimen was about 1.8 to 2.2 inches (45 to 55 mm) long, about 0.12 inch (3 mm) wide and about 0.15 inch (3.75 mm) high. A Chevron notch was cut in each specimen with a diamond saw to permit the propagation of a crack starting at the notch and traveling through the sample. The Chevron notched specimens, having the apex of the Chevron notch pointing downward, were placed into a fixture within a Universal test machine. The notch of the Chevron notch specimen, was placed between two pins about 1.6 inches (40 mm) apart and about 0.79 inch (20 mm) from each pin. The top side of the Chevron notch specimen was contacted by two pins about 0.79 inch (20 mm) apart and about 0.39 inch (10 mm) from the notch. The maximum load measurements were made with a Syntec Model CITS-2000/6 universal testing machine (System Integration Technology Incorporated, Stoughton, Mass.). A crosshead speed of 0.02 inches/minute (0.58 millimeters/minute) was used. The load cell of the universal testing machine was interfaced to a computer data acquisition system. The Chevron notch sample geometry and maximum load were used to calculate the fracture toughness of the material. Several samples were used to determine an average fracture toughness for a given with coatings comprising silicon carbide (SiC)/boron nitride (BN); (2) growing an oxidation reaction product by a reaction of a parent metal with an oxidant which embeds the SiC/BN-coated fabric preform and (3) removing at least some of the metallic constituent from the grown fiber reinforced ceramic composite body.

A NICALON™ silicon carbide fiber reinforced alumina composite body plate measuring substantially the same as that in Example 2 was formed substantially in accordance with the method of Example 2. Specifically, the fabric preform lay-up, the formation of both the boron nitride and silicon carbide coatings, the growth of the alumina oxidation reaction product embedding the SiC/BN-coated fabric preform and the removal of the metallic constituent from the fiber reinforced ceramic body were performed substantially in accordance with the method of Example 2.

TABLE III

| Sample ID | Sample Condition | Test Temp. | Average Flexural Strength (MPa) | Maximum Flexural Strength (MPa) | Average Fracture Toughness (MPa − $m^{1/2}$) |
|---|---|---|---|---|---|
| C | As Grown | RT | — | — | 19 ± 1 |
| D | Metallic constituent removed | RT | 450 (31)* | 563 | 21 ± 1 |
| E | Metallic constituent removed | 1000° C. | 400 (7)* | 432 | 23 ± 1 |

TABLE III-continued

| Sample ID | Sample Condition | Test Temp. | Average Flexural Strength (MPa) | Maximum Flexural Strength (MPa) | Average Fracture Toughness (MPa – m$^{1/2}$) |
|---|---|---|---|---|---|
| F | Metallic constituent removed | 1200° C. | 350 (14)* | 406 | 18 ± 1 |

*The number in parentheses indicates the number of sample test.

The fracture toughness of the fiber reinforced ceramic composite body was measured substantially in accordance with the method of Example 4, except that specimen size used to determine the toughness measured from about 1.0 to about 1.2 inches (25 to 30 mm) long, about 0.15 inch (3.75 mm) high and about 0.12 inch (3 mm) wide. The apex of the Chevron notch pointed up within the universal test machine. The notch of the specimen was placed between two pins about 0.39 inch (10 mm) apart and about 0.2 inch (5 mm) from each pin. The top side of the specimen was contacted by two pins about 0.79 inch (20 mm) apart and about 0.39 inch (10 mm) from the notch. Three specimens were tested to determine an average fracture toughness for a specific test temperature.

The fracture toughness of the fiber reinforced ceramic composite body of this Example was measured at about room temperature, at about 1200° C. and at about 1300° C. These values were about 35.3±1 MPa-m$^{1/2}$, 19.6±1 MPa-m$^{1/2}$ and 18.7±1 MPa-m$^{1/2}$, respectively.

EXAMPLE 6

The following Example demonstrates the intrinsic strength of the ceramic matrix of a fiber reinforced ceramic composite body.

A NICALON™ silicon carbide fiber reinforced alumina composite was formed substantially in accordance with the methods of Example 2. Specifically, the fabric preform lay-up, the formation of both the boron nitride and silicon carbide coatings, the growth of the alumina oxidation reaction product embedding the SiC/BN-coated fiber and the removal of the metallic constituent from the fiber reinforced ceramic body were performed substantially in accordance with the method of Example 2.

The intrinsic strength of the matrix was measured at about room temperature with the short beam method according to ASTM method D 2344–84 entitled "Standard Test Method for Apparent Interlaminar Shear Strength of Parallel Fiber Composite By Short-Beam Method."

The mechanical test specimens were machined to overall dimensions of about 1 inch (25 mm) in length by about 0.16 inch (4 mm) in width by about 0.16 inch (4 mm) in thickness. Furthermore, the orientation of the mechanical test specimens were such that all the fibers were perpendicular to the thickness dimension, i.e., none of the fibers traversed the thickness dimension.

This test was specifically designed to measure the strength, and in particular, the shear strength, of the matrix material between two adjacent layers of the eight total layers of HSW fabric.

A three-point flexural test was used. The thickness and width of the test bars was measured with a precision of about 390 microinch (0.01 mm). The test bars were subjected to a stress which was applied at three points by two lower span bearing points and one upper span bearing point. The lower span bearing points were about 0.67 inch (17 mm) apart and the upper load point was centered over the lower span so that the load was applied substantially symmetrically on the test bar. The flexural strength measurements were made with a Syntec Model No. CITS-2000/6 universal testing machine (System Integration Technology, Inc., Sloughton, Mass.) having a 500 pound (2225 N) full-scale deflection load cell. A computer data acquisition system was connected to the measuring unit and strain gauges in the load cell recorded the test responses. The cross-head speed during testing was about 0.05 inch per minute (1.3 mm per minute).

The interlaminar shear strength was found to be about 62 MPa.

EXAMPLE 7

This Example characterizes the tensile strength of a fiber reinforced ceramic composite body and shows the gradual and progressive failure of such a body as opposed to the sudden and catastrophic failure typical of most ceramic or ceramic composite bodies.

A NICALON™ silicon carbide fiber reinforced alumina matrix composite was formed substantially in accordance with the method of Example 2. Specifically, the fabric preform lay-up, the formation of both the boron nitride and silicon carbide coatings, the growth of the alumina oxidation reaction product embedding the SiC/BN-coated fiber and the removal of the metallic constituent from the fiber reinforced ceramic body were performed substantially in accordance with the method of Example 2.

The tensile strength of the fiber reinforced ceramic composite body was measured using the procedures described in ASTM designations A 370 and E 8M-88.

Figure 7:
FIG. 7 is an orthoscopic view of tensile and stress rupture test specimens.

FIG. 7 shows the approximate shape of the test specimen which was machined using diamond grinding with the longitudinal axis of the test specimen parallel to either the length or width dimension of the fiber preform. The tensile test specimen measured overall about 6 inches (152 mm) long by about 0.5 inch (13 mm) wide by about 0.12 inch (3 mm) thick. The gage section measured about 0.75 inch (19 mm) long by about 0.35 inch (9 mm) wide. The test was performed using an MTS Model 810 universal testing machine (MTS Systems Corp., Eden Prarie, Minn.) operated at a crosshead speed of about 0.25 mm per minute. The sample strain was monitored with an MTS Model 632-11B-20 clip-on extensometer (MTS Systems Corp.).

At room temperature, the average tensile strength for 14 samples was about 331 MPa with a standard deviation of about 22 MPa. The Young's Modulus, as measured by the ratio of stress to strain in the linear portion of the stress-strain curve, averaged about 162 GPa and the average strain-to-failure was about 0.645 percent.

Figure 8:
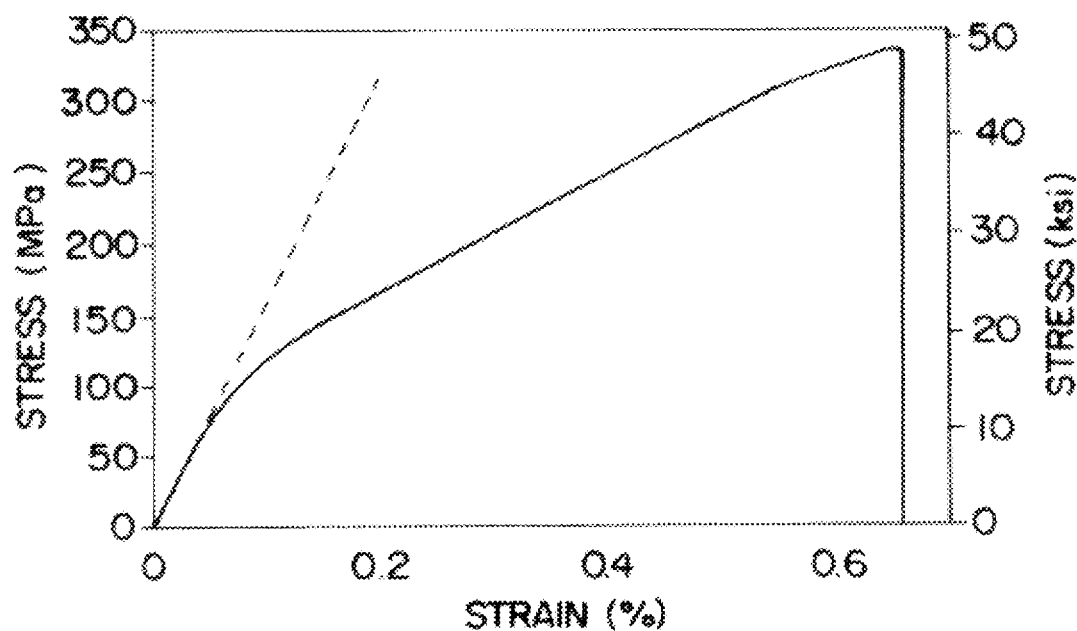
FIG. 8 is a typical stress-strain curve for a fiber-reinforced ceramic composite tensile test specimen.

FIG. 8 shows a typical stress-strain curve for a fiber reinforced ceramic composite body made substantially by the method of Example 2. The stress-strain curve begins to deviate from linearity at a stress of about 50–60 MPa, which deviation indicates the onset of matrix microcracking and pull-out of the reinforcing fibers from the surrounding matrix material.

Figure 9:
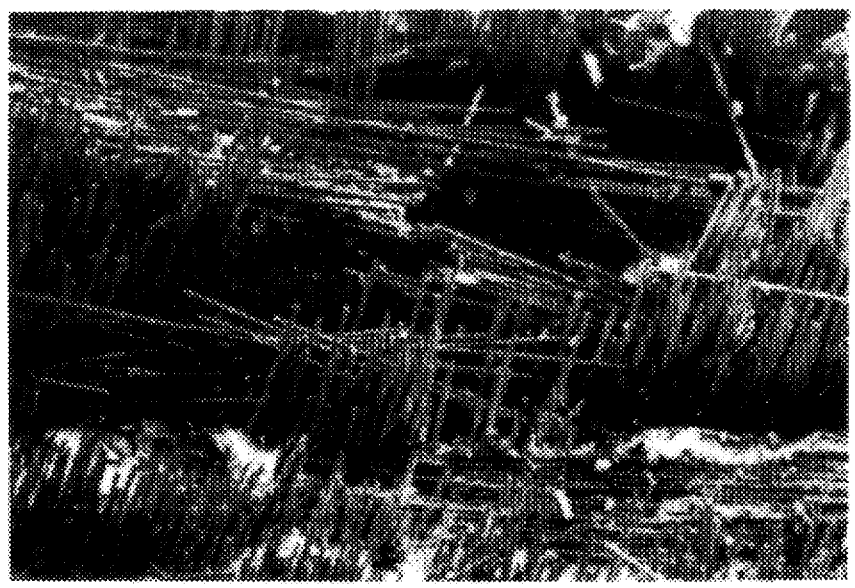
FIG. 9 is a SEM photograph at about 50×magnification of the fracture surface of a tensile test specimen.

FIG. 9 is a scanning electron micrograph taken at about 50×magnification of a fracture surface which has been exposed as a result of a room temperature tensile test. Segments of the reinforcing fibers which have been partially pulled out of the surrounding matrix material are clearly visible.

EXAMPLE 8

This Example demonstrates that fiber reinforced ceramic matrix composites produced according to the method of the present invention retain almost all of their ambient temperature strength at elevated temperatures, even after repeated thermal cycling.

A fabric preform 103 was made by stacking a plurality of layers of 8 harness satin weave (8 HSW) fabric and 12 harness satin weave (12 HSW) fabric made from NICA-LON™ silicon carbide fiber (obtained from Dow Corning Corp., Midland, Mich.) on top of each other. The nomenclature describing the orientations of the fabrics is substantially the same as that used in Example 2 and depicted in FIGS. 5a, 5b and 5c.

The fabric preform of the present Example was made by stacking the layers of HSW fabric in the following sequence:

A first fabric layer comprising an 8 HSW fabric was rotated about 90° in the counterclockwise direction from the as-is position about an axis 93 perpendicular to the plane of the fabric and was placed on a supporting surface to start the fabric preform;

A second fabric layer comprising an 8 HSW fabric was placed on the first fabric layer in the as-is position so that the edges of the second fabric layer were substantially aligned with the edges of the first fabric layer;

A third fabric layer comprising a 12 HSW fabric was rotated about 90° in the counterclockwise direction from the as-is position about an axis 93 perpendicular to the plane of the fabric and was placed on the second fabric layer so that the edges of the third fabric layer were substantially aligned with the edges of the second fabric layer;

A fourth fabric layer comprising a 12 HSW fabric was placed on the third fabric layer in the as-is position so that the edges of the fourth fabric layer were substantially aligned with the edges of the third fabric layer;

A fifth fabric layer comprising a 12 HSW fabric was rotated about 90° in the counterclockwise direction from the as-is position about an axis 93 perpendicular to the plane of the fabric and was placed on the fourth fabric layer so that the edges of the fifth fabric layer were substantially aligned with the edges of the fourth fabric layer;

A sixth fabric layer comprising an 8 HSW fabric was placed on the fifth fabric layer in the as-is position so that the edges of the sixth fabric layer were substantially aligned with the edges of the fifth fabric layer;

A seventh fabric layer comprising an 8 HSW fabric was rotated about 90° in the counterclockwise direction from the as-is position about an axis 93 perpendicular to the plane of the fabric and was placed on the sixth fabric layer so that the edges of the seventh fabric layer were substantially aligned were substantially aligned with the edges of the sixth fabric layer, thus completing the rectangular fabric preform which measured about 7 inches (178 mm) in length by about 5 inches (127 mm) in width.

The fabric preform was clamped in substantially the same fixture as was described in Example 2 and depicted in FIG. 5e. The preform containment fixture 108 containing the fabric preform was placed into a reactor chamber of a refractory alloy steel chemical vapor infiltration apparatus having a graphite tube liner and having overall dimensions of about 8 feet (2.4 meters) in length by about 15.5 inches (394 mm) in inside diameter. The warp yarns of the first and seventh layers of the fabric preform were perpendicular to the gas flow direction within the chamber as well as being perpendicular to the longitudinal axis of the reactor chamber. The reactor chamber was closed and evacuated to less than about 0.04 inch (1 mm) of mercury (Hg). The reactor chamber was then heated to a temperature of about 820° C.

Argon gas was flowed into the annulus region between the graphite liner and the steel reactor wall at a rate of about 850 standard cubic centimeters per minute (sccm). When the temperature within the reactor chamber reached about 820° C., a gas mixture comprising borontrichloride ($BCl_3$) flowing at about 700 sccm at a temperature of about 60° C. and ammonia ($NH_3$) flowing at about 1800 sccm was introduced into the reactor chamber while maintaining a total operating pressure of about 0.5 torr. After about 7 hours at a temperature of about 820° C., the gas mixture flowing into the reactor chamber was interrupted, the power to the furnace heating the reactor chamber was interrupted and the furnace and its contents were naturally cooled. At a temperature below about 200° C., the reactor chamber door was opened and the graphite containment fixture was removed, cooled and disassembled to reveal that the fibers of the fabric layers of the fabric preform were coated and that the fabric layers comprising the fabric preform were bonded together by a boron nitride coating. The boron nitride coating had a thickness of about 0.48 micron.

The boron nitride coated fabric preform was then stored in a vacuum desiccator until it was ready to be put back into the chemical vapor infiltration apparatus for additional coating.

For the application of this subsequent coating, the boron nitride coated and bonded fabric preform was placed back into the reactor chamber of the chemical vapor infiltration apparatus. In this instance, however, the warp yarns of the first and seventh layers of the fabric preform were parallel to the gas flow direction within the chamber, as well as being parallel to the longitudinal axis of the reactor chamber. The reactor chamber was closed and evacuated to about less than about 1 torr. Hydrogen gas was introduced into the reactor chamber at a flow rate of about 5000 standard cubic centimeters per minute (sccm). The reactor chamber was then heated to a temperature of about 935° C. Nitrogen gas was flowed through the annulus region at a rate of about 850 sccm. Once the temperature of the contents of the reactor chamber had substantially completely stabilized at about 935° C., about 1500 sccm of hydrogen were diverted away from direct entry into the reactor chamber and were first bubbled through a bath of methyltrichlorosilane (MTS) maintained at a temperature of about 45° C. before entering the reactor chamber. After about 20 hours at a temperature of about 935° C., the power to the furnace heating the reactor chamber was interrupted and the about 1500 sccm of hydrogen that was being directed through the MTS bath was again permitted to flow directly into the reactor chamber to reestablish a direct hydrogen gas flow rate of about 5000 sccm into the reactor chamber. After the reactor chamber had cooled substantially, the hydrogen flow rate was interrupted and the furnace and its contents were evacuated to less than 1 torr. The pressure within the reactor chamber was then brought back up to about atmospheric pressure with argon gas. After the reactor chamber had cooled to a temperature below about 200° C., the argon gas flow rate was interrupted and the reactor chamber door was opened. The graphite containment fixture was removed, cooled and disassembled to reveal that the boron nitride bonded fabric preform had been coated with a second layer of silicon carbide thereby forming a silicon carbide (SiC)/boron nitride (BN)-coated fabric preform. The silicon carbide had a thickness of about 1.9 microns.

Growth of an alumina oxidation reaction product through the silicon carbide/boron nitride-coated fabric preform was then carried out in substantially the same manner as was described in Example 2 to form a fiber reinforced ceramic composite body comprising a ceramic matrix comprising an aluminum oxide oxidation reaction product and a metallic component in comprising some residual unreacted parent metal, with said ceramic matrix reinforced by the silicon carbide/boron nitride coated NICALON™ silicon carbide fibers. Substantially complete growth of the ceramic matrix only required about 72 hours, however.

Once the ceramic composite body had been manufactured, at least a portion of the metallic constituent comprising the ceramic matrix was removed. This metal removal process was performed in substantially the same manner as was described in Example 2.

Figure 10:
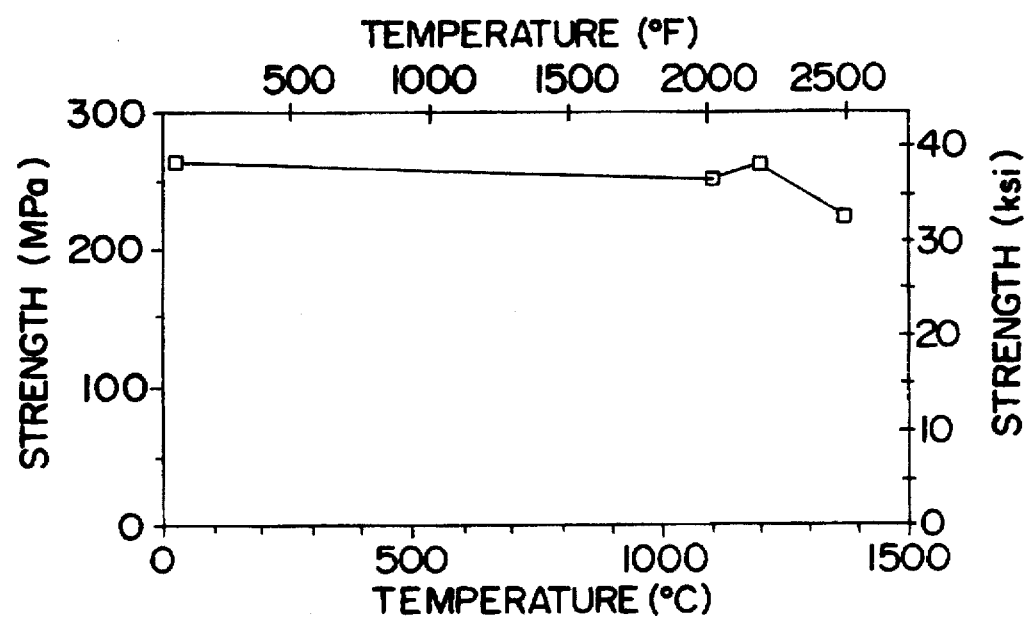
FIG. 10 shows tensile strength of a fiber-reinforced ceramic matrix composite vs. T(°C.) in air.

Tensile test specimens were machined from the fiber reinforced ceramic composite body and tested in substantially the same manner as described in Example 7. Heating was provided by positioning a resistance heated air atmosphere furnace in the testing zone of the test machine. The samples were tested in air at ambient as well as at elevated temperatures of about 1100° C., 1200° C., and about 1370° C. As shown in FIG. 10, the tensile strength at these temperatures was about 260, 250, 260, and about 230 MPa, respectively. Thus, these data show that the fiber reinforced ceramic composite material retains substantially all of its ambient temperature strength up to a temperature of about 1200° C., and almost all of its ambient temperature strength at a temperature of about 1370° C.

Next, the effect of repeated thermal cycling on the material's tensile strength was assessed.

First, a NICALON™ silicon carbide reinforced alumina matrix composite was produced substantially in accordance with the procedure described in Example 2 and likewise subjected to the metal removal process of Example 2. Unlike the procedure of Example 2, however, during the growth of oxidation reaction product into the preform, the approximately 950° C. process temperature was maintained for about 100 hours instead of about 90 hours. Moreover, the thickness of the silicon carbide coating deposited onto the boron nitride coated NICALON™ silicon carbide fibers during chemical vapor infiltration was about 2.0 microns.

Substantially rectangular tensile test specimens were diamond machined from the composite tile such that the length dimension of the test specimen was oriented parallel to the length or width dimension of the composite tile.

About half of the specimens were given a rapid thermal cycling treatment before tensile testing; the others were tested "as is". Specifically, the thermal cycling comprised subjecting each composite test specimen to about 150 thermal cycles, each thermal cycle comprising heating a test specimen from a starting temperature to a temperature of about 1200° C. in an argon atmosphere at a rate of about 40° C. per minute, holding at a temperature of about 1200° C. for about 2 minutes, and cooling back to the starting temperature at a rate of about 10° C. per minute. The starting temperature corresponded to the final testing temperature. The two sets of tensile test specimens were then tested in substantially the same manner as was described in the preceding Example at about room temperature and temperatures of about 1000° F. (538° C.), about 1500° F. (816° C.) and at about 2000° F. (1093° C.).

Figure 11:
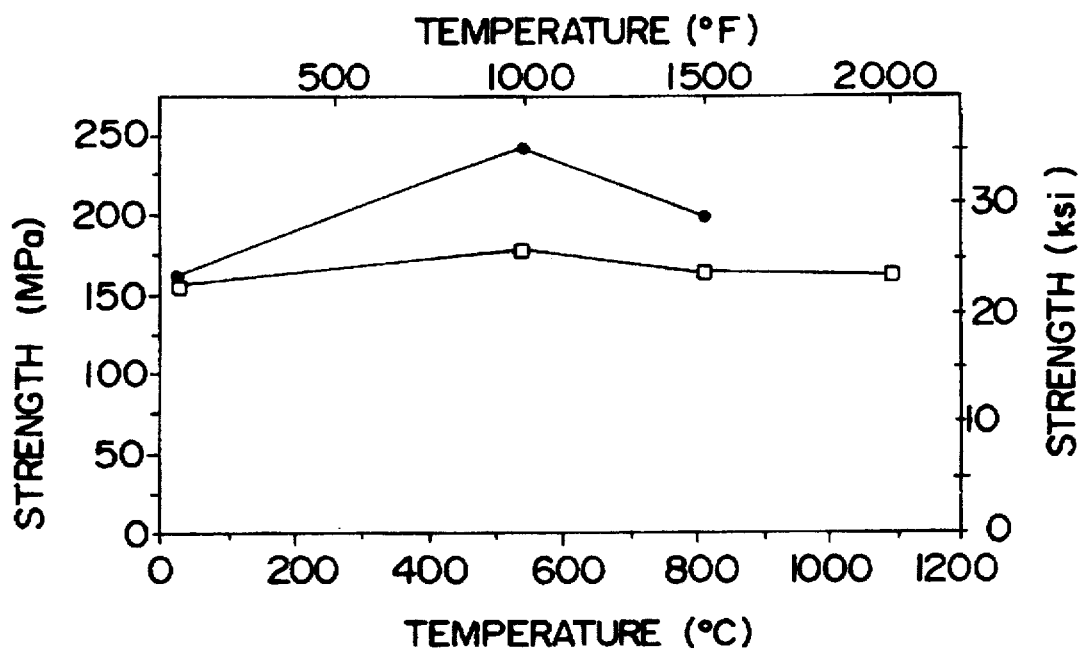
FIG. 11 shows tensile strength vs. temperature for thermally cycled and non-thermally cycled fiber ceramic matrix composite test specimens.

FIG. 11 shows the tensile strength as a function of test temperature for the two sets of composite test specimens. The data show that the thermally cycled composite test specimen experienced little loss in tensile strength compared to their counterparts which were not thermally cycled. The significance of this result is that the thermal cycling provided an opportunity for chemical reaction between the fiber, the fiber coatings and the surrounding matrix constituents. The thermal cycling operation also provided an opportunity for cracking due to thermal expansion mismatch. The lack of significant strength reduction indicates that any microcracking induced by the thermal cycling was confined to the matrix material and, furthermore, that the ability of the fibers to pull out of the matrix under the applied tensile load was not substantially affected by the thermal cycling. The different tensile strength levels observed in comparing the data of FIG. 10 to that of FIG. 11 may be attributable to variations in preform fabrication, specifically, such as the differences in the number of each type of HSW fabric (e.g., 12 HSW vs 8 HSW).

EXAMPLE 9

This Example demonstrates the high temperature mechanical performance of a fiber reinforced ceramic composite body under an applied load over a prolonged period of time in an oxidizing atmosphere.

The fiber reinforced ceramic composite body described herein was fabricated substantially in accordance with the methods outlined in Example 2. Specifically, the fabric preform lay-up, the formation of both the boron nitride and silicon carbide coatings, the growth of the alumina oxidation reaction product embedding the SiC/BN-coated fiber and the removal of the metallic constituent from the fiber reinforced ceramic body were performed substantially in accordance with the method of Example 2.

In Example 7, it was demonstrated that at room temperature (e.g., about 20° C.) in a pure tensile test, a fiber reinforced ceramic matrix composite sample begins to deviate from linear stress/strain behavior at an applied stress of about 50–60 MPa, indicating that the matrix begins to microcrack at approximately this stress level. These microcracks may allow for oxygen in the surrounding atmosphere to find a path to the underlying NICALON™ silicon carbide fiber and/or its SiC and BN coatings. Accordingly, stress rupture tests were conducted at various elevated temperatures in air at applied stresses above this 50–60 MPa microcracking threshold in order to evaluate the impact of matrix microcracking and subsequent oxygen ingress on the performance of the fiber reinforced ceramic composite body.

The stress rupture test specimen had substantially the same shape as that depicted in FIG. 7, with the exception that shoulders were machined into each end of the test specimen so that the sample could be gripped by a collar in the test fixture rather than clamped. Mica powder was used in the collar to cushion the contact zone between the collar and the shoulder portions of the stress rupture test specimen. The test specimen measured about 5.5 inches (140 mm) long overall by about 0.5 inch (13 mm) wide by about 0.12 inch (3 mm) thick. The gage portion of the test specimen measured about 2 inches (51 mm) in length by about 0.2 inches (5 mm) wide.

The tests comprised heating the samples to the desired test temperature and loading each specimen in tension to a desired stress and maintaining said stress at said temperature. The applied stress was increased in a step-wise manner. The unit length change of the specimen within the gage portion of the overall test specimen was monitored with a Model 1102 ZYGO® helium-neon laser extensometer (Zygo Corp., Middlefield, Conn.).

Figure 12:
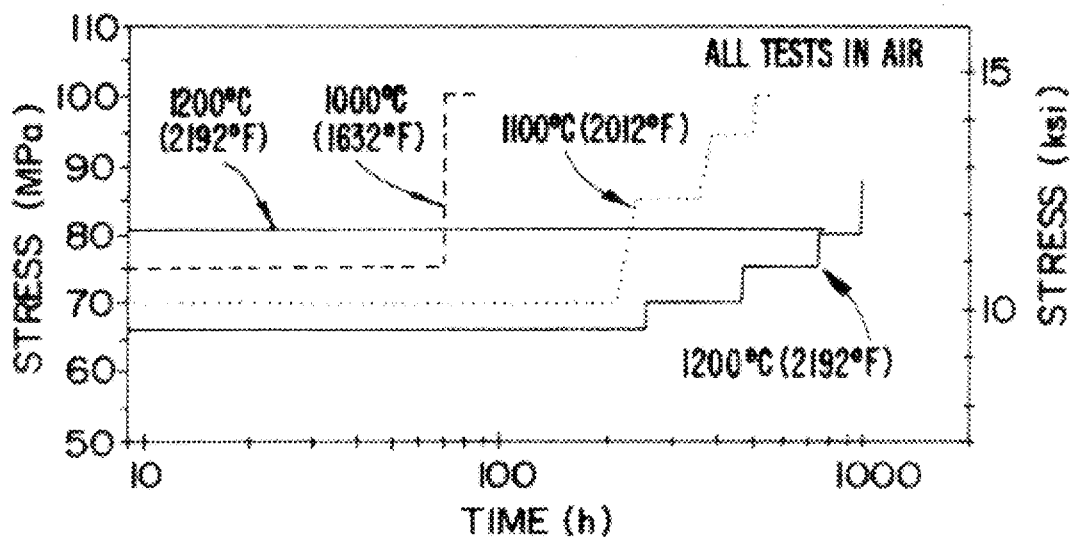
FIG. 12 shows results of stress rupture testing of NICALON™ fiber reinforced $Al_2O_3$ at 1000°, 1100° and 1200° C. in air.

The results of the stress rupture testing are presented for FIG. 12.

The particulars of the applied stress and the exposure times are presented below.

Sample G

The test fixture, comprising the Sample G test specimen with collars attached to each end, was loaded into a Model P-5 creep testing machine (SATEC Inc., Grove City, Pa.). A tensile stress of about 12.5 megapascals was applied to the test specimen using dead loading. A resistance heated air atmosphere furnace was positioned completely around the stress rupture test specimen and the furnace and the stress rupture sample contained within were heated from about room temperature to a temperature of about 1000° C. over a period of about 2 hours.

After the furnace chamber and its contents had reached a temperature of about 1000° C., the stress applied to the sample was increased to about 75 MPa. After maintaining an applied stress of about 75 MPa for about 70 hours, the applied stress to the sample was increased to about 100 MPa. After about 15 hours at a stress of about 100 MPa, the sample broke. The furnace chamber and its contents were allowed to cool naturally back down to about room temperature.

Sample H

The Sample H test fixture was placed into the creep testing machine at about room temperature and the Sample H stress rupture test specimen was heated in the surrounding resistance heated air atmosphere furnace to a temperature of about 1000° C. over a period of about 3 hours under an applied stress of about 5 MPa. At a temperature of about 1000° C., the applied tensile stress on the sample was increased to about 70 MPa and the temperature inside the furnace chamber was increased to about 1100° C. over a period of about 1 hour. After maintaining the sample in tension at a stress of about 70 MPa at a temperature of about 1100° C. for about 210 hours, the applied stress was increased to about 83 MPa. After about an additional 6 hours, the stress was increased to about 85 MPa. After maintaining an applied stress of about 85 MPa on the sample for about 115 hours, the applied stress was increased to about 88 MPa. After maintaining an applied stress of 88 MPa for about 1.5 hours, the stress applied was increased to about 90 MPa. After maintaining an applied tensile stress of about 90 MPa for about 3 hours, the applied stress was increased to about 91 MPa. After maintaining an applied stress of about 91 MPa for about 1.5 hours, the stress was further increased to about 92 MPa. After maintaining an applied stress of about 92 MPa for about 1.3 hours, the applied stress was increased to about 95 MPa. After maintaining an applied stress of about 95 MPa on the sample for about 115 hours, the applied stress was increased to about 96 MPa. After maintaining an applied stress of about 96 MPa for about 3 hours, the applied stress was increased to about 97 MPa. After maintaining an applied stress of about 97 MPa for about 2 hours, the applied stress was increased to about 99 MPa. After maintaining an applied stress of about 99 MPa for about 1.5 hours, the applied stress was increased to about 100 MPa. After maintaining an applied stress of about 100 MPa for about 60 hours, the sample broke. The furnace chamber and its contents were thereafter furnace cooled from a temperature of about 1100° C. down to about room temperature.

Figure 13:
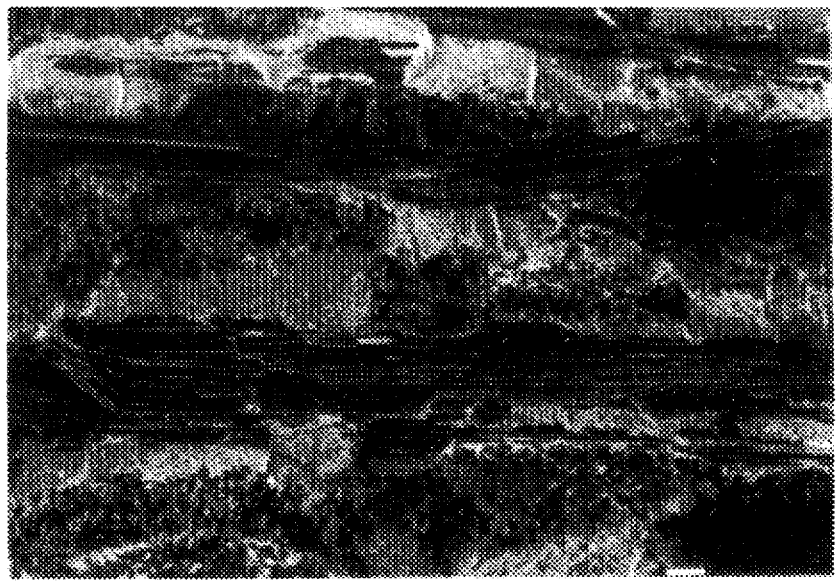
FIG. 13 is a SEM photograph at about 50×magnification of the fracture surface of a stress rupture tested specimen.

The fractured sample was recovered from the test chamber and the fracture surface was examined in the scanning electron microscope. FIG. 13 is an approximately 50×magnification scanning electron micrograph of a portion of the fracture surface. Direct comparison of FIG. 13 with the previous scanning electron micrograph of FIG. 9 shows much less fiber pull-out associated with this Sample H specimen than with the fracture surface of the Example 7 tensile test specimen. This decrease in the degree of fiber pull-out of the present stress rupture may suggest degradation of the fiber and/or one or more of its coatings over the 500+hour duration of the stress rupture test. Conversely, the ability of this fiber reinforced ceramic matrix composite body to survive sustained exposure of this duration at a temperature of about 1100° C. at a stress level sufficient to expose the reinforcing fibers and/or their coatings to atmospheric oxygen may suggest the operation of a mechanism working to protect the NICALON™ fibers from chemical reactions such as atmospheric oxidation.

Figure 14:
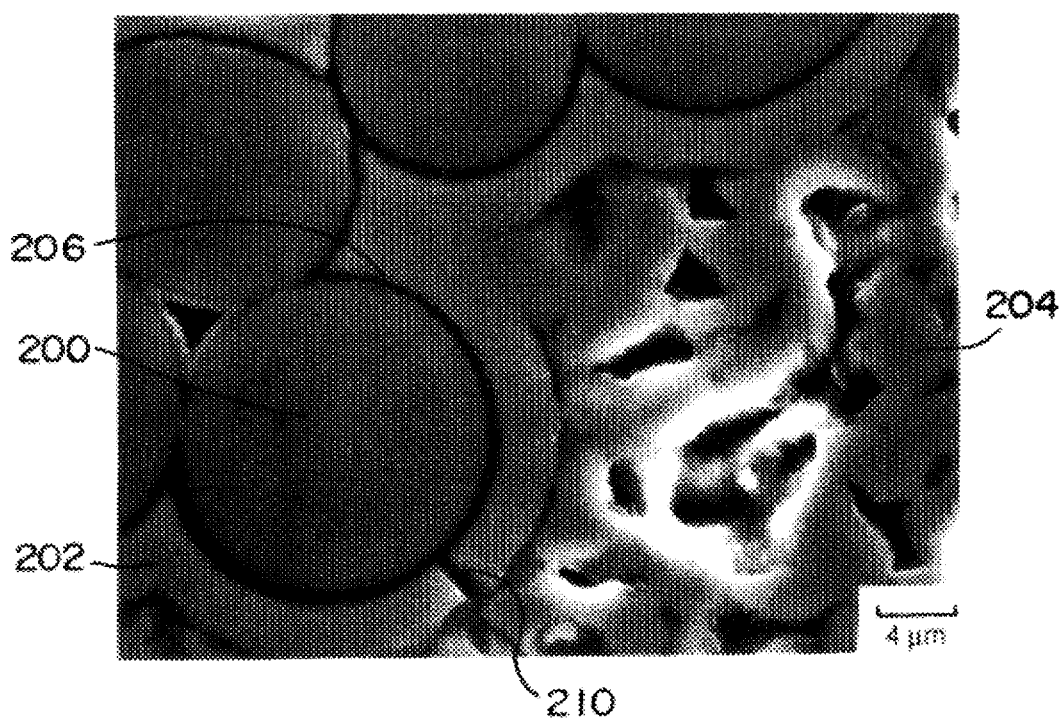
FIGS. 14 and 15 are scanning electron micrographs taken at about 2500× and 10,000×magnification, respectively, of a polished cross-section of Sample H of Example 9 near the rupture surface.
Figure 15:
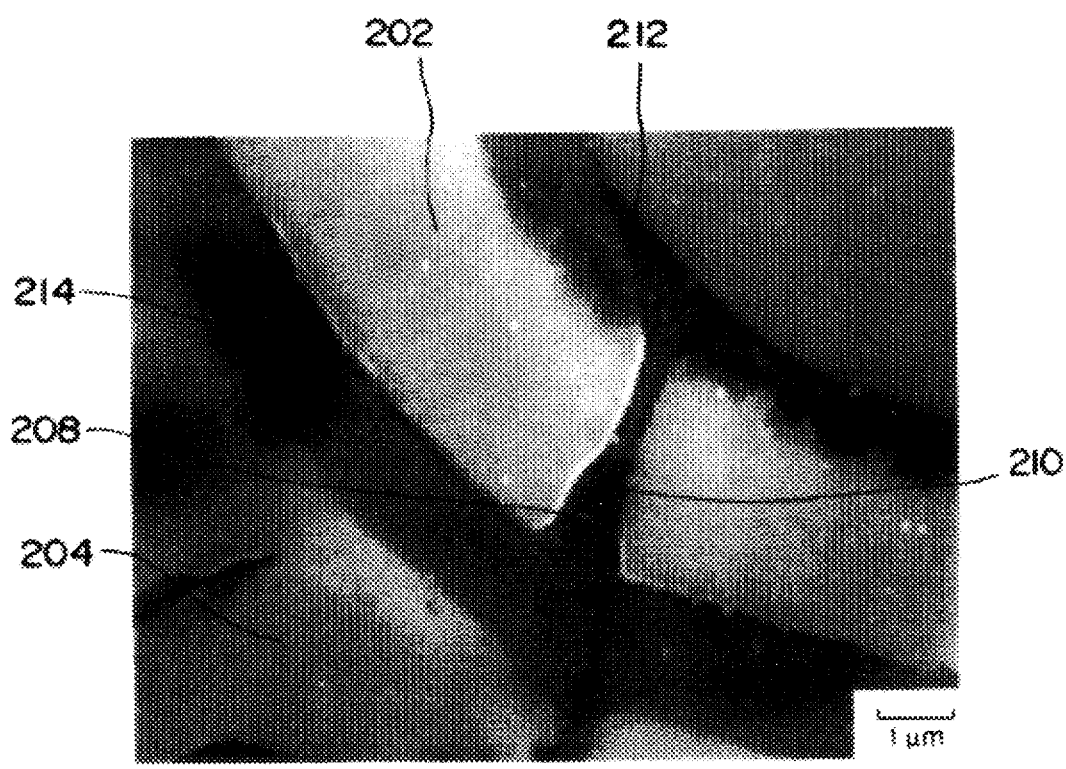

FIGS. 14 and 15 are scanning electron micrographs taken at about 2500× and 10,000×magnification of a diamond polished cross-section of the Sample H stress rupture test specimen at a region very close to the fracture surface. Specifically, FIG. 14 shows a crack 210 breaching at least the SiC coating 202, thus potentially exposing the NICALON™ fiber 200 and/or the BN debond coating 206 to chemical reaction with reactant supplied from outside the fiber and its coatings. The higher magnification of a different cracked region shown in FIG. 15 reveals the presence of a substance 208 at least partially filling the crack. Such a substance may comprise a reaction product of one or both of the SiC and BN coatings and/or the NICALON™ fiber itself. The presence of such a reaction product may explain the apparent degradation of the fiber pull-out mechanism as well as the relative longevity of the material while under load at elevated temperature. Specifically, the at least partial refilling of a matrix microcrack after such a crack forms may serve to reduce the access of, for example, atmospheric oxygen to the reinforcing fibers and their coatings.

This particular micrograph appears to show that the substance substantially filling the crack in the SiC coating also substantially comprises the space 212 between the SiC coating and the NICALON™ fiber and the space 214 between the SiC coating and the alumina oxidation reaction product 214.

Sample I

Sample E was stress rupture tested at a temperature of about 1200° C. The sample was loaded into the test rig in substantially the same manner as was described for Sample G. A tensile stress of about 12.5 MPa was applied to the test specimen at about room temperature. The furnace chamber and its contents were then heated from about room temperature to a temperature of about 1200° C. over a period of about 3 hours. At a temperature of about 1200° C., the applied stress was increased to about 66 MPa. After maintaining a temperature of about 1200° C. at an applied stress of about 66 MPa for about 256 hours, the applied stress was increased to about 70 MPa. After maintaining an applied stress of about 70 MPa at a temperature of about 1200° C. for about 216 hours, the applied stress was increased to about 75 MPa. After maintaining an applied stress of about 75 megapascals at a temperature of about 1200° C. for about 288 hours, the applied stress was increased to about 80 MPa. After maintaining an applied stress of about 80 MPa at a temperature of about 1200° C. for about 242 hours, the applied stress was increased to about 87 MPa. After about 1 hour at an applied stress of about 87 MPa at a temperature of about 1200° C., the sample broke.

Figure 16:
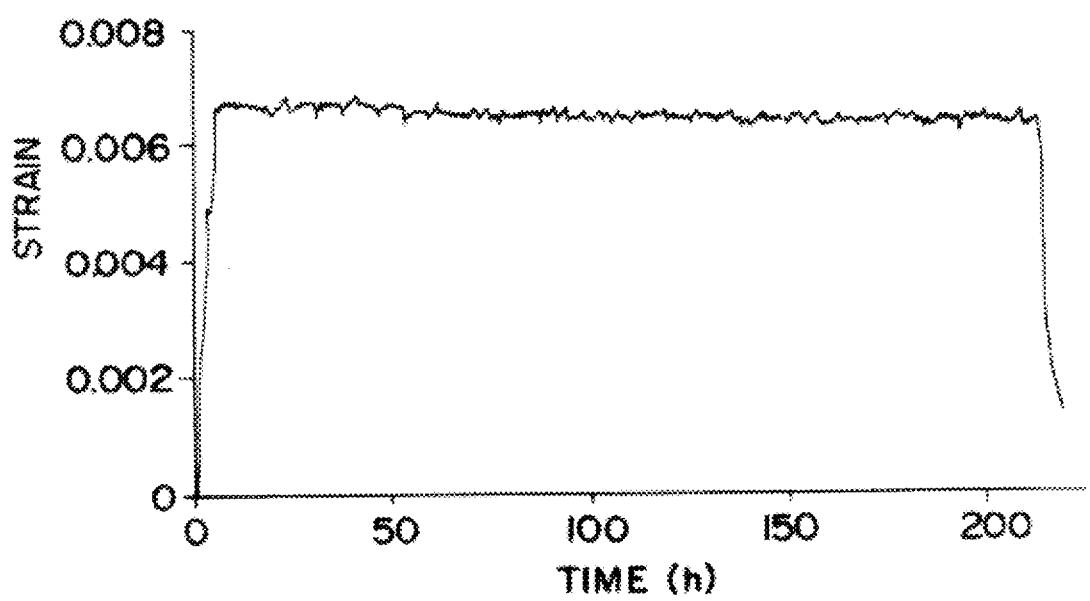
FIG. 16 shows total strain vs. time for a 1100° C. stress rupture specimen at about 70 MPa tensile load in air.

Concurrent with the stress rupture test, the strain of the stress rupture test specimens was monitored in the gage portion of the test specimen using the previously identified laser extensometer to help assess the creep behavior of the fiber reinforced ceramic matrix composite test specimen. Specifically, the first portion of the stress rupture for Sample H was repeated. Instead of testing the sample to failure, however, the temperature was decreased from about 1100° C. back down to about room temperature after about 210 hours at about 1100° C. under the approximately 70 MPa applied tensile stress. FIG. 16 shows the cumulative percent strain in the gage portion of the Sample H test specimen resulting from this creep test. The significance of FIG. 16 is that during the course of this approximately 210 hour creep test, Sample H shows essentially no change in elongation, indicating substantially no plastic deformation of the sample. Accordingly, no creep deformation of Sample H occurred under the described test conditions.

Similarly, no creep deformation was observed in the Sample I material which was stress rupture tested at a temperature of about 1200° C. under an applied load of about 70 MPa for about 216 hours. In contrast, it has been demonstrated in the art that creep deformation occurs in NICALON™ silicon carbide fibers at about 1200° C. Accordingly, the present results suggest that the present particular disposition of the reinforcing fibers in the applied coatings and the surrounding matrix material may provide enhanced creep resistance to the present fiber reinforced ceramic matrix composite system.

Furthermore, the present results may suggest that the particular disposition of the reinforcing fibers in the present composite body provides protection to said fibers from degradation (e.g., chemical attack) such as from atmospheric gases (e.g., oxygen and nitrogen) at elevated temperatures. Specifically, one additional stress rupture test was conducted on the fiber reinforced ceramic composite material of the present Example. The sample was tested in substantially the same manner as was Sample I except that after heating to a temperature of about 1200° C., the applied tensile stress was increased from about 12.5 MPa to about 80 MPa. After about 1000 hours in air at a temperature of about 1200° C. and at a stress of about 80 MPa (as shown in FIG. 12), the sample broke.

EXAMPLE 10

This Example demonstrates the fabrication of a NICALON™ silicon carbide fiber reinforced alumina matrix composite, wherein the NICALON™ fibers are first CVD coated with dual boron nitride/silicon carbide coatings applied in alternating layers starting with boron nitride.

A fabric preform was made by stacking 8 layers of 12 harness satin weave (12 HSW) fabric made from NICALON™ silicon carbide fiber (obtained from Dow Corning Corp., Midland, Mich.) on top of each other substantially in accordance with the procedure described for Sample A of Example 3.

The fabric preform comprising the 8 layers of 12 HSW NICALON™ silicon carbide fabric were then placed into the graphite preform containment fixture 108 described in Example 2 and depicted in FIG. 5e in substantially the same manner as was described in Example 2. The preform containment fixture containing the fabric preform was then placed into the reactor chamber of a chemical vapor infiltration apparatus having an inside diameter of about 4.5 inches (114 mm) and a length of about 18 inches (457 mm). The warp yarns of the eighth layer of the fabric preform were parallel to the gas flow direction within the chamber as well as being parallel to the longitudinal axis of the reactor chamber. The reactor chamber was closed and evacuated to less than about 0.6 torr. The reactor chamber was then heated to a temperature of about 800° C. by means of inductive heating. When the temperature within the reactor chamber reached about 800° C., as indicated by a thermocouple contained therein, a gas mixture comprising ammonia ($NH_3$) flowing at about 400 standard cubic centimeters per minute (sccm) and boron trichloride ($BCl_3$) flowing at about 200 sccm was introduced into the reactor chamber while maintaining a total operating pressure of about 0.6 torr. After about 2 hours at a temperature of about 800° C., the gas mixture flowing into the reactor chamber was interrupted, the power to the furnace heating the reactor chamber was interrupted and the furnace and its contents were naturally cooled. After sufficient cooling (e.g., less than about 200° C), the reactor chamber door was opened and the preform containment fixture was removed, cooled and disassembled to reveal that the fibers of the fabric layers of the fabric preform were coated with boron nitride, and furthermore, that the fabric layers comprising the fabric preform were bonded together by the boron nitride coating. The boron nitride coating thickness on the fibers was about 0.33 microns.

The boron nitride coated and bonded fabric preform was stored in a vacuum desiccator pending subsequent coating.

Next, a silicon carbide coating was applied to the fibers of the fabric preform.

The boron nitride coated and bonded fabric preform was placed back into the reactor chamber of the above-described chemical vapor infiltration apparatus. Because the fiber preform was self-bonding at this stage, the graphite containment fixture was unnecessary. The orientation of the fabric preform, however, was substantially the same as that employed for depositing the boron nitride coating onto the fibers in the previous deposition reaction.

The reactor chamber door was closed and the reactor chamber and its contents were evacuated to less than about 0.3 torr. The reactor chamber and its contents were then heated from about room temperature to a temperature of about 925° C. at a rate of about 50° C. per minute. Hydrogen gas was then introduced into the reactor chamber at a flow rate of about 750 standard cubic centimeters per minute (sccm). When the reactor chamber and its contents had equilibrated at a temperature of about 925° C., as indicated by a thermocouple contained therein, additional hydrogen flowing at a rate of about 750 sccm was bubbled through a liquid bath of methyltrichlorosilane (MTS) maintained at a temperature of about 21° C., after which this gas was introduced into the reactor chamber. The pressure in the reactor chamber was stabilized at about 11 torr. After maintaining these conditions of temperature, pressure and gas flow rate for about 3 hours, power to the resistance heated furnace which heated the reactor chamber was interrupted and the about 750 sccm of hydrogen that was being directed through the liquid MTS bath was diverted around the MTS bath and permitted to flow directly into the reactor chamber, thus establishing a direct hydrogen gas flow rate of about 1500 sccm into the reactor chamber. After the temperature of the reactor chamber and its contents had dropped to about 800° C., the resistance heated furnace was re-energized and the temperature of the reactor chamber and its contents was stabilized at about 800° C.

Another boron nitride coating was then deposited on the coated fiber. Specifically, the flow of hydrogen gas into the reactor was interrupted and the reactor chamber and its contents were then evacuated to less than about 0.3 torr. Ammonia ($NH_3$) and borontrichloride ($BCl_3$) gases were then introduced into the reactor chamber in substantially the same manner as was described previously at an operating pressure of about 0.6 mm torr so as to deposit a coating of boron nitride onto the coated fibers comprising the fabric preform. After depositing boron nitride for about 1.5 hours at a temperature of about 800° C. and at a pressure of about 0.6 torr, the gas mixture flowing into the reactor chamber was interrupted. The temperature of the reactor chamber and its contents was raised from about 800° C. back up to about 925° C. Hydrogen gas was then reintroduced into the furnace chamber at a flow rate of about 750 sccm.

When the temperature of the reactor chamber and its contents had stabilized at about 925° C., a final coating of silicon carbide was deposited onto the coated NICALON™ silicon carbide fibers comprising the fabric preform.

Specifically, substantially the same procedure was employed in depositing this second silicon carbide coating as was employed in depositing the first silicon carbide coating described earlier, with the exception that the reactor chamber and its contents were maintained at a temperature of about 925° C. at an operating pressure of about 11 torr for about 20 hours.

After depositing this second silicon carbide coating for about 20 hours, the power to the furnace heating the reactor chamber was interrupted and the about 750 sccm of hydrogen which was bubbled through the liquid MTS bath was instead sent directly into the reactor chamber without first being routed through the MTS bath. After the furnace chamber and its contents had cooled down to about less than about 200° C., the flow of hydrogen gas into the reactor chamber was interrupted and the reactor chamber was evacuated to less than about 0.3 torr. The pressure in the furnace chamber was then returned to atmospheric pressure using argon gas. When the furnace chamber had reached substantially atmospheric pressure, the chamber was opened and the coated fabric preform was removed from the reactor chamber.

An alumina oxidation reaction product was grown into the coated fiber preform in substantially the same manner as was described for Sample A of Example 3 to form a ceramic composite body comprising NICALON™ silicon carbide fibers coated with, in order from interior to exterior, about 0.2 micron boron nitride, about 1.83 microns silicon carbide, about 0.2 micron boron nitride and about 1.93 microns silicon carbide as measured along the radius of the fiber cross-section, said coated NICALON™ fibers reinforcing a ceramic matrix, said ceramic matrix comprising an alumina oxidation reaction product and a metallic constituent comprising some residual unreacted parent metal.

At least a portion of the metallic component of the formed composite body was then removed in substantially the same manner as described in Example 2.

Flexural strength test specimens were machined and strength tested at about room temperature in substantially the same manner as was described in Example 2. Examination at about 3500×magnification of a polished cross-section of the fracture surface of the fiber reinforced ceramic composite test specimen showed some cracks entering the outer silicon carbide layer and exiting without going through the inner silicon carbide layer. Not all of the cracks displayed this behavior, however; some cracks were observed entering through both outer and inner silicon carbide coating layers and subsequently exiting through both silicon carbide layers.

Demonstration that a NICALON™ fiber reinforced ceramic composite whose NICALON™ fibers have coated thereon double layers of boron nitride and silicon carbide can fracture or debond between the inner and outer silicon carbide layers may suggest that those fibers where this behavior occurs will be more resistant to chemical degradation from external reactants at elevated temperatures because such fibers are still protected by one group of boron nitride and silicon carbide coatings.

EXAMPLE 11

This Example demonstrates that a coating of boron nitride followed by a coating of silicon carbide on a NICALON™ fiber provide some protection from oxidation at elevated temperatures. This Example also shows that the application of an additional set of boron nitride and silicon carbide coatings supplied over the first set provide significantly greater oxidation protection.

Thermogravimetric analyses were performed on Samples J, K, L and M described below. Each test comprised placing a sample having a mass of several tens to several hundreds of milligrams into an alumina crucible which in turn was placed into the test chamber of a Model SPA 409 Netzsch microbalance (Netzsch Inc., Exton, Pa.). The chamber was sealed and substantially pure oxygen gas was introduced into the test chamber at a flow rate of about 200 standard cubic centimeters per minute (sccm). The temperature of the sample was then increased from substantially room temperature to a temperature of about 1200° C. at a rate of about 200° C. per hour. After maintaining a temperature of about 1200° C. for about 24 hours, the temperature was decreased to about room temperature at a rate of about 200° C. per hour. The flow of the substantially pure oxygen gas was interrupted. The microbalance continuously monitored and recorded the mass of the test sample throughout the duration of the test.

Sample J

Sample J comprised NICALON™ fibers in the "as-received" condition.

Sample K

Sample K comprised NICALON™ fibers which were coated with boron nitride substantially in accordance with the method described in Example 10.

Sample L

Sample L comprised NICALON™ fibers which were coated with a layer of boron nitride and a layer of silicon carbide substantially as described in Example 10.

Sample M

Sample M comprised a sample of the laminate which was deposited on the reactor wall in accordance with the procedure of Example 10. The laminate material specifically comprised, in succession, layers of boron nitride, silicon carbide, additional boron nitride and additional silicon carbide substantially as described in Example 10.

Table IV shows the percentage weight gain for each of the four samples as a function of the initial sample weight (e.g., fiber weight plus the weight of any coatings), the weight only of initial NICALON™ fiber, the weight only of the boron nitride coating, and the weights of the silicon carbide and boron nitride coatings. For Sample M only the percentage weight increase in terms of the initial sample weight was measured.

The data show that coating a NICALON™ fiber with both boron nitride and silicon carbide substantially reduces the elevated temperature oxidation of the fiber in oxygenated environments, as evidenced by the weight increases of 0.47 and 0.65 percent, respectively, compared to the weight increase of 1.4 percent for an uncoated NICALON™ fiber. Moreover, the Table appears to indicate that the best oxidation resistance (e.g., the least amount of weight increase) may occur when a dual duplex coating of boron nitride and silicon carbide (e.g., four layers in all) is applied. This result may suggest that this dual duplex coating could not only protect a NICALON™ fiber but could also protect the underlying boron nitride/silicon carbide coatings and in particular, the inner boron nitride debond coating.

EXAMPLE 12

This Example demonstrates, among other things, that the addition of particulates of silicon carbide between the fabric plies of fiber in a fiber reinforced ceramic composite body can greatly reduce the extent of microcracking in the ceramic matrix material which may occur between the plies during composite fabrication.

A graphite containment fixture containing a fabric preform was assembled in substantially the same manner as was described in Example 2, with the following notable exceptions. First, the NICALON™ silicon carbide fabric (obtained from Dow Coming Corp., Midland, Mich.) entirely comprised 8-harness satin weave (8 HSW). Moreover, about 5.75 grams of 220 grit 39 CRYSTOLON® dry silicon carbide particulate (average particle size of about 66 microns, Norton Company, Wornester, Mass.) was evenly applied to the top 6.75 inch (171 mm) face of each of fabric plies 2–6. Still further, the dry silicon carbide particulate was worked at least part way into the tows of fiber making up each fiber ply with a brush.

The formed ceramic composite body was then subjected to substantially the same metal removal process as described in Example 2 to remove at least some of the metallic component of the ceramic composite body.

Figure 17B:
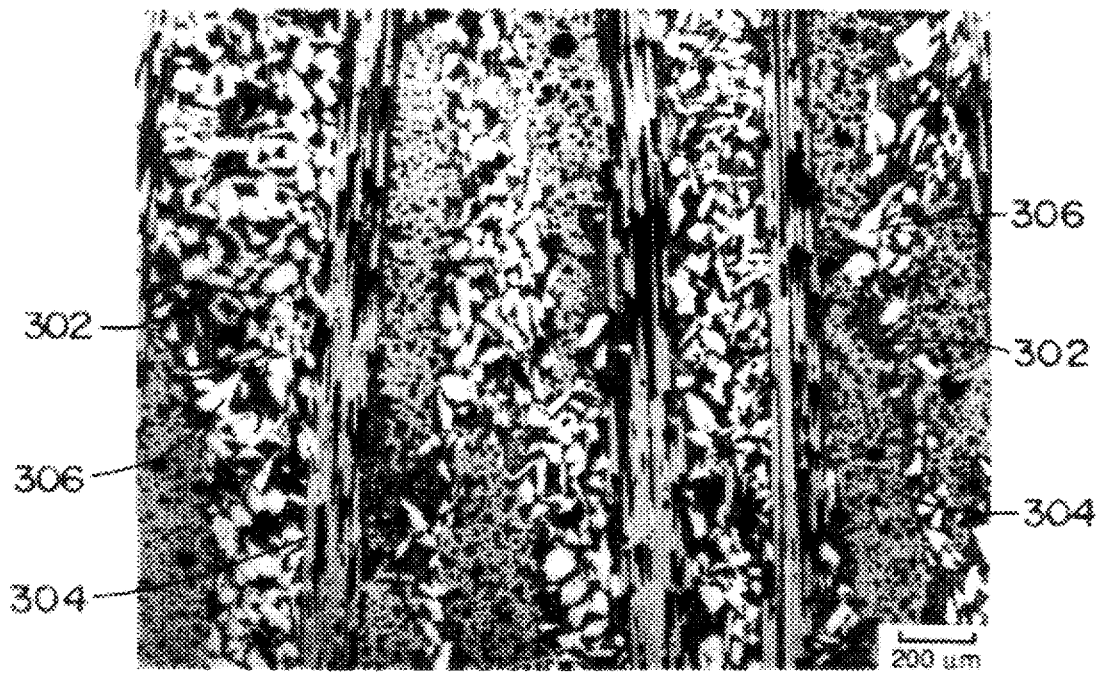
FIG. 17b is an approximately 50×magnification optical photomicrograph of a polished cross-section of a fiber reinforced ceramic composite body which shows how additions of silicon carbide particulate placed between adjacent plies of NICALON™ fiber virtually eliminates these matrix microcracks.

The ceramic composite body was then sectioned using a diamond saw, mounted in thermoplastic resin and polished using progressively finer grades of diamond paste to produce a sufficiently smooth surface for optical examination. FIG. 17b is an approximately 50×magnification optical photomicrograph of this polished cross-section of this fiber reinforced ceramic matrix composite. Specifically, this figure shows particulates of silicon carbide 306 embedded within an alumina ceramic matrix material 302 located between and embedding adjacent plies of fabric comprising woven tows of the reinforcement NICALON™ fibers 304. FIG. 17a is also an approximately 50×optical photomicrograph of a fiber reinforced ceramic matrix composite which was produced in substantially the same manner as the composite material of the present Example with the exception that no silicon carbide particulates were placed between the fabric plies of NICALON™ fiber. The absence in FIG. 17b of the cracks 300 shown in FIG. 17a are particularly noticeable and significant.

Thus, the present Example, among other things, demonstrates that addition of a particulate material such as silicon carbide between the plies of NICALON™ silicon carbide fabric can substantially reduce, if not completely eliminate, the phenomenon of microcracking in the matrix material occupying the space between the plies of NICALON™ fabric.

EXAMPLE 13

This Example demonstrates, among other things, that there is a preferred thickness for each of the boron nitride

TABLE IV

Weight Gains of Coated and Uncoated NICALON ™ Fibers and CVI SiC/BN Coatings on Exposure to Air at 1200° C. for 24 Hours

| | | % Weight Gain | | | |
|---|---|---|---|---|---|
| Sample ID | Description | Based on Initial Sample Wt. | Based on Initial Fiber Wt. | Based on CVI BN Coating Wt. | Based on CVI SiC/BN Coating Wt. |
| J | NICALON ™ Fiber | 1.4 | 1.4 | — | — |
| K | BN Coated NICALON ™ Fiber | 13.63 | 15.39 | 119.53 | — |
| L | SiC/BN Coated NICALON ™ Fiber | 0.47 | 2.0 | 14.81 | 0.65 |
| M | SiC/BN/SiC/BN Laminate | 0.08 | — | — | — |

The fabric preform comprising the eight stacked layers of 8-harness satin weave (8 HSW) fabric containing the five layers of silicon carbide particulate were then placed into a chemical-vapor infiltration (CVI) reactor and the fibers were coated with a first layer of boron nitride (BN) followed by layer of silicon carbide (SIC) substantially in accordance with the method described in Example 2. As a result of chemical-vapor infiltration, about 0.51 micron of boron nitride and about 1.94 microns of silicon carbide, as calculated based upon preform weight gain, were deposited onto the reinforcement fibers and particulates in the preform.

A ceramic matrix comprising aluminum oxide and some aluminum alloy metal was then grown into the coated preform by means of the directed metal oxidation process described in Example 2 to form a fiber reinforced ceramic matrix composite body.

and silicon carbide coatings which are applied to a preform comprising silicon carbide reinforcement fibers if the optimal flexural strength is to be achieved. More particularly, this Example demonstrates that for ceramic composite bodies having about 35 to about 36 volume percent reinforcement fibers in a matrix comprising predominantly aluminum oxide, the optimum thickness of boron nitride is somewhere between 0.20 micron and 0.41 micron and the optimum thickness of silicon carbide is somewhere above about 1.9 microns.

Sample N

A fabric preform was made in substantially the same manner as was described for Sample A of Example 3, except that all eight layers of fabric comprising NICALON™ silicon carbide fiber (obtained from Dow Corning Corp., Midland, Mich.) comprised 12-harness satin weave (12 HSW) fabric. The fabric preform was then placed into a graphite containment fixture whose shape (but not necessarily size) was substantially as shown in FIG. 5e.

The graphite containment fixture containing the fabric preform was then placed into a reactor chamber of a chemical-vapor infiltration (CVI) apparatus having a outer diameter of about 4.5 inches (110 mm) and a length of about 18 inches (441 mm). The reactor was inductively heated and oriented vertically such that the reactive gases were introduced at the top of the reactor and exhausted at the base of the reactor. KANTHAL® iron-chromium-aluminum alloy wires were used to suspend the graphite containment fixture about 11.5 inches (282 mm) from the top of the reactor. The warp yarns of the eighth layer of the fabric preform were parallel to the gas flow direction within the chamber. The subsequent processing was then substantially the same as that utilized to deposit the first boron nitride coating of Example 10 with the exception that the reactor was maintained at the coating temperature of about 800° C. for about 135 minutes. Disassembly of the graphite containment fixture revealed that the fibers of the fabric layers of the fabric preform were coated and bonded together by a boron nitride coating. This boron nitride coating had a thickness of about 0.3 micron as determined by the weight gain of the fabric preform due to boron nitride deposition.

Next, a silicon carbide coating was then applied on top of the boron nitride coated and bonded fabric preform as follows. The boron nitride coated and bonded fabric preform was suspended about 11.5 inches (282 mm) from the top of the reactor using KANTHAL® iron-chromium-aluminum alloy wires. The orientation of the boron nitride coated and bonded fabric preform was such that the warp yarns of the eighth layer of the 12-harness satin weave fabric were parallel to the gas flow direction within the chamber. The rest of the silicon carbide coating process was substantially the same as that described in Example 10 for the final silicon carbide coating. The boron nitride bonded fabric preform was found to have been coated with a layer of silicon carbide, thereby forming a silicon carbide (SiC)/boron nitride (BN)-coated fabric preform. The silicon carbide coating had a thickness of about 2.3 microns as determined by the weight gain of the preform during silicon carbide deposition.

A ceramic matrix comprising aluminum oxide and some aluminum alloy was then grown into the coated fabric preform in substantially the same manner as was described for Sample A of Example 3.

Unlike the composite material described in Example 2, the composite material of the present example was neither subjected to the metal removal process nor the elevated temperature heat treatment.

Sample O

The Sample O composite material was prepared in substantially the same way as described for the Sample N composite material with the exception that the coating temperature of about 800° C. for boron nitride deposition was maintained for about 180 minutes. The resulting coating thicknesses for boron nitride and silicon carbide were about 0.41 and about 2.30 microns, respectively.

Sample P

The composite material of Sample P was produced in substantially the same manner as was the material for Sample N with the exception that the coating temperature of about 800° C. for deposition of boron nitride was maintained for about 70 minutes. The coating thicknesses of boron nitride and silicon carbide which resulted were about 0.20 and about 2.30 microns, respectively.

Sample Q

The composite material of Sample Q was produced in substantially the same manner as was described for Sample N with the exception that the temperature of about 925° C. for deposition of the silicon carbide coating was maintained for about 16 hours instead of about 20 hours. The coating thicknesses of boron nitride and silicon carbide which resulted were about 0.29 and about 1.78 microns, respectively.

Sample R

The composite material of Sample R was produced in substantially the same manner as was described for Sample Q with the exception that the temperature of about 800° C. for deposition of the boron nitride coating was maintained for about 70 minutes. The coating thicknesses of boron nitride and silicon carbide which resulted were about 0.21 and about 1.90 microns, respectively.

Test specimens for determining the mechanical strength of the above-described composite materials were diamond machined to the specimen dimensions given in Example 2.

The mechanical strength of these test specimens was then determined by stressing each specimen in four-point flexure substantially as described in Example 2 until the sample failed. These flexural strength tests were conducted at ambient temperature and are reported in Table V. An examination of Table V reveals that for a relatively constant silicon carbide coating thickness of about 2.2 to 2.3 microns, the greatest flexural strength (taken from an average of 7 specimens for each composite material sample) is realized for a boron nitride coating thickness of about 0.3 micron. Reductions in strength were observed for boron nitride coating thicknesses of 0.20 and 0.41 microns, respectively. In addition, specifically by comparing the average strength values for Sample Q to that of Sample N and that of Sample R to that of Sample P, it is clear that silicon carbide coating thicknesses in the range of 2.2–2.3 microns produce greater strengths than silicon carbide coating thicknesses in the range of 1.8–1.9 microns.

Thus, this Example demonstrates that there exists a desirable range of coating thicknesses of each of boron nitride and silicon carbide to be applied to the fibers of the present reinforced ceramic composite materials to yield optimum ambient temperature strength. Specifically, the applied thickness of boron nitride should be greater than about 0.20 micron but less than about 0.41 micron. Furthermore, the applied thickness of silicon carbide should be greater than about 1.78 microns and preferably greater than about 1.90 microns.

EXAMPLE 14

This Example demonstrates the effect of the chemical-vapor-infiltration (CVI) coating thicknesses of both boron nitride and silicon carbide as well as the volume fraction of reinforcement fibers on an elevated temperature flexural strength of a fiber reinforced ceramic composite material.

Samples S–X

Fabric preforms comprising NICALON™ silicon carbide fiber (obtained from Dow Corning Corp., Midland, Mich.)

was assembled in substantially the same manner as was shown in Example 2. Unlike those of Example 2, however, the fabric preform of the present Example only measured about 3.2 inches (77 mm) square.

The fabric preforms were then chemical-vapor-infiltrated (CVI) with boron nitride (BN) and silicon carbide (SIC) in substantially the same manner as was described in Example 2 with the following notable exceptions.

TABLE V

| Sample No. | Vol. % Fiber | BN* (μm) | SiC* (μm) | Avg. Str.** (MPa) |
|---|---|---|---|---|
| N | 35.3 | 0.30 | 2.20 | 541 |
| O | 36.0 | 0.41 | 2.30 | 487 |
| P | 36.0 | 0.20 | 2.30 | 457 |
| Q | 36.0 | 0.29 | 1.78 | 388 |
| R | 36.0 | 0.21 | 1.90 | 358 |

*nominal coating thickness calculated on the basis of weight gain during CVI
**average of 7 samples Twelve fabric preforms were simultaneously coated with boron nitride, and for the silicon carbide deposition, six boron nitride coated preforms were simultaneously coated. Furthermore, during the boron nitride deposition, a coating temperature of about 742° C. as indicated by a thermocouple contained within the reactor chamber was maintained for about 5.5 hours and the total pressure within the reactor chamber was maintained between about 1.2 and about 1.6 torr. The gaseous reactants consisted of ammonia ($NH_3$) flowing at a rate of about 1200 standard cubic centimeters per minute (sccm) and boron trichloride ($BCl_3$) flowing at a rate of about 300 sccm. For the silicon carbide deposition, a coating temperature of about 928° C. was maintained for about 24 hours at a total reactor chamber operating pressure of about 11 torr.

The differences in the boron nitride and silicon carbide coating thicknesses which were obtained, as shown in Table VI, are accounted for by the relative location of a particular preform within the reactor. Generally speaking, for both boron nitride and silicon carbide depositions, the closer the preform was to the gas reactant source, the thicker was the coating. During boron nitride deposition, the preforms were arranged six deep in groups of two. Likewise, during silicon carbide deposition, the boron nitride coated preforms were arranged three deep in groups of two. Thus, during boron nitride deposition, the Sample W preform was closest to the gas reactant source, while the Sample V preform was farthest away. Likewise, during silicon carbide deposition, the Sample X preform was closest to the gas reactant source, while the Sample T preform was farthest away.

Each fabric preform coated with boron nitride and silicon carbide was then infiltrated with a ceramic matrix comprising aluminum oxide and some aluminum alloy using a directed metal oxidation process substantially as described in Example 2.

At least some of the metallic component of the formed fiber reinforced ceramic composite bodies was then removed. This metal removal process was substantially as described in Example 2 with the following exceptions. A nitrogen gas flow rate of about 10,000 sccm instead of about 4000 sccm was maintained throughout the heating and cooling. Also, three fiber reinforced composite bodies were simultaneously processed.

TABLE VI

| Sample No. | Vol. % Fiber | BN* (μm) | SiC* (μm) | Avg. Str.** (MPa) |
|---|---|---|---|---|
| S | 41 | 0.33 | 2.03 | 427 |
| T | 41 | 0.33 | 1.75 | 358 |
| U | 37 | 0.48 | 2.10 | 406 |
| V | 37 | 0.24 | 2.07 | 377 |
| W | 33 | 0.51 | 2.20 | 367 |
| X | 32 | 0.49 | 2.43 | 312 |

*nominal coating thickness calculated on the basis of weight gain during CVI
**average of 4 samples Unlike the method of Example 2, however, no subsequent heat treatment of the formed ceramic composite bodies of the present Example was performed.

The mechanical strength of each of the fiber reinforced ceramic composite bodies of Samples S–X was measured at a temperature of about 1200° C. in a four-point flexure mode. Specifically, test specimens were diamond machined to the dimensions specified in Example 2 and tested in four-point bending until failure using the procedure as outlined in Example 2. The resulting flexural strength based upon an average of four data points per material is reported for each of Samples S–X in Table VI.

An examination of the data reported in Table VI reveals a number of trends.

Specifically, a comparison of the data for Sample S with those for Samples U, V and W shows that boron nitride coating thicknesses of about 0.24 micron and 0.48 micron or thicker resulted in flexural strengths which were suboptimal. Thus, for the fiber reinforced composite bodies of the present invention, a boron nitride coating thickness on the reinforcement fibers of about 0.3 micron ought to be at least close to optimal.

Moreover, inspection of Table VI reveals a correlation between the thickness of the boron nitride coating and the volume fraction of the NICALON™ reinforcement fiber in the coated preform (and ultimately the composite body). This correlation results from the "spring-back" phenomenon which occurs after coating the fabric preforms with boron nitride when the graphite containment fixture is disassembled and the boron nitride coated fabric preform is removed. It seems that the thicker the boron nitride coating which is applied, the more the coated fabric preform expands in its thickness dimension upon its removal from the graphite containment fixture, thus the lower the overall volume fraction of NICALON™ fiber.

In addition, a comparison of the strength data for Samples S, U and W shows that the flexural strength of the composite material increases as the volume fraction of reinforcement fibers increases.

Finally, a comparison of the data for Sample T with the data for Sample S and, similarly, a comparison of the data for Sample X with the data for Sample W reveals that for a given volume fraction of reinforcement fibers, a silicon carbide thickness of about 1.75 microns, while a thickness of about 2.43 microns of silicon carbide is excessive in that it also results in suboptimal strength. The importance of the proper silicon carbide thickness is highlighted by a comparison of the data for Sample T with for Sample W. Specifically, this comparison shows that the optimization of the silicon carbide coating thickness at about 2.2 microns compensates for a difference in volume fraction of reinforcement fibers of about eight points or about 20 percent.

Thus, this Example demonstrates that for the fiber reinforced ceramic composite materials described herein, there exists desirable boron nitride and silicon carbide coating thicknesses to apply to the reinforcement fibers to optimize the high temperature strength of the formed composite materials. Specifically, the thickness of boron nitride applied should be greater than about 0.24 micron but less than about 0.51 micron. The thickness of silicon carbide applied should be greater than about 1.75 microns but less than about 2.43 microns. These desired thickness ranges agree well with the optional ranges of Example 13 derived for optional ambient temperatures composite strength. Furthermore, within the range of fiber reinforcement of about 32 to 41 volume percent of the composite body, the strength of the composite body increases with the volume fraction of reinforcement.

Table VII summarizes many of the processing parameters followed in fabricating the fiber reinforced ceramic composite bodies described in the foregoing Examples.

EXAMPLE 15

This Example demonstrates, among other things, an improved method of coating a fabric preform. Specifically, this Example demonstrates a set of coating conditions which result in coatings of more uniform thickness throughout the fabric preform.

A fabric preform 103 was made by stacking a plurality of layers of 8 harness satin weave (8 HSW) fabric and 12 harness satin weave (12 HSW) fabric made from NICALON™ silicon carbide fiber (obtained from Dow Corning Corp., Midland, Mich.) on top of each other in substantially the same manner as was described in Example 8. The fabric preform had dimensions of about 9 inches (229 mm) long by about 6 inches (152 mm) wide by about 0.125 inch (3.2 mm) thick.

The fabric preform was clamped in substantially the same kind of fixture as was described in Example 2 and depicted in FIG. 5e. The preform containment fixture 108 containing the fabric preform was placed into a reactor chamber of a refractory alloy steel chemical vapor infiltration (CVI) apparatus having a graphite tube liner and having overall dimensions of about 8 feet (2.4 meters) in length by about 15.5 inches (394 mm) in inside diameter. The warp yarns of the first and seventh layers of the fabric preform were perpendicular to the gas flow direction within the chamber as well as being perpendicular to the longitudinal axis of the reactor chamber. The reactor chamber was closed and evacuated to less than about 0.5 torr. The reactor chamber was then heated to a temperature of about 800° C. When the temperature within the reactor chamber reached about 800° C., a gas mixture comprising borontrichloride ($BCl_3$) flowing at about 1200 sccm at a temperature of about 60° C. and ammonia ($NH_3$) flowing at about 2100 sccm was introduced into the reactor chamber while maintaining a total operating pressure of about 0.5 torr. After about 4 hours at a temperature of about 800° C., the gas mixture flowing into the reactor chamber was interrupted, the power to the furnace heating the reactor chamber was interrupted and the furnace and its contents were naturally cooled. At a temperature below about 200° C., the reactor chamber door was opened and the graphite containment fixture was removed, cooled and disassembled to reveal that the fibers of the fabric layers of the fabric preform were coated and that the fabric layers comprising the fabric preform were bonded together by a boron nitride coating. The boron nitride coating had a thickness of about 0.48 micron.

TABLE VII

| | | | Matrix Fabrication Parameters | | | | |
|---|---|---|---|---|---|---|---|
| Example | Sample ID | Fiber Plies | Atmosphere | Temperature | Time (h) | Residual Metal Removed | Comments |
| 1 | — | 3 bundles of 500 fibers | $O_2$ | 1000° C. | 54 | no | |
| 2 | — | 12 HSW-(6) 8 HSW-12 HSW | air | 950° C. | 90 | yes | Some heat treated (see Table I); parent metal containing 8.5–11 wt % Si |
| 3 | A | (8) 12 HSW | air | 1000° C. | 60 | yes | |
| 3 | B | (4) 12 HSW | $N_2$ | 900° C. | 200 | yes | |
| 4 | C | 12 HSW-(6) 8 HSW-12 HSW | air | 950° C. | 90 | no | |
| 4 | D | 12 HSW-(6) 8 HSW-12 HSW | air | 950° C. | 90 | yes | |
| 4 | E | 12 HSW-(6) 8 HSW-12 HSW | air | 950° C. | 90 | yes | |
| 4 | F | 12 HSW-(6) 8 HSW-12 HSW | air | 950° C. | 90 | yes | |
| 5 | — | 12 HSW-(6) 8 HSW-12 HSW | air | 950° C. | 90 | yes | |
| 6 | — | 12 HSW-(6) 8 HSW-12 HSW | air | 950° C. | 90 | yes | |
| 7 | — | 12 HSW-(6) 8 HSW-12 HSW | air | 950° C. | 90 | yes | |
| 8 | — | (2) 8 HSW-(3) 12 HSW-(2) 8 HSW | air | 950° C. | 72 | yes | |
| 8 | — | (2) 8 HSW-(3) 12 HSW-(2) 8 HSW | air | 950° C. | 100 | yes | |
| 9 | G, H, I | (8) 12 HSW | air | 950° C. | 90 | yes | |
| 10 | — | (8) 12 HSW | air | 1000° C. | 60 | yes | |
| 12 | — | (8) 8 HSW | air | 950° C. | 90 | yes | 5 layers of SiC particulate |
| 13 | N–R | (8) 12 HSW | air | 1000° C. | 60 | no | |
| 14 | S–X | 12 HSW-(6) 8 HSW-12 HSW | air | 950° C. | 90 | yes | |

The boron nitride coated fabric preform was then stored in a vacuum desiccator until it was ready to be put back into the chemical vapor infiltration apparatus for additional coating.

Figure 18A:
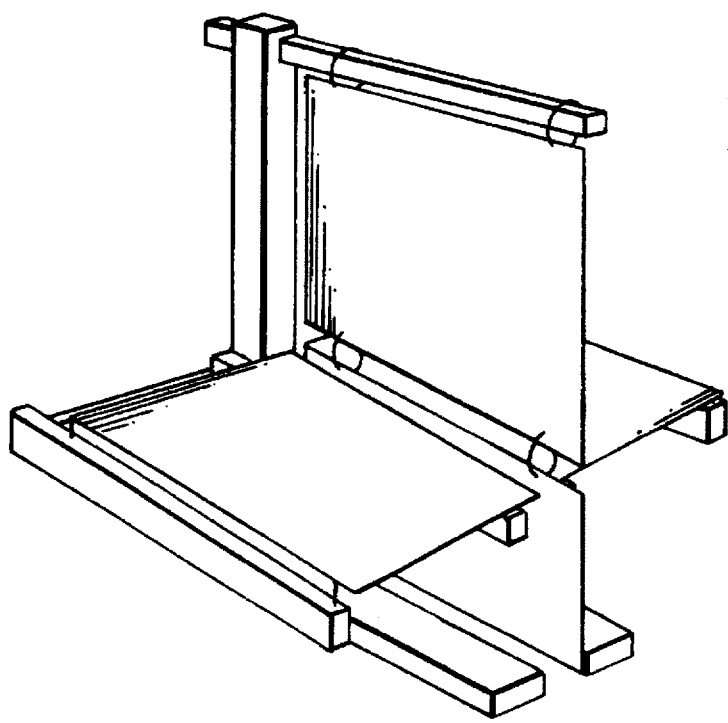
FIGS. 18a and 18b are isometric drawings of the graphite support fixture of Example 15 loaded with fabric preforms and in the unloaded condition, respectively.
Figure 18B:
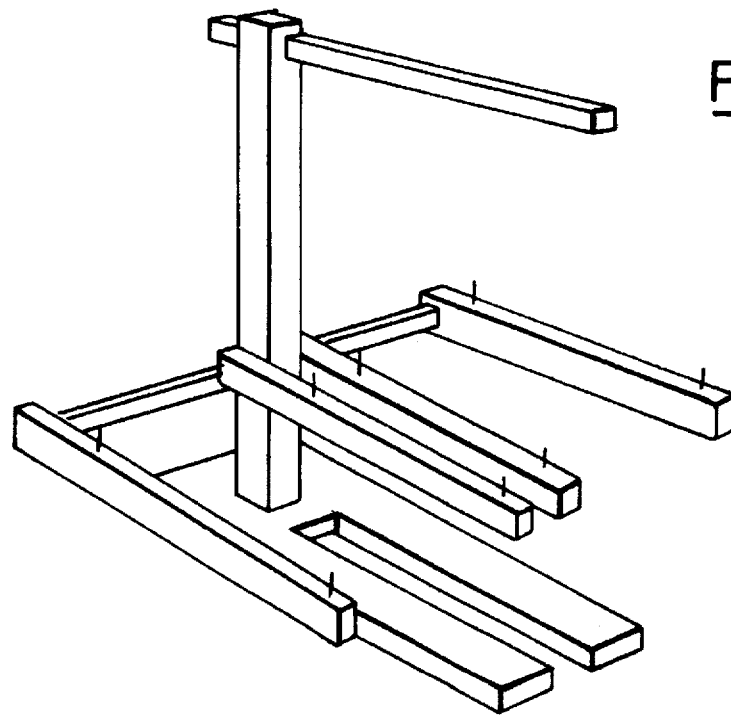

For the application of this subsequent coating, the boron nitride coated and bonded fabric preform was placed back into the reactor chamber of the chemical vapor infiltration apparatus. In this instance, however, the warp yarns of the first and seventh layers of the fabric preform were parallel to the gas flow direction within the chamber, as well as being parallel to the longitudinal axis of the reactor chamber. More specifically, the boron nitride coated fabric preforms were supported by a graphite fixture as shown in FIG. 18a. The graphite fixture alone is shown in FIG. 18b. A total of 8 boron nitride coated fabric preforms can be further coated simultaneously in a single reactor run by placing 2 such loaded fixtures front-to-back in the reactor chamber.

The CVI reactor chamber was closed and evacuated to about less than about 1 torr. Hydrogen gas was introduced into the reactor chamber at a flow rate of about 11,000 standard cubic centimeters per minute (sccm). The reactor chamber was then heated to a temperature of about 950° C. The reactor pressure was equilibrated at about 250 torr. Once the temperature of the contents of the reactor chamber had substantially completely stabilized at about 950° C., about 1800 sccm of hydrogen were diverted away from direct entry into the reactor chamber and were first bubbled through a bath of methyltrichlorosilane (MTS) maintained at a temperature of about 45° C. before entering the reactor chamber. After about 48 hours at a temperature of about 950° C., the power to the furnace heating the reactor chamber was interrupted and the about 1800 sccm of hydrogen that was being directed through the MTS bath was again permitted to flow directly into the reactor chamber to re-establish a direct hydrogen gas flow rate of about 11000 sccm into the reactor chamber. After the reactor chamber had cooled substantially, the hydrogen flow rate was interrupted and the furnace and its contents were evacuated to less than 1 torr. The pressure within the reactor chamber was then brought back up to about atmospheric pressure with argon gas. After the reactor chamber had cooled to a temperature below about 200° C., the argon gas flow rate was interrupted and the reactor chamber door was opened. The graphite support fixtures were removed, cooled and disassembled to reveal that the boron nitride bonded fabric preforms had been coated with a second layer of silicon carbide thereby forming a silicon carbide (SiC)/boron nitride (BN)-coated fabric preform. The silicon carbide had a thickness of about 2–3 microns. Significantly, the silicon carbide coating was of more uniform thickness from the interior of the preform to an exterior surface in the present Example than in the previously described Examples. In other words, the thickness of silicon carbide deposited at the exterior of the preform was not as great as in earlier Examples; thus, the coated preforms of the present Example were more permeable than some of the coated preforms of the previous Examples. Thus, the results of this Example suggest that it may be possible to apply silicon carbide coatings to the present fabric preforms having nominal thickness greater than about 2 to 3 microns without creating isolated pores in the preform.

Growth of an alumina oxidation reaction product through the silicon carbide/boron nitride-coated fabric preform was then carried out in substantially the same manner as was described in Example 2 to form a fiber reinforced ceramic composite body comprising a ceramic matrix comprising an aluminum oxide oxidation reaction product and a metallic component comprising some residual unreacted parent metal, with the ceramic matrix embedding the silicon carbide/boron nitride coated NICALON™ silicon carbide fibers. Substantially complete growth of the ceramic matrix only required about 72 hours, however. Because of the more permeable nature of the coated fabric preforms of the present Example, it is believed that the time required for complete growth is even less than this value.

Thus, this Example demonstrates an efficient technique for coating a plurality of preforms simultaneously as well as conditions which result in silicon carbide coatings of more uniform thickness.

EXAMPLE 16

This Example demonstrates the fatigue characteristics of the present fiber reinforced ceramic composite materials. Specifically, this Example demonstrates the lifetimes for samples of NICALON™ silicon carbide fiber reinforced alumina matrix composite bodies as a function of the maximum applied stress for bodies tested in air at various temperatures and subjected to low-frequency cycling in tension.

Samples which were tested at about 20° C. and at about 1000° C. were fabricated in substantially the same manner as was described in Example 2, including the residual metal removal process. The fiber reinforced ceramic composite bodies which were tested at temperatures of about 1100° C. and about 1370° C. were fabricated substantially in accordance with Example 8, which fabrication also included the residual metal removal process.

The geometry of the test specimen was that of a "double dogbone", that is, similar to that geometry in FIG. 7 except further comprising another reduced section. Specifically, test specimens were diamond machined to an overall length of about 5 inches (127 mm), about 0.55 inch (14 mm) maximum width and having a gage section measuring about 1.3 inches (33 mm) in length by about 0.25 inch (6 mm) in width.

Figure 19:
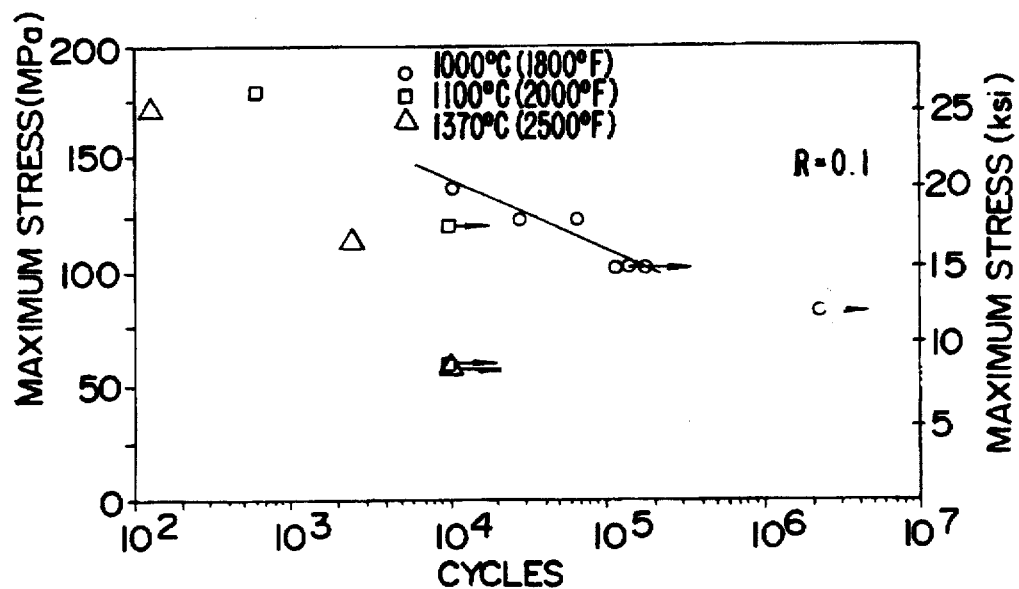
FIG. 19 is an S-N plot showing the life of a fiber reinforced ceramic composite body as a function of temperature and the maximum applied cyclical tensile stress.

Each sample was placed into the test chamber of a universal testing machine at about 25° C. The test chamber was then heated to the desired elevated temperature in air. When the temperature of the specimen had stabilized, a sinusoidal tensile stress was applied to the specimen. The minimum applied tensile stress was about 10 percent of the maximum applied tensile stress. The testing apparatus was configured so as to record the number of tensile stress cycles required to cause failure. These fatigue data are illustrated in Table VIII. Those test specimens which were still intact following 10,000 cycles of applied tensile stress at temperatures of 1100° C. or 1370° C. were then tensile tested in air using a uniformly increasing load at the same temperature at which they were cycled in applied stress until failure was observed. The table shows that such test specimens retained over 50 percent of their original strength following the tensile cycling at elevated temperature. The table also demonstrates that the fiber reinforced ceramic composite material was capable of surviving over 2 million cycles of a tensile stress applied between about 8 and about 83 MPa at a frequency of about 5 Hz at a temperature of about 1000° C. in air. The data generated at the elevated temperatures are presented graphically in FIG. 19 which shows the number of cycles to produce failure as a function of the maximum applied tensile stress. The arrows connected to several of the data points and pointing to the right indicate that the particular data point represents a lower bound of the material's life (e.g., failure of the specimen had not been achieved at the indicated maximum stress and number of tensile cycles). Further examination of the data presented in FIG. 19 suggest an endurance limit for the fiber reinforced ceramic composite material of about 80 MPa at a temperature of about 1000° C. in air.

TABLE VIII

| 2-D Nicalon ™/Al$_2$O$_3$ Low Cycle Fatigue Data | | | | |
|---|---|---|---|---|
| Test Temperature | Max. Stress (R = 0.1) MPa (ksi) | Frequency Hz | Cycles to failure | Residual Str. at Temp. MPa (ksi) |
| Room Temperature | 72 (11) | 1 | 172,912* | — |
| | 72 (11) | 1 | 235,858* | — |
| | 138 (20) | 1 | 150,956* | — |

TABLE VIII-continued

2-D Nicalon ™/Al₂O₃ Low Cycle Fatigue Data

| Test Temperature | Max. Stress (R = 0.1) MPa (ksi) | Frequency Hz | Cycles to failure | Residual Str. at Temp. MPa (ksi) |
|---|---|---|---|---|
| | 138 (20) | 1 | 166,459* | — |
| | 166 (24) | 1/10 | 351,600/118,360 | — |
| 1000° C. | 83 (12) | 5 | 2,195,000* | — |
| (1800° F.) | 103 (15) | 0.3 | 142,577* | — |
| | 103 (15) | 5 | 117,843 | — |
| | 103 (15) | 5 | 175,620 | — |
| | 124 (18) | 1 | 27,712 | — |
| | 124 (18) | 5 | 66,676 | — |
| 1100° C. | 60 (9) | 1 | 10,000* | 185 (26) |
| (2000° F.) | 120 (17) | 1 | 10,000* | 149 (21) |
| | 180 (26) | 1 | 603 | — |
| 1370° C. | 58 (8) | 1 | 10,000* | 153 (22) |
| (2500° F.) | 115 (16) | 1 | 2,480 | — |
| | 173 (25) | 1 | 128 | — |

*Test stopped prior to failure
RT & 1000° C. data generated by GE
1100 & 1370° C. data generated by Williams International

EXAMPLE 17

This Example illustrates a modified stress rupture test whose purpose or objective was to further simulate at least some of the conditions which might be present in a turbine engine. Specifically, the test illustrated by the present example is similar in many respects to the stress rupture test described in Example 9 with the exception that a temperature cycle was added or superimposed to the test system during the elevated temperature exposure under the applied dead load.

A fiber reinforced ceramic composite body was fabricated in substantially the same manner as was described in Example 2, including removing a substantial fraction of the residual metallic component.

Figure 20:
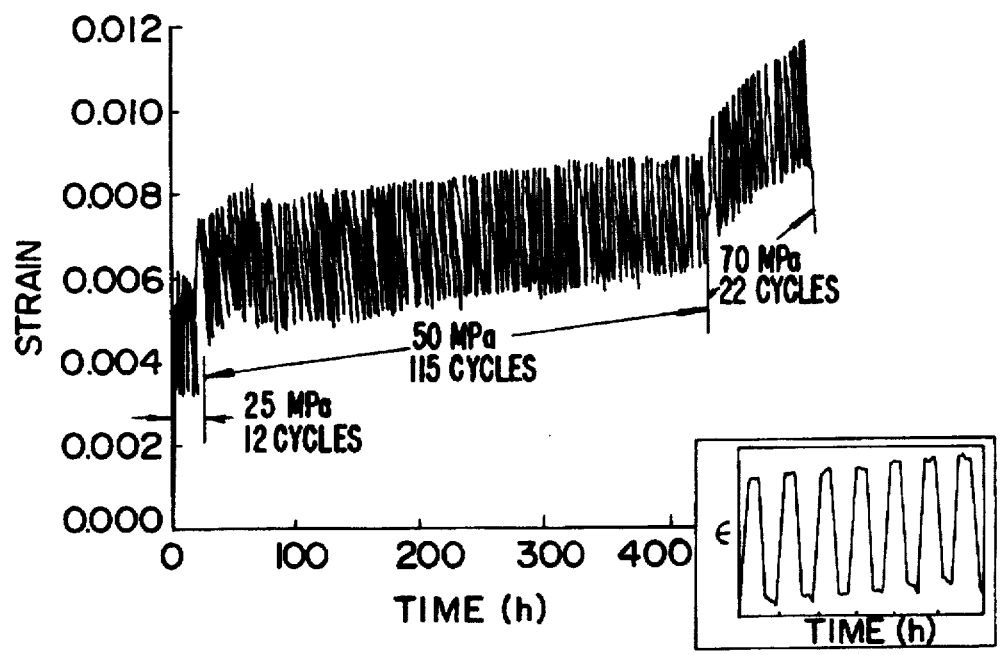
FIG. 20 is a plot of sample strain versus time for a fiber reinforced ceramic composite body subjected to thermal cycling under an applied tensile dead load.

Tensile test specimens were diamond machined in substantially the same manner as was described in Examples 7 and 9 and loaded into the test fixture described in Example 9, which in turn was loaded into the Model P-5 creep testing machine (SATEC Inc., Grove City, Pa.). A tensile stress of about 12.5 MPa was then applied to the test specimen using dead loading. A resistance-heated air atmosphere furnace was positioned completely around the test fixture portion of the creep testing machine and the furnace and the sample contained within were heated from about 20° C. to a temperature of about 1100° C. Each thermal cycle then consisted of maintaining a temperature of about 1100° C. for about 1 hour in air, then uniformly decreasing the temperature of the test specimen to a temperature of about 600° C. over a period of about 45 minutes, maintaining a temperature of about 600° C. for about 1 hour and finally uniformly increasing the temperature of the specimen back up to a temperature of about 1100° C. over a period of about 45 minutes. As in Example 9, sample strain was monitored with a Model 1102 ZYGO® helium-neon laser extensometer (Zygo Corporation, Middlefield, Conn.). The sample test data were then recorded in the form of sample strain as a function of test duration, which data are illustrated graphically in FIG. 20. Referring to FIG. 20, after the application of about 12 thermal cycles at an applied tensile stress of about 25 MPa (the first few cycles being used to check out the functioning of all of the test equipment), the stress was then increased to about 50 MPa. After the application of about 115 thermal cycles at a stress of about 50 MPa, the stress was then further increased to about 70 MPa. After about 22 cycles at a stress of about 70 MPa, the sample failed. FIG. 20 also shows an enlargement of the 70 MPa region which specifically illustrates the change in strain in the test specimen in response to the change in specimen temperature. All together, the test specimen survived a total of 142 thermal cycles or about 500 hours of test duration.

A second thermal cycling test was then conducted on a substantially similar fiber reinforced composite test specimen in substantially the same manner as described above with the exception that the applied tensile stress throughout the duration of the testing was about 50 MPa. This second test specimen survived thermal cycling under this applied tensile stress in air for a total of about 282 thermal cycles (or about 987 hours) before failure occurred.

Thus, this Example demonstrates that the present fiber reinforced ceramic composite materials are capable of surviving hundreds of hours under tensile loads in air under condition of varying elevated temperature.

An artisan of ordinary skill will readily appreciate that numerous modifications may be made to the above-identified Examples without departing from the spirit of the present invention. Accordingly, the Examples should be considered as illustrative of the invention and should in no way be construed as limiting to the scope of the invention as defined in the claims appended hereto.

What is claimed is:

1. A permeable mass adapted for use as a reinforcing component in a composite comprising a matrix material embedding said reinforcing component, said permeable mass comprising:
   at least one interior body and at least one exterior body, wherein at least one of said interior and at least one of said exterior bodies (a) comprises a plurality of ceramic fibers, and (b) defines some bulk external surface,
   wherein at least one of said exterior bodies is disposed exteriorly of said at least one interior body and shields at least a major portion of said bulk external surface of said interior body, and
   further wherein said at least one exterior body possesses a bulk density which is less than that of said at least one interior body.

2. A preform adapted for use as a reinforcing component in a composite comprising a matrix material embedding said reinforcing component, said preform comprising:
   a first permeable mass and a second permeable mass, each comprising woven ceramic fibers,
   wherein said second permeable mass surrounds at least a majority of external surfaces presented by said first permeable mass, and
   further wherein said at least one second permeable mass possesses a fiber architecture which is more open than that of said first permeable mass.

3. The permeable mass of claim 1 wherein said plurality of said ceramic fibers of said interior body are woven.

4. The permeable mass of claim 3, wherein said plurality of said ceramic fibers are woven to form a three-dimensional structure.

5. The permeable mass of claim 3, wherein said plurality of said ceramic fibers are woven to form a two-dimensional fabric.

6. The permeable mass of claim 5, wherein said two-dimensional fabric has a fiber or weave architecture comprising a harness satin weave.

7. The permeable mass of claim 1, wherein said plurality of ceramic fibers of said exterior body are woven.

8. The permeable mass of claim 7, wherein said plurality of said ceramic fibers of said exterior body are woven into a two-dimensional fabric.

9. The permeable mass of claim 1, wherein said ceramic fibers of said interior body and said exterior body are woven to form a specific weave pattern or fiber architecture, and said exterior body has a more open weave pattern than does said interior body.

10. The permeable mass of claim 5, wherein said at least one fabric comprises a weave which is more open than that of twelve harness satin weave.

11. The permeable mass of claim 5, wherein said body comprises a fiber or weave architecture which is tighter than that of plain weave.

12. The permeable mass of claim 1, wherein at least a portion of said ceramic fibers comprise silicon carbide-based material.

13. The permeable mass of claim 1, wherein at least a portion of said ceramic fibers comprise a material selected from the group consisting of silicon carbide and carbon.

14. The permeable mass of claim 1, wherein at least one of said bodies further comprises at least one ceramic material having a morphology selected from the group consisting of particles, platelets, and microspheres.

15. The permeable mass of claim 1, wherein at least a portion of said ceramic fibers are substantially completely coated.

16. The permeable mass of claim 1, wherein at least a portion of said ceramic fibers features a duplex coating comprising a first coating in substantially complete, continuous contact with a substrate of said ceramic fiber, and a second coating positioned exteriorly with respect to said first coating and in substantially complete, continuous contact with said first coating.

17. The permeable mass of claim 16, wherein said first coating comprises a material selected from the group consisting of carbon and boron nitride.

18. The permeable mass of claim 15, wherein said second coating comprises a material selected from the group consisting of silicon carbide, aluminum nitride, silicon nitride, zirconium dioxide and aluminum oxide.

19. The preform of claim 2, wherein said second permeable mass possesses a lower bulk density than said first permeable mass.

20. The preform of claim 2, wherein said second permeable mass possesses a greater gas permeability than said first permeable mass.

21. A permeable mass adapted for use as a reinforcing component in a composite comprising a matrix material embedding said reinforcing component, said permeable mass comprising:
a body comprising a plurality of ceramic fibers; and
at least one fabric comprising a plurality of ceramic fibers contacting and covering at least a majority of external surface area presented by said body, wherein said at least one fabric possesses a greater gas permeability than an equivalently sized and shaped structure having a fiber architecture equivalent to that of said body.

* * * * *